(12) United States Patent
Segawa et al.

(10) Patent No.: US 10,121,274 B2
(45) Date of Patent: Nov. 6, 2018

(54) MEDICAL IMAGE PROCESSING SYSTEM, MEDICAL IMAGE PROCESSING APPARATUS, CONTROL METHOD THEREOF, AND RECORDING MEDIUM

(71) Applicant: CANON KABUSHIKI KAISHA, Tokyo (JP)

(72) Inventors: Akimichi Segawa, Ichikawa (JP); Kazuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 15/097,790

(22) Filed: Apr. 13, 2016

(65) Prior Publication Data

US 2016/0307315 A1 Oct. 20, 2016

(30) Foreign Application Priority Data

Apr. 16, 2015 (JP) ................. 2015-084593
Apr. 16, 2015 (JP) ................. 2015-084594
Jun. 23, 2015 (JP) ................. 2015-125953

(51) Int. Cl.
*G06K 9/00* (2006.01)
*G06T 15/00* (2011.01)
*B33Y 10/00* (2015.01)
*B33Y 50/00* (2015.01)
*B33Y 50/02* (2015.01)

(52) U.S. Cl.
CPC .............. *G06T 15/00* (2013.01); *B33Y 10/00* (2014.12); *B33Y 50/00* (2014.12); *B33Y 50/02* (2014.12)

(58) Field of Classification Search
CPC ................................ G06T 15/00; B33Y 50/02
See application file for complete search history.

(56) References Cited

U.S. PATENT DOCUMENTS

2002/0025503 A1* 2/2002 Chapoulaud ............. A61C 7/00
433/24
2010/0295848 A1* 11/2010 Grewer ..................... G06T 7/11
345/419
2011/0229005 A1* 9/2011 Den Harder ......... G06K 9/3233
382/131

(Continued)

FOREIGN PATENT DOCUMENTS

JP 2002-86576 A 3/2002
JP 2013-138763 A 7/2013

*Primary Examiner* — Oneal R Mistry
(74) *Attorney, Agent, or Firm* — Canon U.S.A., Inc. IP Division

(57) ABSTRACT

A medical image processing system that can accept commissions to perform 3D formation using a 3D forming apparatus includes a storage unit, a selection accepting unit, a part identifying unit, and a screen generating unit. The storage unit stores a medical image, and body part information representing a human body part in the medical image. The selection accepting unit accepts selection with regard to the medical image stored in the storage unit. The part identifying unit identifies the body part included in the medical image, using the body part information corresponding to the medical image regarding which the selection accepting unit has accepted selection. The screen generating unit generates a screen that can accept a commission to form a formed object of the body part identified by the part identifying unit.

9 Claims, 40 Drawing Sheets

(56) References Cited

U.S. PATENT DOCUMENTS

2014/0104311 A1* 4/2014 Park ..................... G06F 19/321
                                                                    345/629
2015/0089365 A1* 3/2015 Zhao .................... G06F 19/321
                                                                    715/708
2017/0031574 A1* 2/2017 Dhawal ............... G06F 3/04847

* cited by examiner

FIG. 7

MEDICAL IMAGE LIST

| DISPLAY IMAGE | EXAMINATION DATE | PATIENT NAME | EXAMINATION TYPE | SITE | NUMBER | COMMISSION FORMATION | CONFIRM RESULTS | FINALIZE COMMISSION | CANCEL COMMISSION |
|---|---|---|---|---|---|---|---|---|---|
| DISPLAY | APRIL 4, 2015 | ○○ ○○ | CT | ABDOMEN | 500 | | | | |
| DISPLAY | APRIL 4, 2015 | △△ △△ | CT | HEAD | 10 | | | | |
| DISPLAY | APRIL 5, 2015 | □□ □□ | MR | CHEST | 300 | COMMISSION | | | |
| DISPLAY | APRIL 6, 2015 | × × × × | CT | CHEST | 400 | COMMISSION | | FINALIZE | CANCEL |
| DISPLAY | APRIL 6, 2015 | × × × × | CT | ABDOMEN | 500 | | | | |
| DISPLAY | APRIL 7, 2015 | ▽▽ ▽▽ | MP | ABDOMEN | 200 | COMMISSION | | | |

FIG. 9

| SITE | EXAMINATION TYPE | TYPE OF ORGAN | FORMATION PART | EXTRACTION ALGORITHM |
|---|---|---|---|---|
| HEAD | CT | BONE | SKULL | ·········· |

⋮

| SITE | EXAMINATION TYPE | TYPE OF ORGAN | FORMATION PART | EXTRACTION ALGORITHM |
|---|---|---|---|---|
| ABDOMEN | CT | BONE | LUMBAR SPINE | ·········· |
| ABDOMEN | CT | BONE | PELVIS | ·········· |
| ABDOMEN | CT | BONE | SACRUM | ·········· |
| ABDOMEN | CT | INTERNAL ORGAN | LIVER | ·········· |
| ABDOMEN | CT | INTERNAL ORGAN | PANCREAS | ·········· |
| ABDOMEN | CT | INTERNAL ORGAN | KIDNEY | ·········· |
| ABDOMEN | CT | INTERNAL ORGAN | ABDOMINAL AORTA | ·········· |
| ABDOMEN | MR | INTERNAL ORGAN | LIVER | ·········· |
| ABDOMEN | MR | INTERNAL ORGAN | PANCREAS | ·········· |

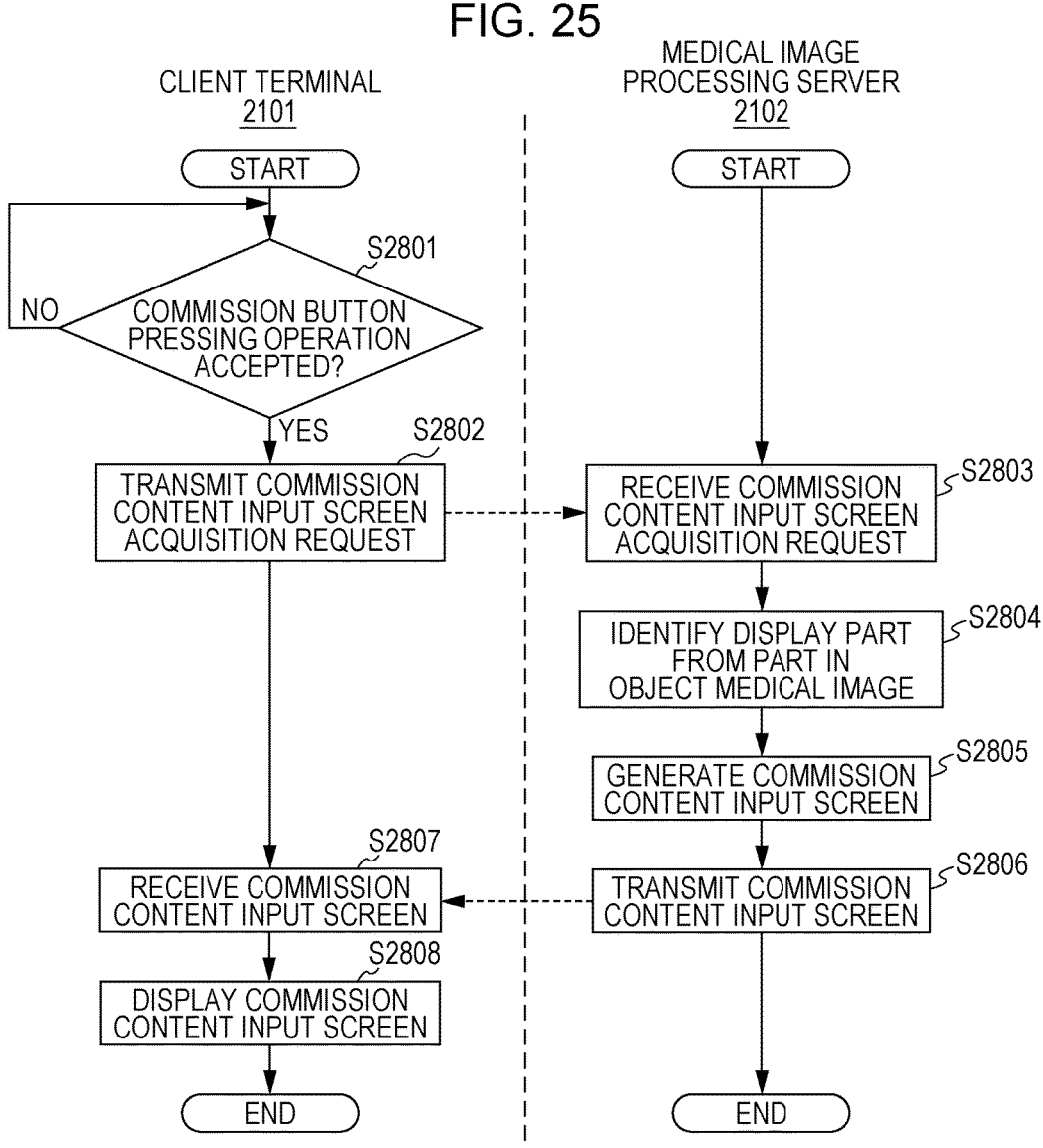

FIG. 26

| SITE | EXAMINATION TYPE | TYPE OF ORGAN | FORMATION PART | EXTRACTION ALGORITHM | SAMPLE DATA | DISPLAY POSITION |
|---|---|---|---|---|---|---|
| HEAD | CT | BONE | SKULL | ·········· | \\server\sample\bone_001.wrl | ····· |
| ABDOMEN | CT | BONE | LUMBAR SPINE | ·········· | \\server\sample\bone_013.wrl | ····· |
| ABDOMEN | CT | BONE | PELVIS | ·········· | \\server\sample\bone_014.wrl | ····· |
| ABDOMEN | CT | BONE | SACRUM | ·········· | \\server\sample\bone_015.wrl | ····· |
| ABDOMEN | CT | INTERNAL ORGAN | LIVER | ·········· | \\server\sample\organ_001.wrl | ····· |
| ABDOMEN | CT | INTERNAL ORGAN | PANCREAS | ·········· | \\server\sample\organ_002.wrl | ····· |
| ABDOMEN | CT | INTERNAL ORGAN | KIDNEY | ·········· | \\server\sample\organ_003.wrl | ····· |
| ABDOMEN | CT | INTERNAL ORGAN | ABDOMINAL AORTA | ·········· | \\server\sample\organ_004.wrl | ····· |
| ABDOMEN | MR | INTERNAL ORGAN | LIVER | ·········· | \\server\sample\organ_005.wrl | ····· |
| ABDOMEN | MR | INTERNAL ORGAN | PANCREAS | ·········· | \\server\sample\organ_006.wrl | ····· |

FIG. 27

| DISPLAY ORIENTATION NAME | ROTATION AXIS | ROTATION ANGLE |
|---|---|---|
| FRONT | X AXIS | 0 DEGREES |
| RIGHT SIDE | Y AXIS | −90 DEGREES |
| LEFT SIDE | Y AXIS | 90 DEGREES |
| REAR | Y AXIS | 180 DEGREES |
| PLAN | X AXIS | 90 DEGREES |
| BOTTOM | X AXIS | −90 DEGREES |

FIG. 28

WEB BROWSER 21100
FILE  EDIT  DISPLAY  TOOLS  HELP
ADDRESS http://www.****.net/***/**********

INPUT CONTENTS OF COMMISSION

○ DISPLAY PART (ABDOMEN) ～21101

BONE: ☐ LUMBAR SPINE  ☐ PELVIS  ☐ SACRUM

ORGAN: ☐ LIVER  ☐ PANCREAS  ☐ KIDNEY  ☐ ABDOMINAL AORTA

○ DISPLAY ORIENTATION ～21102

☐ FRONT  ☐ BACK

☐ RIGHT SIDE  ☐ PLAN

☐ LEFT SIDE  ☐ BOTTOM

DEFAULT  21103

OK 21104  CANCEL

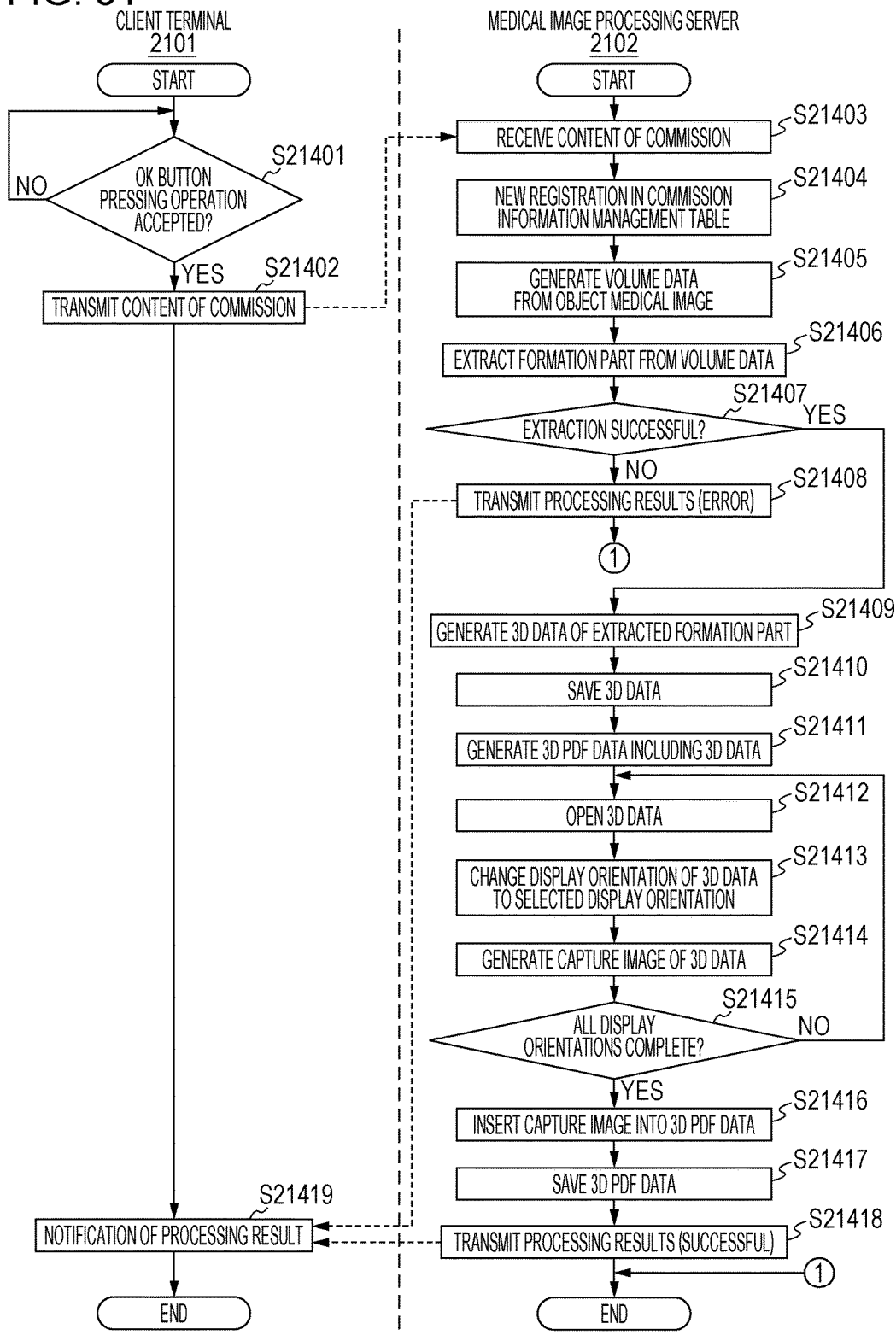

FIG. 32

| COMMISSION ID 21501 | IMAGE ID 21502 | FORMATION PART 21503 | DISPLAY ORIENTATION 21504 | DEFAULT 21505 | COMMISSIONING PARTY INFORMATION 21506 |
|---|---|---|---|---|---|
| 001 | 001 | LIVER | FRONT, RIGHT SIDE, BOTTOM | ROTATION AXIS: Y AXIS ROTATION ANGLE: −10 DEGREES | ······ |
| 002 | 005 | PANCREAS | FRONT, PLAN | ROTATION AXIS: X AXIS ROTATION ANGLE: 25 DEGREES | ······ |

| STATUS 21507 | LOCATION WHERE 3D DATA IS SAVED 21508 | LOCATION WHERE 3D PDF DATA IS SAVED 21509 |
|---|---|---|
| CURRENTLY CONFIRMING COMMISSIONING PARTY | \\server\3d_data\20150404001\ | \\server\3d_pdf\20150404001\ |
| CURRENTLY CONFIRMING COMMISSIONING PARTY | \\server\3d_data\20150404002\ | \\server\3d_pdf\20150404002\ |

21500

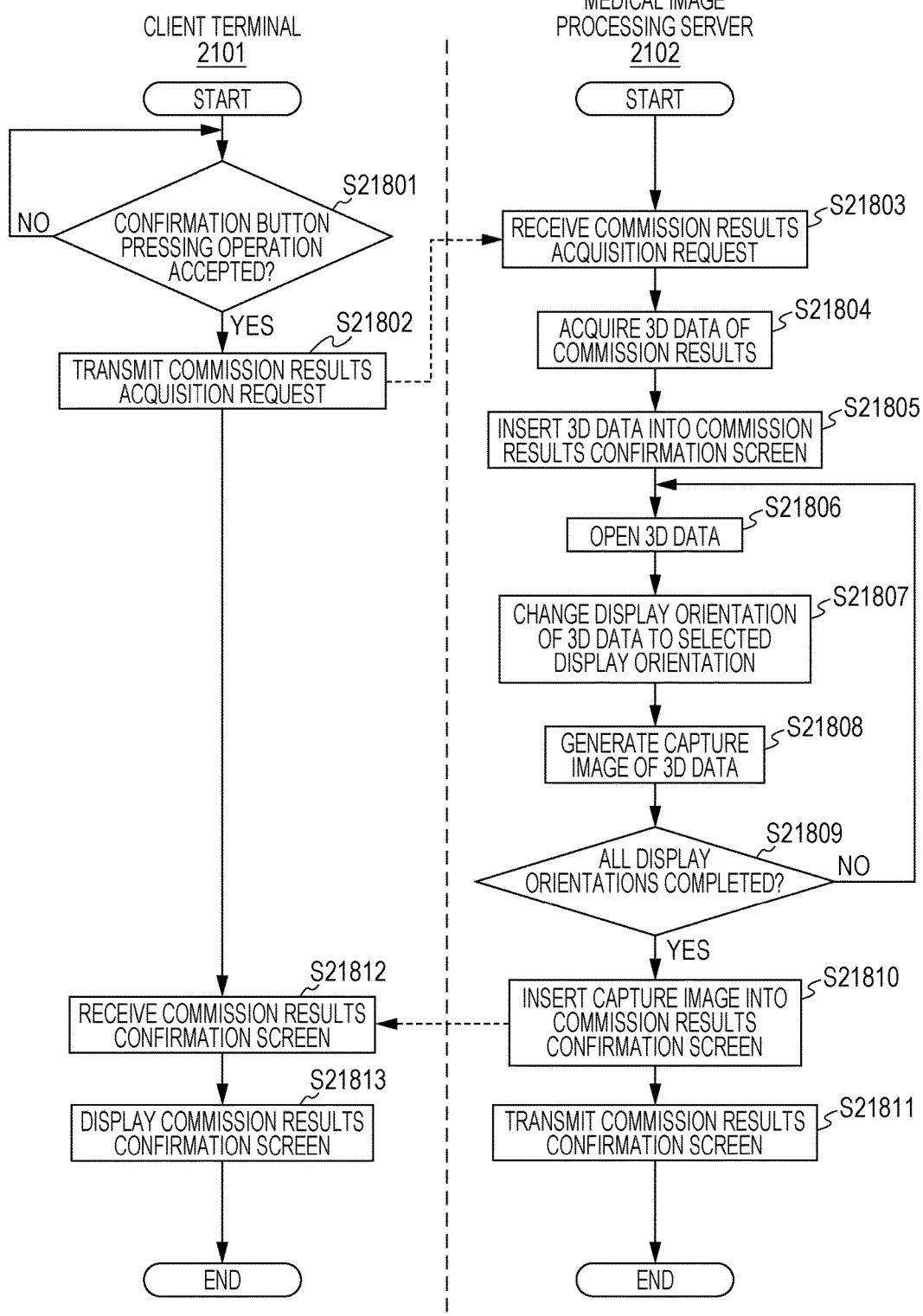

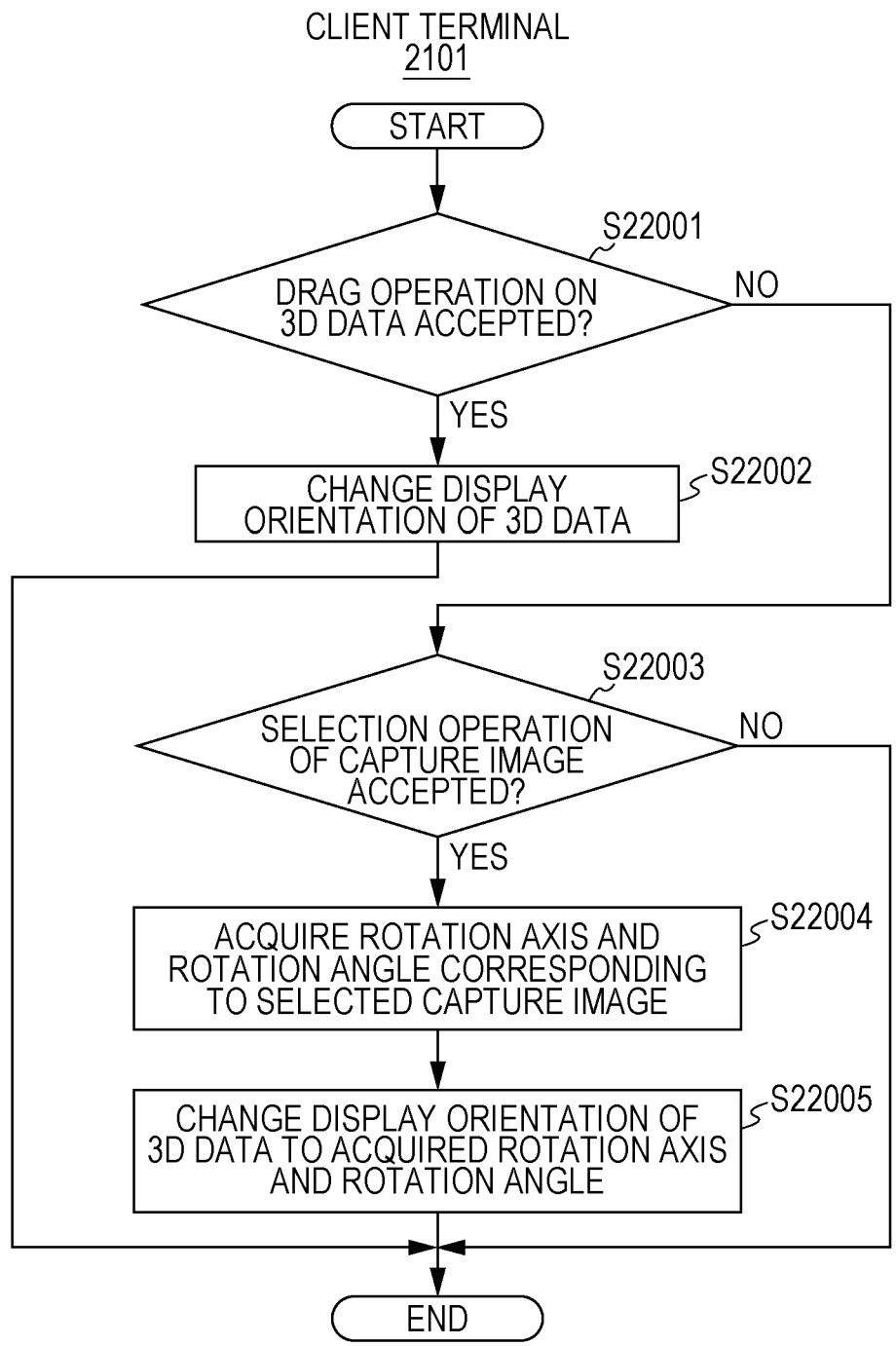

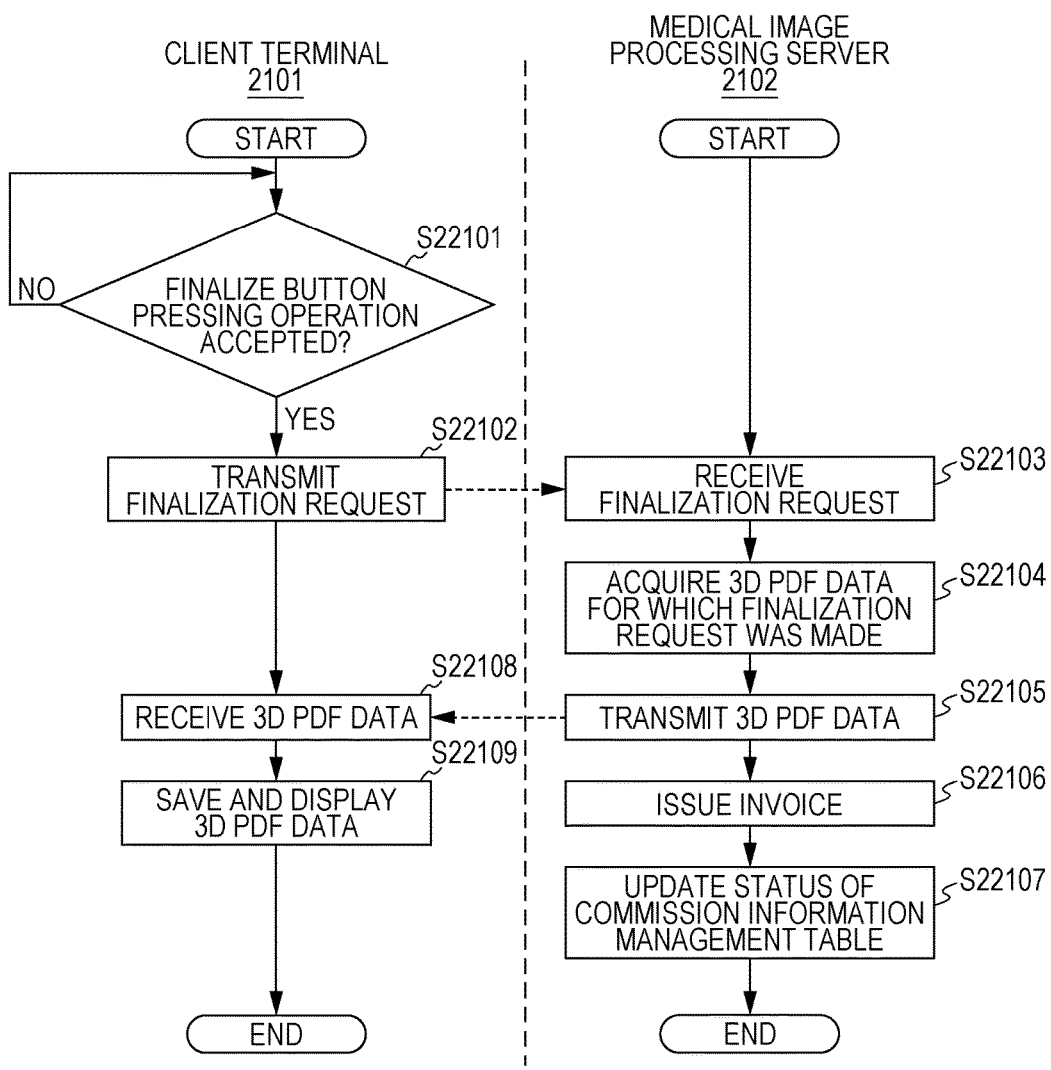

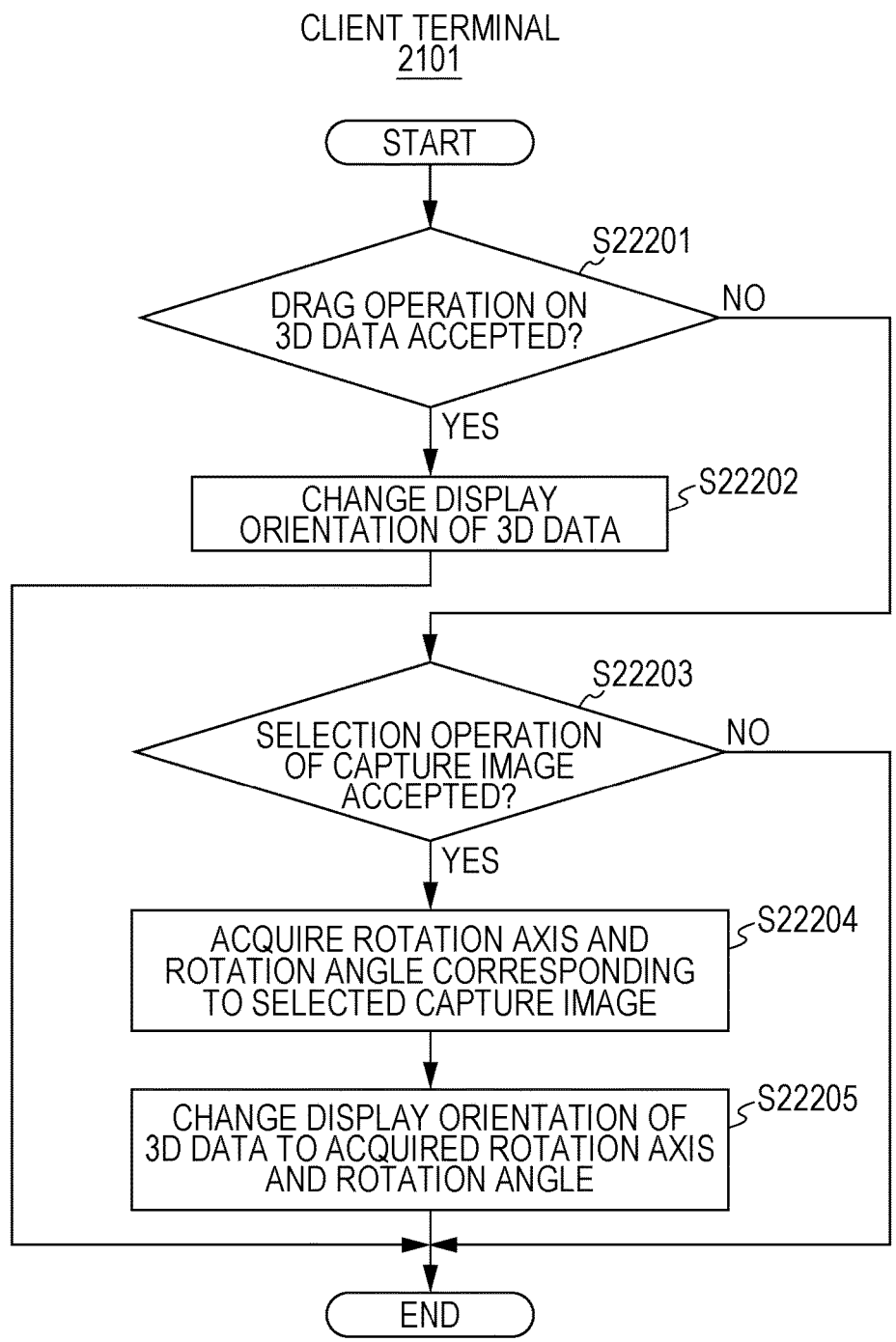

MEDICAL IMAGE PROCESSING SYSTEM, MEDICAL IMAGE PROCESSING APPARATUS, CONTROL METHOD THEREOF, AND RECORDING MEDIUM

BACKGROUND OF THE INVENTION

Field of the Invention

The disclosure in the present specification relates to a medical image processing system, a medical image processing apparatus, a control method thereof, and a recording medium.

Description of the Related Art

There is a mechanism where multiple medical images, generated by modalities such as X-ray computed tomography (CT) or magnetic resonance imaging (MRI), are used to generate volume data on a computer, and volume rendering is performed to three-dimensionally display parts of the human body.

This mechanism is realized by a computer (or application) called a medical 3D workstation. In other words, a user needs to have such an environment to perform 3D display of human body parts using medical images. Accordingly, 3D data is generated in formats such as virtual reality modeling language (VRML) format or STereoLithography (STL) format files representing parts of the human body, and displayed. Thus, 3D display of parts of the human body can be performed even without the above-described environment.

Japanese Patent Laid-Open No. 2013-138763 discloses a mechanism where a contour of a bone is extracted from voxel data generated from multiple medical images, and output as 3D data in the STL format. There also is a mechanism where human body parts are not only displayed in 3D in a virtual manner on a computer, but also output as formed objects formed by a 3D forming apparatus. These formed objects are used in the medical field and in research. Outputting such formed objects from a 3D forming apparatus requires knowledge regarding medicine, knowledge regarding image processing of medical images, and further knowledge regarding 3D forming apparatus, and accordingly is not readily accessible.

A mechanism disclosed in Japanese Patent Laid-Open No. 2002-86576 had a problem in that a user commissioning a service business to form such a formed object needed to know beforehand what sort of formed objects can be formed from medical images sent to the service business. In other words, the commissioning side had to recognize what part of the human body a cross-section medical image being sent shows, and what organs (body parts) are included in that cross-section. Otherwise, there is the possibility that an order might be placed to form an organ that cannot be formed from the medical image. Accordingly, Japanese Patent Laid-Open No. 2002-86576 discloses a mechanism where a formed object of an objective body part can be formed simply by transmitting to the system of the service business medical images, the medical images, the body part which the commissioning part wants output as a formed object, and other instructions necessary for the forming.

As for another problem, the mechanism in Japanese Patent Laid-Open No. 2002-86576 permitted the commissioning user to commission the same formation time after time, leading to a greater processing load on the server at the service business. The service business server performs image processing to extract human body parts from medical images. Volume data needs to be generated to performing forming from medical images at the 3D forming apparatus, and the processing load of extracting a particular part from the generated volume data is greater than with two-dimensional image processing. That is to say, each time the commissioning user forgets that a formation was commission and places the same order again, the server has to perform the image processing just that many times, leading to an increased processing load.

As for another problem, the mechanism in Japanese Patent Laid-Open No. 2013-138763 requires the above-described environment to generate three-dimensional data, after all. That is to say, users who had few opportunities to perform 3D display of human body parts have found it difficult to casually view 3D data. Even if the user were able to prepare the above-described environment, it would be difficult to extract a desired body part unless the user has skills for operating the application and sufficient knowledge of image processing for execution on medical images.

SUMMARY OF THE INVENTION

According to some embodiments of the present invention, a medical image processing system that can accept commissions to perform 3D formation using a 3D forming apparatus includes a storage unit configured to store a medical image, and body part information representing a human body part in the medical image, a selection accepting unit configured to accept selection with regard to the medical image stored in the storage unit, a part identifying unit configured to identify the body part included in the medical image, using the body part information corresponding to the medical image regarding which the selection accepting unit has accepted selection, and a screen generating unit configured to generate a screen that can accept a commission to form a formed object of the body part identified by the part identifying unit.

Further features of the present invention will become apparent from the following description of exemplary embodiments with reference to the attached drawings.

BRIEF DESCRIPTION OF THE DRAWINGS

FIG. 7 is a diagram illustrating a screen configuration of the medical image list screen.

FIG. 9 is a diagram illustrating the table configuration of a formation part management table.

FIG. 10 is a diagram illustrating a screen configuration of the commissioning content input screen.

FIG. 25 is a flowchart diagram illustrating a series of processing for displaying a commissioning content input screen.

FIG. 26 is a diagram illustrating the table configuration of a display part management table.

FIG. 27 is a diagram illustrating a table configuration of a display orientation management table screen.

FIG. 28 is a diagram illustrating a screen configuration of a commission content input screen.

FIG. 31 is a flowchart diagram illustrating a series of processing of accepting commission content.

FIG. 32 is a diagram illustrating the table configuration of a commission information management table.

FIG. 35 is a flowchart diagram illustrating a series of processing of displaying commission results.

FIG. 37 is a flowchart diagram illustrating a series of processing executed in response to an operation accepted at the commission results configuration screen.

FIG. 38 is a flowchart diagram illustrating a series of processing of finalizing commissioning.

FIG. 39 is a flowchart diagram illustrating a series of processing executed in response to an operation accepted at the 3D PDF data.

DESCRIPTION OF THE EMBODIMENTS

An embodiment of the present invention will be described in detail with reference to the drawings. First, an overview of the present invention will be described with reference to FIG. 1. A medical image processing system 100 according to the present invention is a system including a client terminal 101, a medical image processing server 102, and a 3D forming apparatus 103. The client terminal 101 and medical image processing server 102 are communicably connected, and further, the medical image processing server 102 and 3D forming apparatus 103 are communicably connected.

The client terminal 101 transmits medical images generated by modalities such as X-ray CT or MRI to the medical image processing server 102 beforehand. The medical image processing server 102 stores these medical images. The term "medical image" in the present embodiment includes tomographic images generated by one modality or another. The term "medical image" also includes images according to the Digital Imaging and COmmunication in Medicine (DICOM) standard. Accessory information for DICOM includes information of examination date, patient name, type of examination, part or site name, and so forth. That is to say, a medical image includes this information. When storing medical images in the medical image processing server 102, multiple images generated in a single examination are made into a series (grouped) and stored. Note that in the present embodiment, this medical image group that has been made into a series will be referred to as "medical image".

Figure 1:
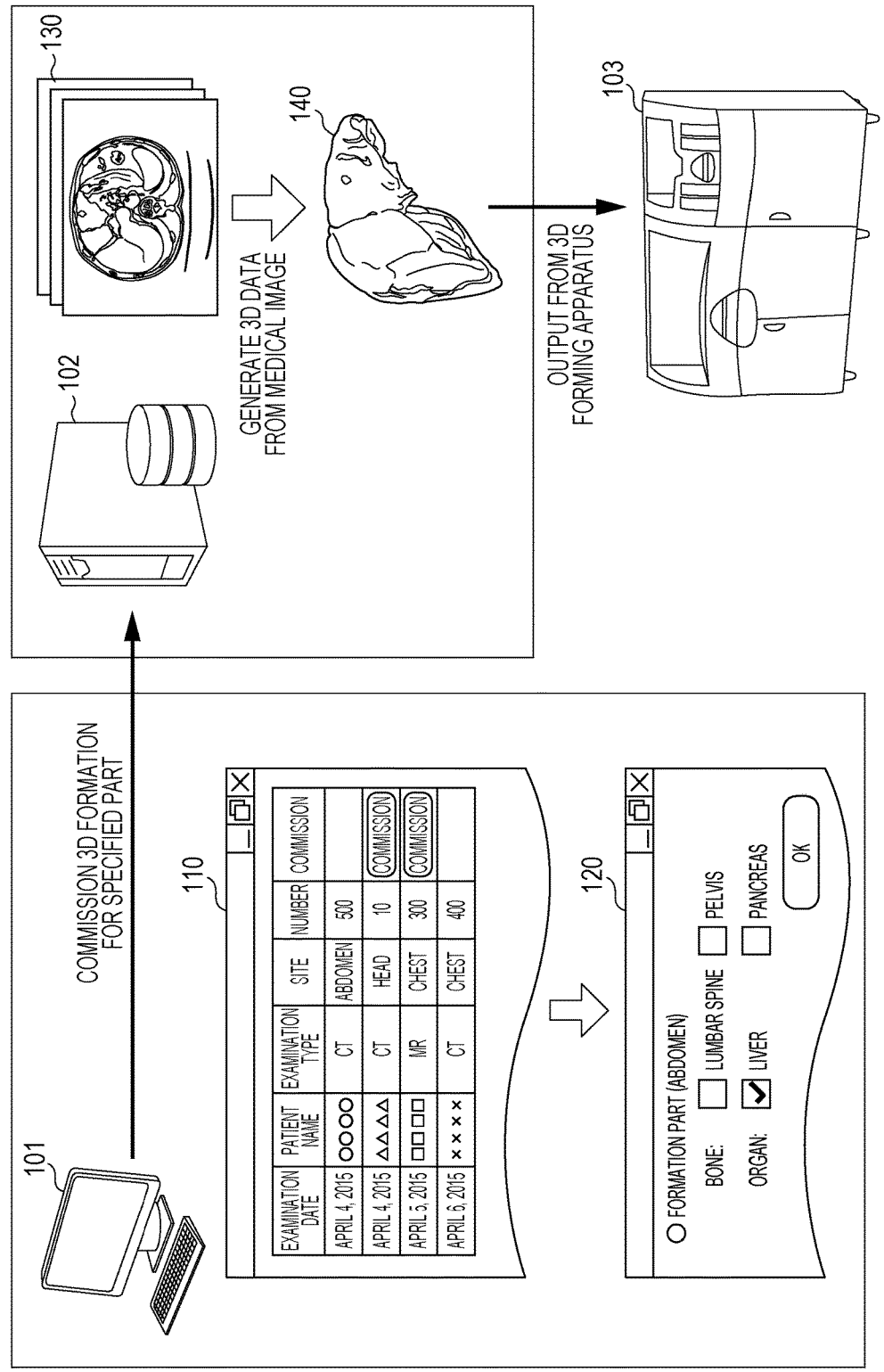
FIG. 1 is a diagram illustrating an overview of the present invention.

In a case where a user of the client terminal 101 wants to form a formed object representing a human body part that is included in a medical image stored in the medical image processing server 102, using a 3D forming apparatus, the client terminal 101 accepts instructions to that effect. A screen such as indicated by reference numeral 110 in FIG. 1 is displayed on a display of the client terminal 101. At the time of generating this image at the medical image processing server 102, a "commission" button for medical images that have already been commissioned is hidden so that such a medical image is not commissioned again. Thus, the commissioning user can identify that a medical image has already be commissioned. This reduces the processing load at the medical image processing server 102, since there are no redundant commissions for formation.

Next, the commissioning user presses the commission button provided to the relevant record of the medical image. Upon detecting this pressing, a screen such as indicated by reference numeral 120 in FIG. 1 is displayed on the display of the client terminal 101. This screen accepts selection of the human body part that the user wants to form.

Upon the user selecting the part to form, and the client terminal 101 detects pressing of an OK button, a formation commission is transmitted form the client terminal 101 to the medical image processing server 102. The medical image processing server 102 accepts this commission, and generates volume data using the relevant medical image. Volume data is data where medical images are layered three-dimensionally, and a CT number (a relative value where water is 0 and air is −1000) that each pixel in the medical image has is given as a parameter to a voxel corresponding to that pixel. The medical image processing server 102 applies visual information (color, viewpoint, slight source, gloss, etc.) to the volume data, thereby generating 3D data. This 3D data is data representing a 3D model in the VRML format or STL format, for example.

This sort of data that can be formed at the 3D forming apparatus 103 (hereinafter referred to as forming job) is generated by a driver (hereinafter referred to as 3D forming driver, the forming job is transmitted to the 3D forming apparatus 103, and a formed object is output. In this mechanism where formation of human body parts using a medical image is commissioned and forming is performed at a 3D forming apparatus, hiding the commission button for medical images that have already been commissioned realizes a screen where redundant formation commissioning cannot be accepted, and the user cannot perform redundant formation commissioning. This overview will be described in further detail.

Figure 2:
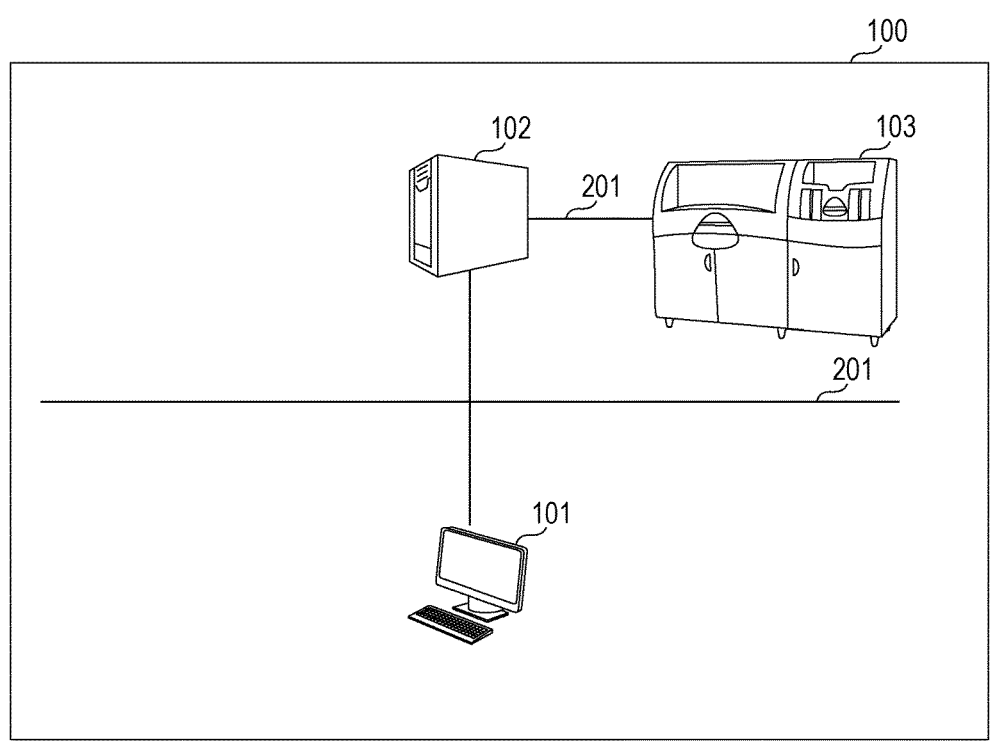
FIG. 2 is a diagram illustrating the configuration of a medical image processing system.

FIG. 2 is a diagram illustrating the system configuration of the medical image processing system 100. Note that the system configuration illustrated in FIG. 2 is only exemplary. The medical image processing system 100 is a system including the client terminal 101, medical image processing server 102, and 3D forming apparatus 103. The client terminal 101 and medical image processing server 102, and the medical image processing server 102 and 3D forming apparatus 103, are each communicably connected via a local area network (LAN) 201 or the Internet or the like. An arrangement may also be made where the 3D forming apparatus 103 is not included in the medical image processing system 100.

The client terminal 101 is one or multiple devices at the side of the commissioning user that commissions 3D formation. The client terminal 101 may be a personal computer, or may be a mobile terminal (cellular phone, smartphone, wearable device, etc.) or the like.

The medical image processing server 102 (medical image processing apparatus) is one or multiple devices at the side of a business that accepts commissions for 3D forming. Although a server device is assumed as the medical image processing server 102, any device capable of processing commissions from the client terminal 101 may be used.

The 3D forming apparatus 103 is one or multiple apparatuses that output 3D formed objects (a so-called 3D printer). A business may own the 3D forming apparatus 103, or a different arrangement may be used. The method of formation that the 3D forming apparatus 103 uses may be additive layer manufacturing, ultrasonic additive manufacturing, or any other of the many methods that exist. The material of the object to be formed may be resin, metal, rubber, or any other of the many material that exist, and is not restricted in particular. The medical image processing server 102 preferably is communicably connected with various types of 3D forming apparatuses 103, to give the commissioning party a wider range of options when commissioning.

Figure 3:
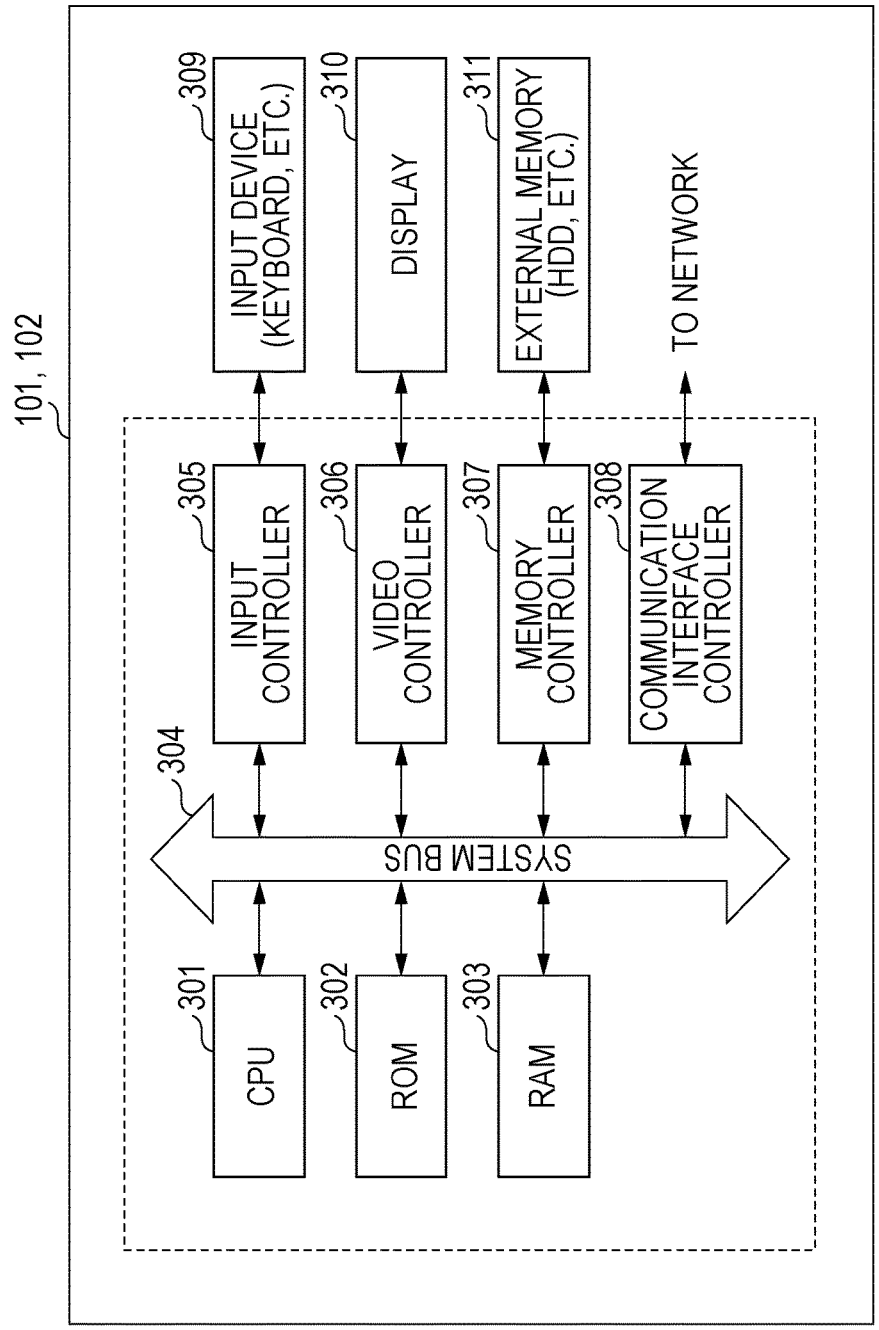
FIG. 3 is a diagram illustrating the hardware configuration of a client terminal and a medical image server.

FIG. 3 is a diagram that illustrates the hardware configuration of the client terminal 101 and medical image processing server 102. Note that the hardware configuration in FIG. 3 is only exemplary. A central processing unit (CPU) 301 centrally controls various devices and controllers connected to a system bus 304.

Read-only memory (ROM) 302 or external memory 311 store a basic input/output system (BIOS) and an operating system program, which are control programs for the CPU 301. The external memory 311 also stores programs that are necessary for the devices to realize the functions that they execute. Random access memory (RAM) 303 functions as main memory, work area, and so forth, for the CPU 301.

The CPU 301 loads programs and the like necessary to execute processing to the RAM 303, and executes the programs, thereby realizing the various types of operations. An input controller 305 controls input from an input device 309 such as a keyboard or a pointing device like a mouse or the like. A video controller 306 controls display on a display device such as a display 310 or the like. The display device may be a cathode radio tube (CRT), liquid crystal display, or the like.

A memory controller 307 controls access to the external memory 311. Examples of the external memory 311 include a hard disk, flexible disk, card-type memory connected to a Personal Computer Memory Card International Association (PCMCIA) card slot via an adapter, and so forth. The external memory 311 (storage unit) stores a boot program, browser software, various types of applications, font data, user files, editing files, various types of data, and so forth.

A communication interface controller 308 is for connection to and communication with external devices via a network, and executes communication control processing on the network. For example, Internet communication using TCP/IP can be performed.

The CPU 301 also enables display to be made on the display 310 by rendering (rasterizing) outline fonts to a display information area in the RAM 303. The CPU 301 further also enables user instructions on the display 310 by a mouse cursor or the like, omitted from illustration.

The various types of programs and the like used for the client terminal 101 and medical image processing server 102 to execute various types of processing that will be described later, are recorded in the external memory 311. These various types of programs and so forth are loaded to the RAM 303 as necessary, and thus are executed by the CPU 301. Further, definition files various types of information tables used by programs according to the present invention are stored in the external memory 311.

Figure 4:
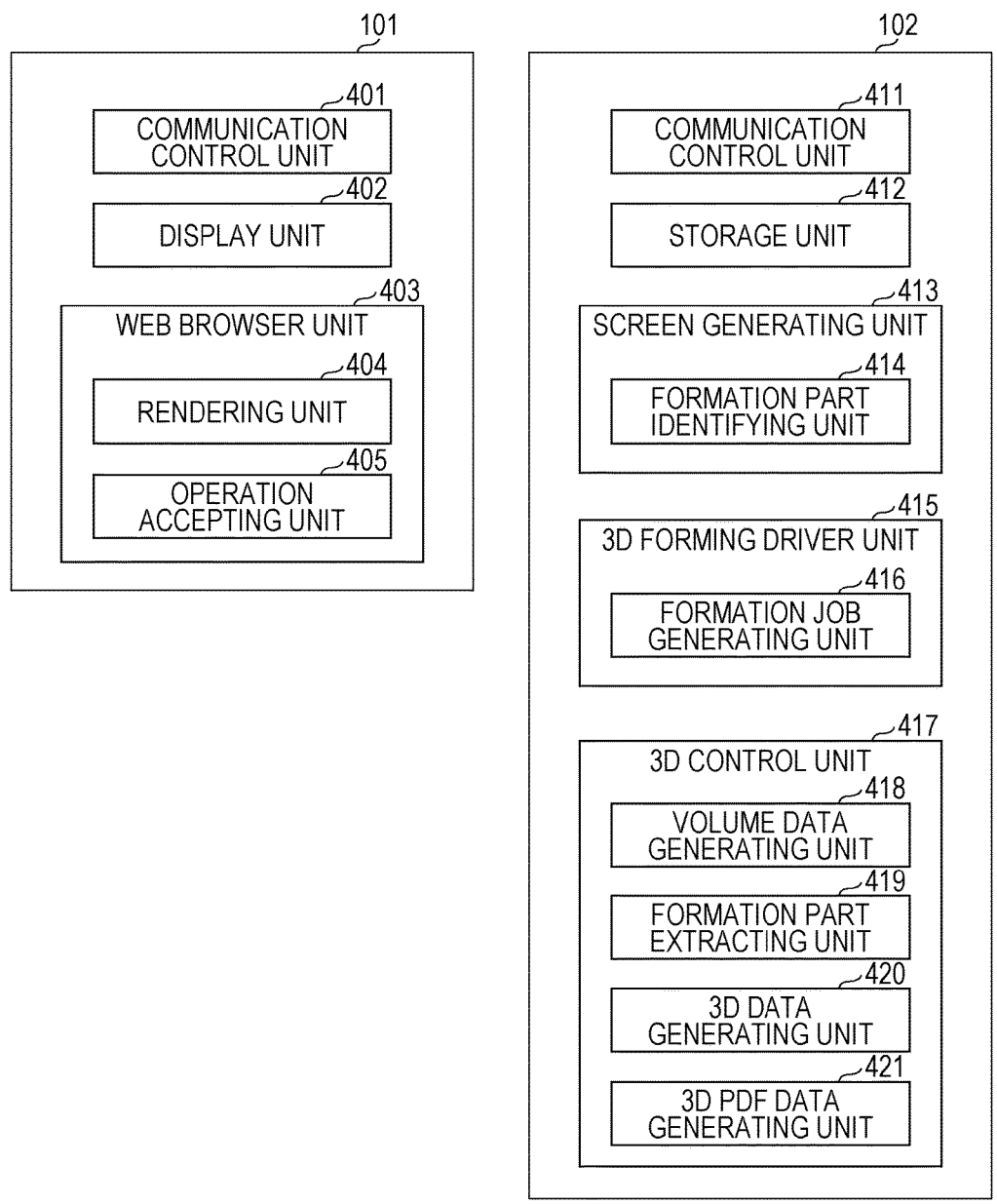
FIG. 4 is a diagram illustrating the functional configuration of the client terminal and the medical image processing server.

FIG. 4 is a diagram illustrating an example of the functional configuration of the client terminal 101 and medical image processing server 102. The functions illustrated in FIG. 4 are the components realized by the hardware arrangements, various types of programs, and so forth, illustrated in FIG. 2. Note that the functional configuration illustrated in FIG. 4 is only exemplary. The client terminal 101 includes a communication control unit 401, a display unit 402, and a Web browser unit 403, as functional units.

The communication control unit 401 is a functional unit for exchanging various types of information with the medical image processing server 102. The communication control unit 401 communicates with the medical image processing server 102 on the network via the communication interface controller 308 of the client terminal 101.

The display unit 402 is a functional unit for displaying various types of information. The display unit 402 transmits images including various types of information to the display 310 via the video controller 306 of the client terminal 101, so as to display the various types of information on the display 310.

The Web browser unit 403 is a functional unit for displaying and operating Web pages (referred to as "screens" in the present embodiment), described in HyperText Markup Language (HTML). The Web browser unit 403 further includes a rendering unit 404 and an operation accepting unit 405.

The rendering unit 404 is a functional unit that analyzes the contents described in the Web page, and displays characters and images on the display. The operation accepting unit 405 is a functional unit that accepts operations made regarding the Web page. The operation accepting unit 405 also transmits acquisition requests for Web pages and files to the medical image processing server 102 via the communication control unit 401, in accordance with accepted operations.

The medical image processing server 102 includes, as functional units, a communication control unit 411, a storage unit 412, a screen generating unit 413, a 3D forming driver unit 415, and a 3D control unit 417.

The communication control unit 411 is a functional unit that exchanges various types of information with the client terminal 101 and 3D forming apparatus 103. The communication control unit 411 communicates with the client terminal 101 and 3D forming apparatus 103 on the network via the communication interface controller 308 of the medical image processing server 102.

The storage unit 412 is a functional unit that stores various types of information in the RAM 303 or external memory 311. Examples of the various types of information that the storage unit 412 stores includes various types of tables that will be described later, templates for Web pages to be displayed at the client terminal 101, and so forth.

The screen generating unit 413 is a functional unit that generates screens (Web pages) to be displayed on the client terminal 101. The screen generating unit 413 generates screens using the various types of information stored in the storage unit 412. The screen generating unit 413 further includes a formation part identifying unit 414.

The formation part identifying unit 414 is functional unit that acquires medical images instructed by the client terminal 101 from the storage unit 412, and identifies human body parts that can be formed from the medical images. The formation part identifying unit 414 identifies formable human body parts from information of the examined parts included in the DICOM information of the medical images.

The 3D forming driver unit 415 is a functional unit that gives formation instructions to the 3D forming apparatus 103. The 3D forming driver unit 415 further includes a formation job generating unit 416.

The formation job generating unit 416 is a functional unit that generates a formation job for formation of the 3D data generated by a later-described 3D data generating unit 420, using the 3D forming apparatus 103. The method of generating a formation job for formation at the 3D forming apparatus 103 is conventional art, and will be described later.

The 3D control unit 417 is a functional unit for performing control such as generating and displaying three-dimensional data in three-dimensional space. The 3D control unit 417 further includes a volume data generating unit 418, a formation part extracting unit 419, the 3D data generating unit 420, and a 3D PDF data generating unit 421.

The volume data generating unit 418 is a functional unit that generates volume data from medical images. The volume data generating unit 418 generates volume data using multiple medical images. In a case where medical images to generate volume data are insufficient, the volume data generating unit 418 interpolates for insufficient portions. The method of generating volume data is conventional art, and will be described later.

The formation part extracting unit 419 is a functional unit that extracts the human body part selected at the client terminal 101 from the volume data. The storage unit 412 stores a known algorithm for extracting each human body part, and the formation part extracting unit 419 selects the necessary algorithm from the storage unit 412 to perform extracting. The method of extracting particular body parts from volume data, and the algorithms thereof, also are conventional art, and will be described later.

The 3D data generating unit 420 is a functional unit that generates 3D data using the volume data from which the formation part extracting unit 419 has extracted a particular body part. The 3D data generating unit 420 generates 3D data in formats that the 3D forming driver unit 415 can analyze, such as the VRML and STL formats.

The 3D PDF data generating unit 421 is a functional unit that generates Portable Document Format (PDF) data including 3D data (hereinafter referred to as 3D PDF data). The 3D PDF data is PDF data where the user can view 3D data from any viewpoint. The method of generating the 3D PDF data also is conventional art, and will be described later.

Figure 5:
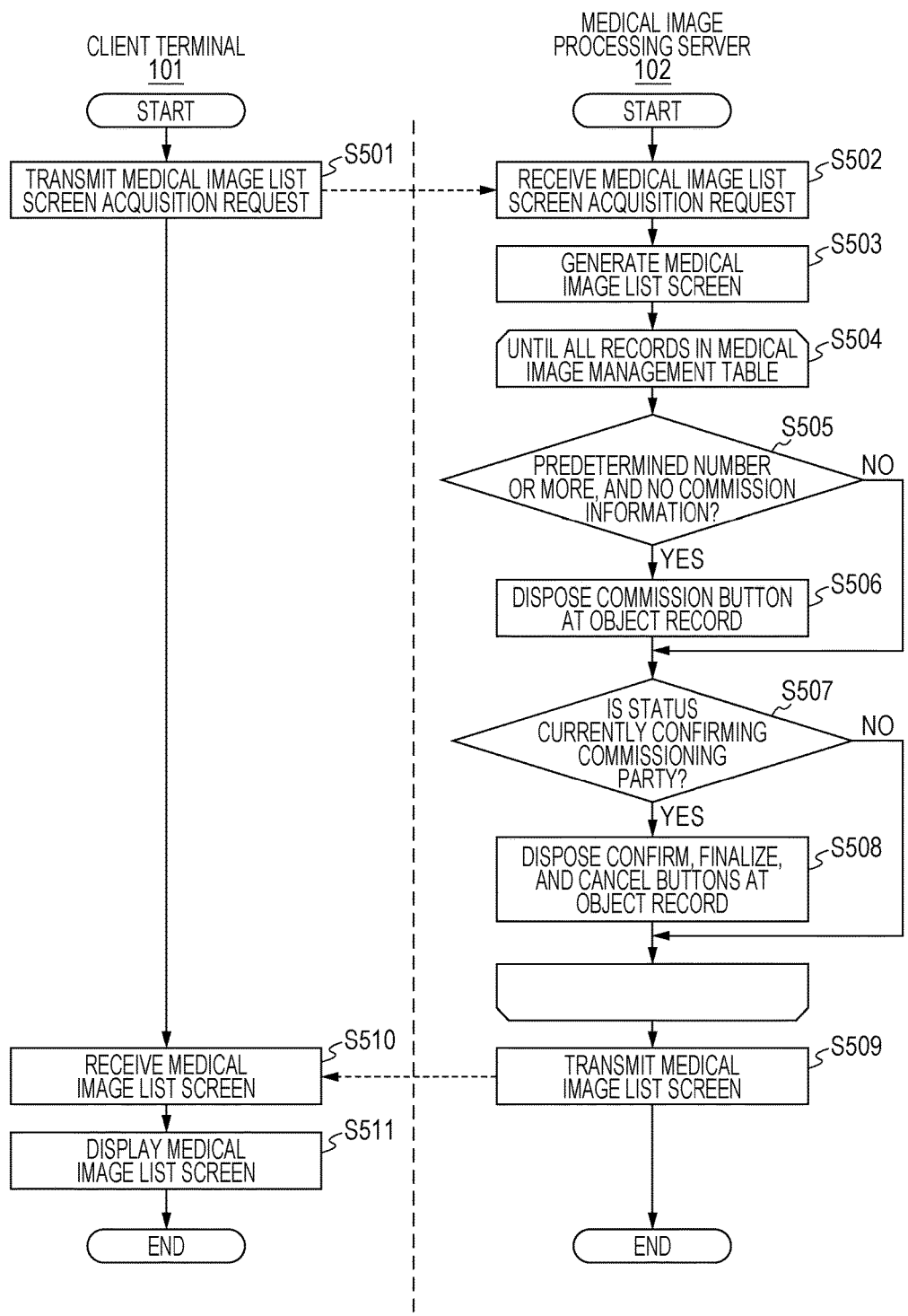
FIG. 5 is a flowchart diagram illustrating a series of processing for displaying a medical image list screen.

FIG. 5 is a diagram illustrating a series of processing for displaying a medical image list screen 700. The steps of step S501, step S509, and step S510 are processing executed by the CPU 301 of the client terminal 101. The steps of step S502 through step S508 in FIG. 5 are processing executed by CPU 301 of the medical image processing server 102. Note that the contents of processing and the order of processing illustrated in FIG. 5 are only exemplary, and are not restrictive.

In step S501, the communication control unit 411 of the client terminal 101 transmits an acquisition request for a medical image list screen to the medical image processing server 102.

Figure 6:
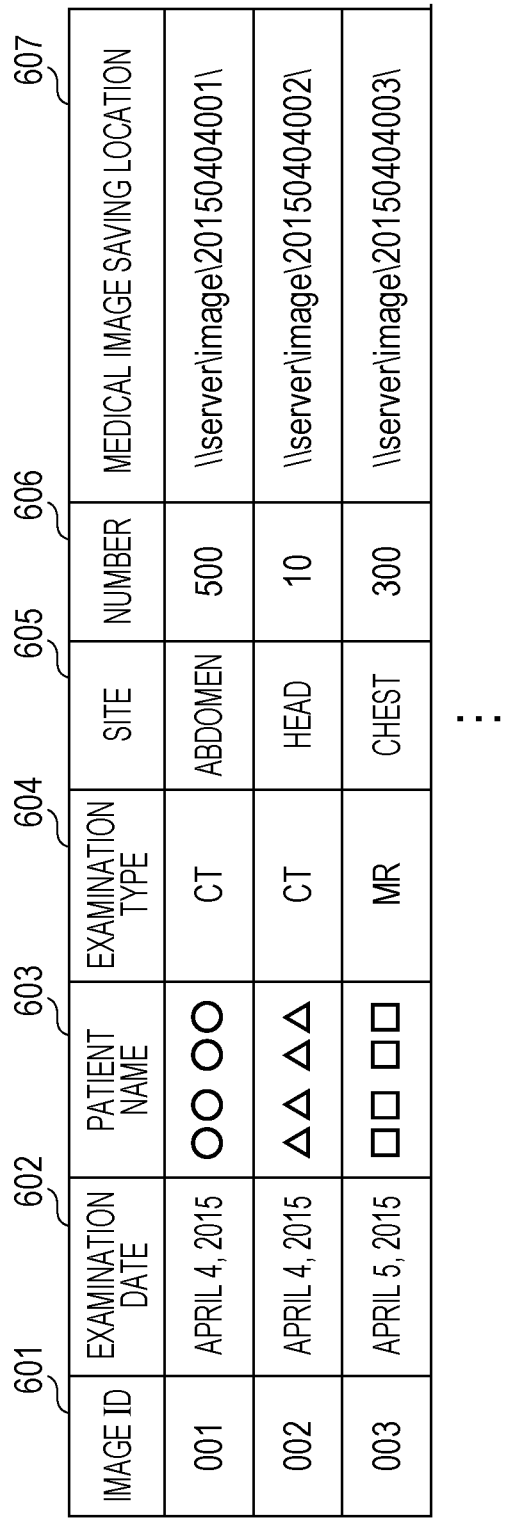
FIG. 6 is a diagram illustrating the table configuration of a medical image management table.

In step S502, the communication control unit 411 of the medical image processing server 102 receives the acquisition request for the medical image list screen transmitted from the client terminal 101. In step S503, the screen generating unit 413 of the medical image processing server 102 acquires a template for a medical image list screen from the storage unit 412 and information stored in a medical image management table 600 illustrated in FIG. 6, and generates a medical image list screen 700 such as illustrated in FIG. 7. The medical image list screen 700 includes a medical image list 701, with a record being created in the medical image list 701 for each record in the medical image management table 600. A corresponding image ID 601 is embedded in each record in the medical image list 701.

When creating the screen in step S502, none of a commission button 702, confirm button 703, finalize button 704 and cancel button 705, which are laid out in later-described processing, are disposed yet. Further, the medical image list 701 includes a display button 706 for each medical image record. The display button 706 is for displaying the medical image. Accordingly, the display button 706 is disposed as a button to acquire the medical image corresponding to the record where the display button 706 is disposed from a medical image saving location 607, and displaying the medical image.

The medical image management table 600 is a table for storing information relating to medical images stored in the external memory 311 of the medical image processing server 102. The medical image management table 600 is stored in the external memory 311 of the medical image processing server 102. Upon receiving a medical image from the client terminal 101 or an apparatus of one modality or another, a new record is created in the medical image management table 600, various types of information are acquired from the medical image DICOM tag, and stored in the medical image management table 600. Note that the table configuration of the medical image management table 600 illustrated here is only exemplary, and is not restrictive.

Items of the medical image management table 600 are image ID 601, examination date 602, patient name 603, examination type 604, site 605, number 606, and medical image saving location 607. The image ID 601 is an item storing identification information that is uniquely allocated to each medical image that has been received. The examination date 602 is an item storing the date on which the medical image was imaged by an apparatus of one modality or another. The patient name 603 is an item storing the full name of the patient. The site 605 is an item storing the site of imaging the medical image. The number 606 is an item storing the number of received medical images that are stored. The medical image saving location 607 is an item sorting information indicating a folder where the medical images are stored.

In step S504, the screen generating unit 413 of the medical image processing server 102 references one of the records in the medical image management table 600. Upon having completed the steps of step S505 through step S508 regarding the referenced record, determination is made regarding whether or not the processing of step S505 through step S508 has been completed for all records in the medical image management table 600. If determination is made that the processing has been completed, the flow advances to step S509. That is to say, step S505 through step S508 are looped through for all records in the medical image management table 600. The individual steps in step S505 through step S508 will be described next.

Figure 12:
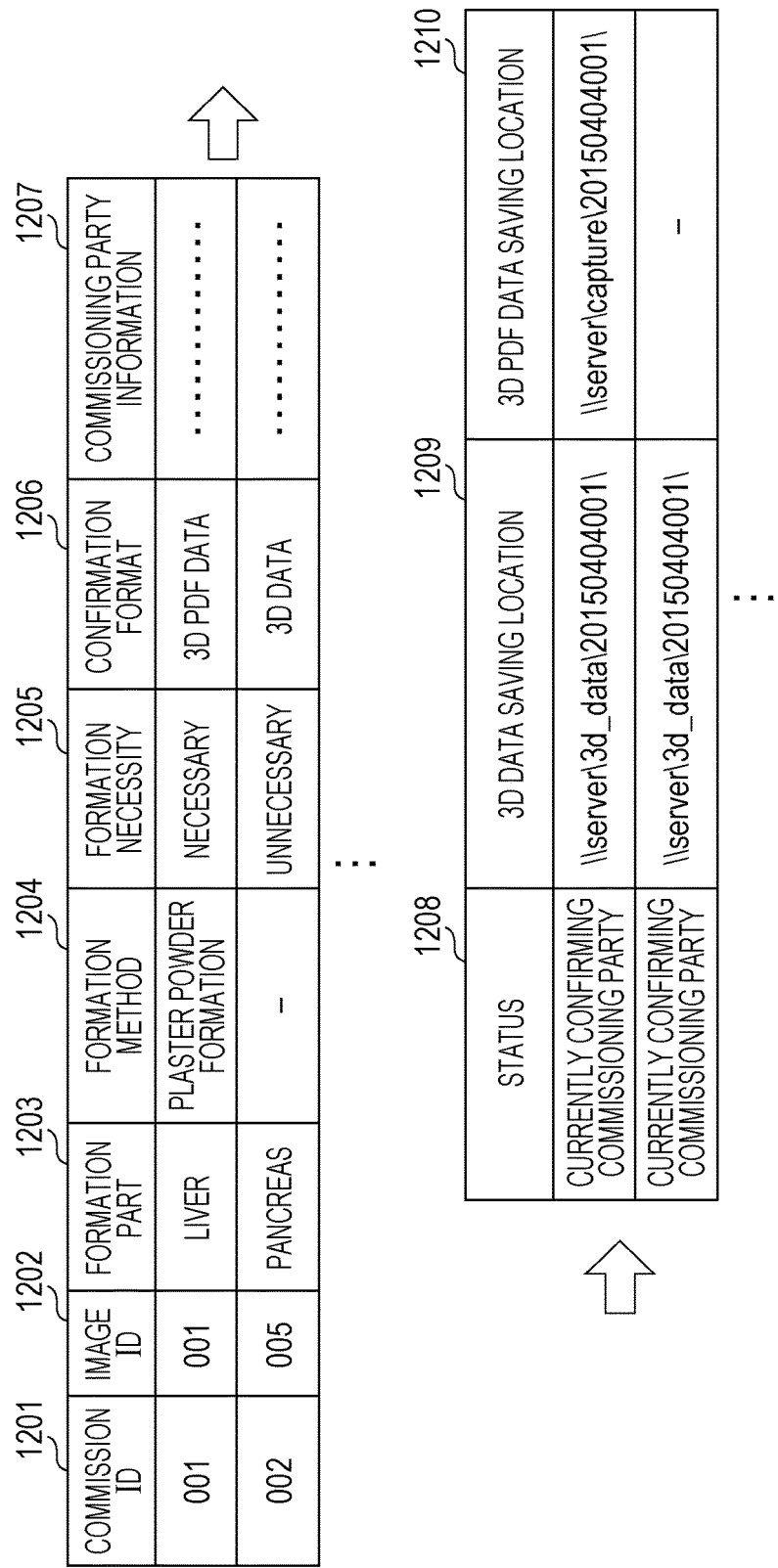
FIG. 12 is a diagram illustrating the table configuration of a commission information management table.

In step S505, the screen generating unit 413 of the medical image processing server 102 determines whether the number of medical images of the record being referenced in the number 606 is a predetermined number or more, and also that commission information of the medical images does not exist in a commission information management table 1200 illustrated in FIG. 12. If both are true, the flow advances to step S506, and otherwise, the flow advances to step S507. Determination may also be made regarding whether the number of medical images is larger than the predetermined number, and also that no commission information exists. The number of medical images is set beforehand, to a number from which volume data indicating body parts can be generated from medical images. Alternatively, the number may be based on a number that will keep coarseness in the generated volume data to an inconspicuous level, or a number where the output formed object will have smooth curved surfaces.

The commission information management table 1200 is a data table storing information relating to formation commissions. One record of the commission information management table 1200 is referred to as "commission information" in the present embodiment. Details of the commission information management table 1200 will be described later.

In step S506, the screen generating unit 413 of the medical image processing server 102 disposes the commission button 702 (accepting portion) to the record of the medical image list 701 corresponding to the record being referenced. The commission button 702 is a button that can accept a formation commission (formation instructions) of human body parts from a medical image. A medical image that has a sufficient number is a medical image regarding which a formation commission can be made, so the commission button 702 is disposed thereat. Further, in a case where a formation commission can be made but a formation commission has already been made, a redundant commission raises the processing load on the medical image processing server 102. Accordingly, in a case where a formation commission can be made but a formation commission has already been made, the commission button 702 is not provided, while the commission button 702 is provided if no formation commission has been made yet. By distinguishing this display from one medical image to another, the processing load on the medical image processing server 102 can be reduced, and the user can recognize each medical image regarding which a formation commission has already been made. Moreover, as a result of the determination in step S505, in a case where the number of medical images is less than the predetermined number (or may be equal to or less), step S506 is not executed, so no commission button 702 is provided for the record of this medical image. Accordingly, the user can be prevented from making formation commissions of medical images with an insufficient number.

Although an arrangement has been described where further formation instructions are not given for medical image records that have already been commissioned by not disposing the commission button, but an arrangement may be made where the commission button is displayed in a way that the button cannot be pressed, thereby facilitating user comprehension that the commissioning has already been performed. Alternatively, an arrangement may be made where the commission button is displayed in a different color or shape, or with a different text string, thereby facilitating user comprehension that the commissioning has already been performed. Further, an arrangement may be made where the commission button is disposed, and the disposed commission button can be pressed, but an error is returned when the commission button is pressed and no formation commission is placed.

In step S507, the screen generating unit 413 of the medical image processing server 102 determines whether or not commission information corresponding to the medical image of the record being referenced, and whether or not a status 1208 of the commission information is "currently confirming commissioning party". That is to say, determination is made regarding whether or not formation using the medical image of the record being reference has already been commissioned, and commission results corresponding to the commission have already been output. If so, the flow advances to step S508, and otherwise, the flow is returned to step S504 and whether or not the loop has been completed is determined. In a case where determination is made that the loop has been completed, the flow advances to step S509.

In step S508, the screen generating unit 413 of the medical image processing server 102 disposes the confirm button 703, finalize button 704, and cancel button 705 at the record of the commission button 702 corresponding to the record being referenced in the medical image list 701.

The confirm button 703 is a button for confirming the commission results. In a case where the confirmation format 1206 of the commission information is 3D data, the confirm button 703 is a button for downloading the 3D data of the confirmation results from a saving location indicated by a 3D data saving location 1209. On the other hand, in a case where the confirmation format 1206 of the commission information is 3D PDF data, the confirm button 703 is a button for displaying 3D PDF data of the commission results from a saving location indicated by 3D PDF data saving location 1210. That is to say, the operations in a case where the confirm button 703 is pressed is decided according to the confirmation format selected by the user, who is the commissioning party. The display form of the confirm button 703 is changed to enable recognition of whether a 3D data download button or a 3D PDF data display button. For example, this recognition can be enabled by changing the color of the confirm button 703.

The finalize button 704 is a button for finalizing the commission. The cancel button 705 is a button for canceling the commission. The confirm button 703 is thus displayed in a case where commission results are output, so the user who is the commissioning part can recognize for each medical image whether or not commission results have been output, due to the display being identified in this way.

When step S508 is complete, the flow returns to step S504 and determination is made regarding whether or not the loop has been completed. If determination is made regarding that the loop has been completed, the flow advances to step S509.

In step S509, The communication control unit 411 of the medical image processing server 102 transmits the medical image list screen 700 generated in step S503 through step S508 to the client terminal 101.

In step S510, the communication control unit 401 of the client terminal 101 receives the medical image list screen 700 transmitted from the medical image processing server 102. In step S511, the rendering unit 404 of the client terminal 101 renders the received medical image list screen 700, and the display unit 402 displays the rendering results on the display 310 of the client terminal 101.

After displaying the medical image list screen 700, the client terminal 101 executes the flowcharts illustrated in FIGS. 8, 14, 16, and 17, by parallel processing.

Figure 8:
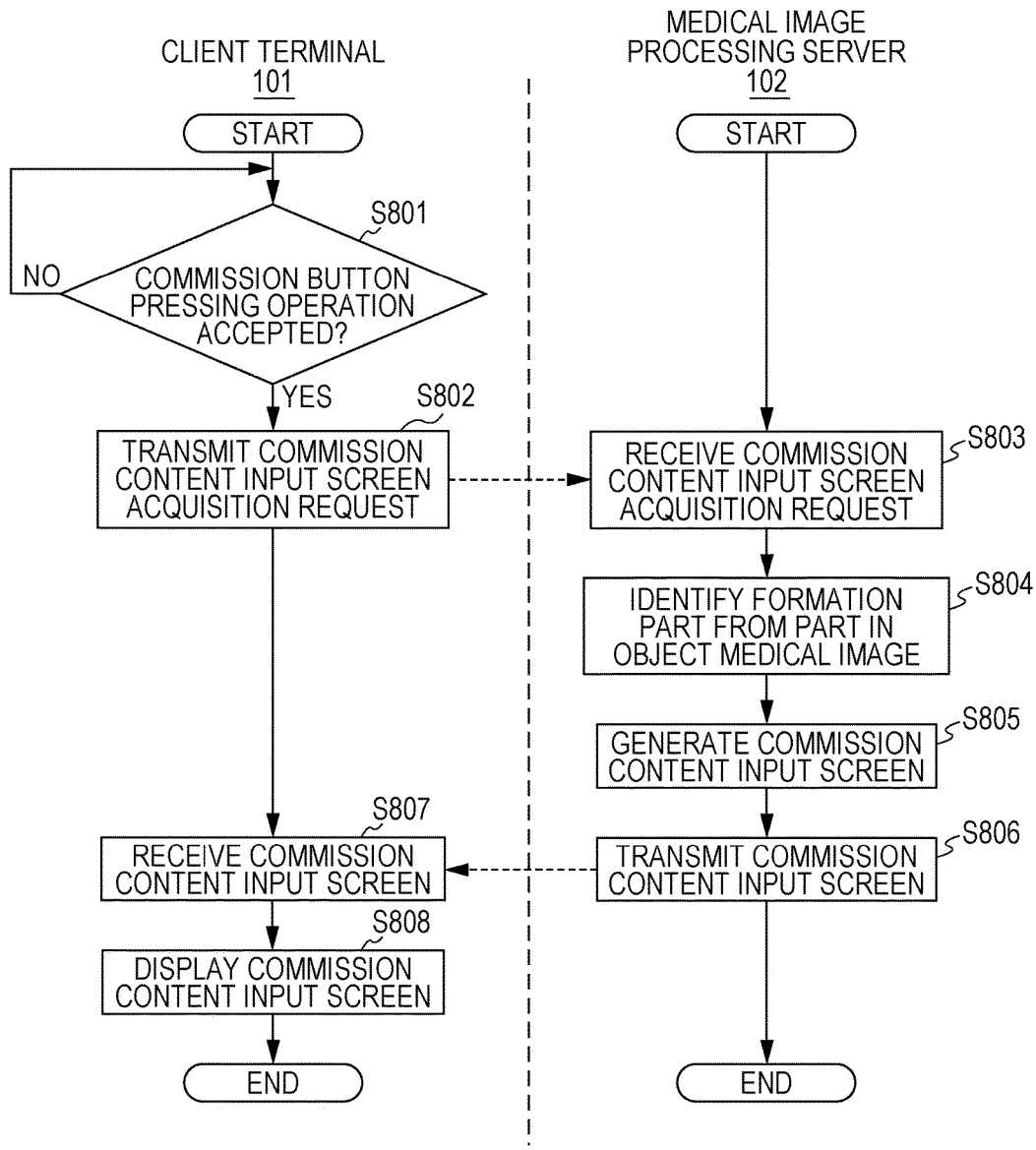
FIG. 8 is a flowchart diagram illustrating a series of processing for displaying a commissioning content input screen.

FIG. 8 is a flowchart diagram illustrating a series of processing for displaying a commissioning content input screen 1000. The steps of step S801, step S802, step S807, and step S808 in FIG. 8 are processing executed by the CPU 301 of the client terminal 101. The steps of step S803 through step S806 in FIG. 8 are processing executed by CPU 301 of the medical image processing server 102. Note that the contents of processing and the order of processing illustrated in FIG. 8 are only exemplary, and are not restrictive.

In step S801, the operation accepting unit 405 of the client terminal 101 determines whether or not an operation of pressing the commission button 702 in the medical image list screen 700 has been accepted. In a case where determination is made that an operation of pressing the commission button 702 has been accepted, the flow advances to step S802. In a case where determination is made that an operation of pressing the commission button 702 has not been accepted, the flow stands by.

In step S802, the Web browser unit 403 of the client terminal 101 acquires the image ID embedded in the record of the commission button 702 that has accepted a pressing operation. The communication control unit 401 of the client terminal 101 then transmits to the medical image processing server 102 an acquisition request for a commission content input screen, for the formation commission of the medical image that this image ID indicates ("object medical image") in FIG. 8.

In step S803, the communication control unit 411 of the medical image processing server 102 receives the acquisition request for the commission content input screen transmitted from the client terminal 101.

In step S804, the formation part identifying unit 414 of the medical image processing server 102 identifies the formation part from the part of the object medical image. That is to say, parts that can be formed from the object medical image are identified. This will be described in detail. The site 605 and examination type 604 of the object medical image are referenced, and identifies records having a site 901 and examination type 902 matching these from a formation part management table 900 illustrated in FIG. 9. The formation part management table 900 is a data table stipulating formation parts 904 that can be formed for each site 901. That is to say, a formation part 904 in an identified record is a part that can be formed from the medical image. Although description is made in the present embodiment that parts that can be formed from medical images are identified using such a formation part management table 900, parts that can be formed may be identified by analyzing medical images instead. That is to say, medical images may be analyzed by image processing, and analysis made regarding what parts are in the image. A method may also be used where the medical image is formed into volume data and three-dimensionally analyzed.

The formation part management table 900 is a data table for storing information relating to human body parts to be formed by the 3D forming apparatus. The formation part management table 900 is stored in the external memory 311 of the medical image processing server 102. Note that the configuration of the formation part management table 900 is only exemplary, and is not restrictive.

The formation part management table 900 contains the items of site 901, examination type 902, type of organ 903, formation part 904, and extraction algorithm 905. The site 901 is an image storing information indicating the range of the human body in which the formation part 904 is included. The examination type 902 is an item storing information indicating the modality of examination type, such as X-ray CT, MRI, or the like. The type of organ 903 is an item storing information that indicating the type of organ to which the formation part 904 belongs. The display position of the formation part 904 in a later-described formation part selection space 1001 is decided in accordance with the type of organ 903. For example, a formation part 904 is displayed for each classification indicated by the type of organ 903. The formation part 904 is an item storing information indicating parts that can be formed. The extraction algorithm 905 is an item storing information indicating a known algorithm for extracting the formation part 904 from the medical image. This formation part management table 900 is stored in the external memory 311 of the medical image processing server 102 beforehand, by the user who manages the medical image processing server 102.

In step S805, the screen generating unit 413 of the medical image processing server 102 generates a commission content input screen that can accept selection regarding parts that can be formed, identified in step S804.

Figure 10:
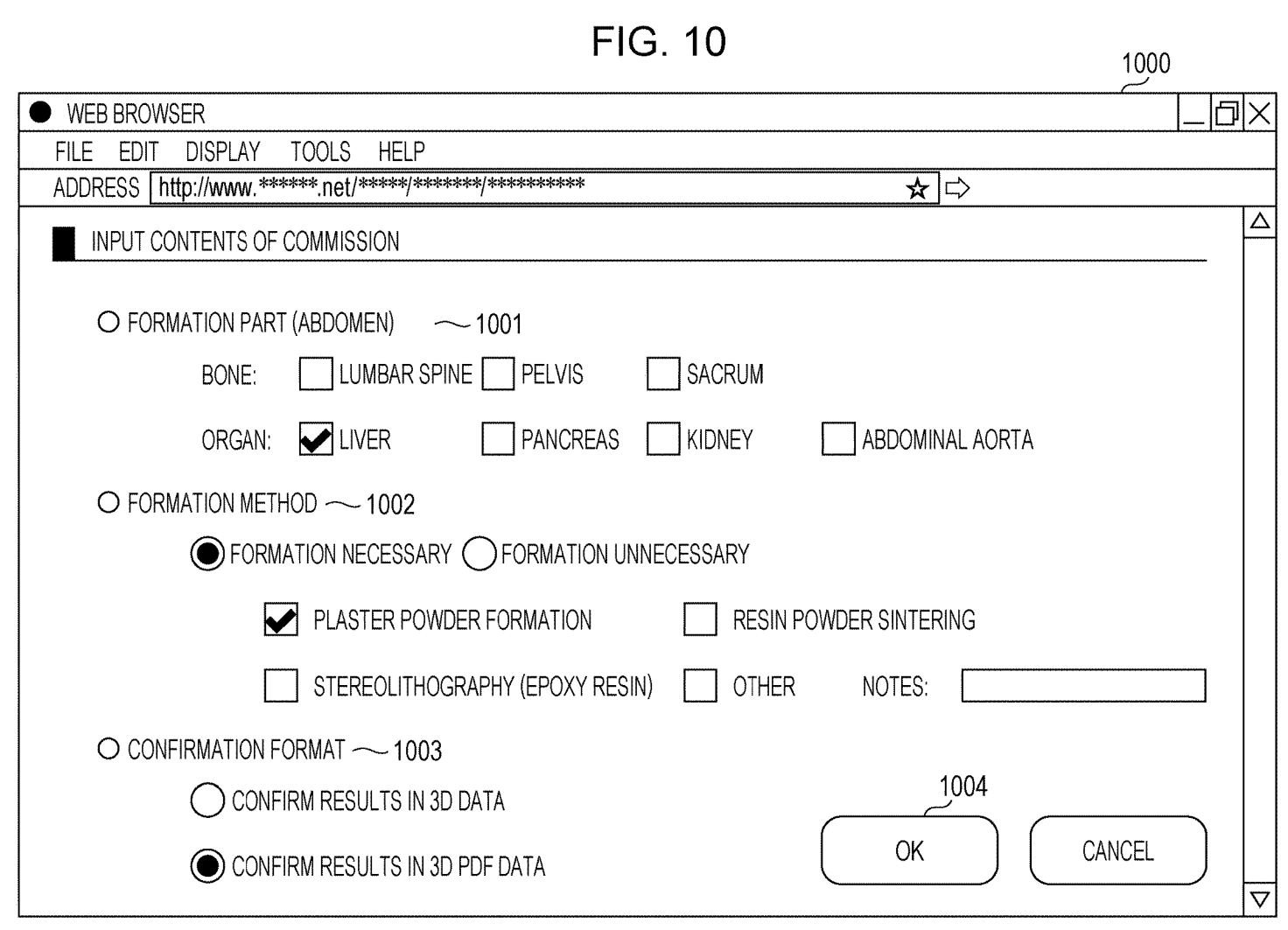

FIG. 10 illustrates an example of the commission content input screen 1000. The commission content input screen 1000 has a formation part selection space 1001, a formation method section space 1002, a conformation format selection space 1003, and an OK button 1004. The formation part selection space 1001 is a checkbox style selection space for the user, who is the commissioning party, to select the human body part to be formed. This selection space accepts selection of body parts identified in step S804. That is to say, selection of parts not identified in step S804 is not accepted. A selection space that only includes parts identified in step S804 is preferable. This arrangement enables selection of parts that can be formed, identified from the object medical image, to be accepted, so even if the user, who is the commissioning party, does not have extensive knowledge of medical images, commissioning formation of parts than cannot be formed can be prevented.

Although description has been made that commissioning formation of parts than cannot be formed is suppressed by not providing any selection space for parts not identified in S804, an arrangement may be made where spaces for these parts are provided, but displayed as selection spaces that cannot be selected. Alternatively, these selection spaces may be displayed in different colors or shapes, or with the text string struck out. Further, an arrangement may be made where these items can be selected, but the OK button 1004 cannot be pressed. For example, the OK button 1004 may be hidden, or the color or shape changed. Further, control may be effected so that a formation commission is not performed by returning an error in a case where the OK button 1004 is pressed.

The formation method section space 1002 is a selection space for selecting whether or not formation at the 3D forming apparatus 103 is necessary. Whether or not formation is necessary is selected by radio buttons, and the method by checkboxes. Selecting necessary enables the formation method to be selected. If formation unnecessary is selected, data of the format selected at the conformation format selection space 1003 is generated, but formation at the 3D forming apparatus 103 is not performed. That is to say, the user, who is the commissioning party, can performing commissioning in order to acquire 3D data or 3D PDF data. The conformation format selection space 1003 is a selection space to select the confirmation format for confirming what sort of three-dimensional image the human body part that has been selected by the user, who is the commissioning party, will be. There are two types in the present embodiment; 3D data and 3D PDF data. The OK button 1004 is a button for transmitting the commission contents accepted at the commission content input screen 1000 to the medical image processing server 102. Image ID 601 of the object medical image is embedded in the OK button 1004. Although omitted from illustration in the commission content input screen 1000 in FIG. 10, an input form for inputting commissioning party information of the user, such as name, contact information (telephone number, address), and so forth, is also provided. The commission content input screen 1000 also accepts the material to be used by the 3D forming apparatus 103.

In step S806, the communication control unit 411 of the medical image processing server 102 transmits the commission content input screen 1000 generated in step S805 to the client terminal 101.

In step S807, the communication control unit 401 of the client terminal 101 receives the commission content input screen 1000 transmitted from the medical image processing server 102. In step S808, the rendering unit 404 of the client terminal 101 renders the received commission content input screen 1000, and the display unit 402 displays the rendering results on the display 310 of the client terminal 101. The user, who is the commissioning party, then makes input of the commission contents to the commission content input screen 1000 that has been displayed in this way.

Figure 11:
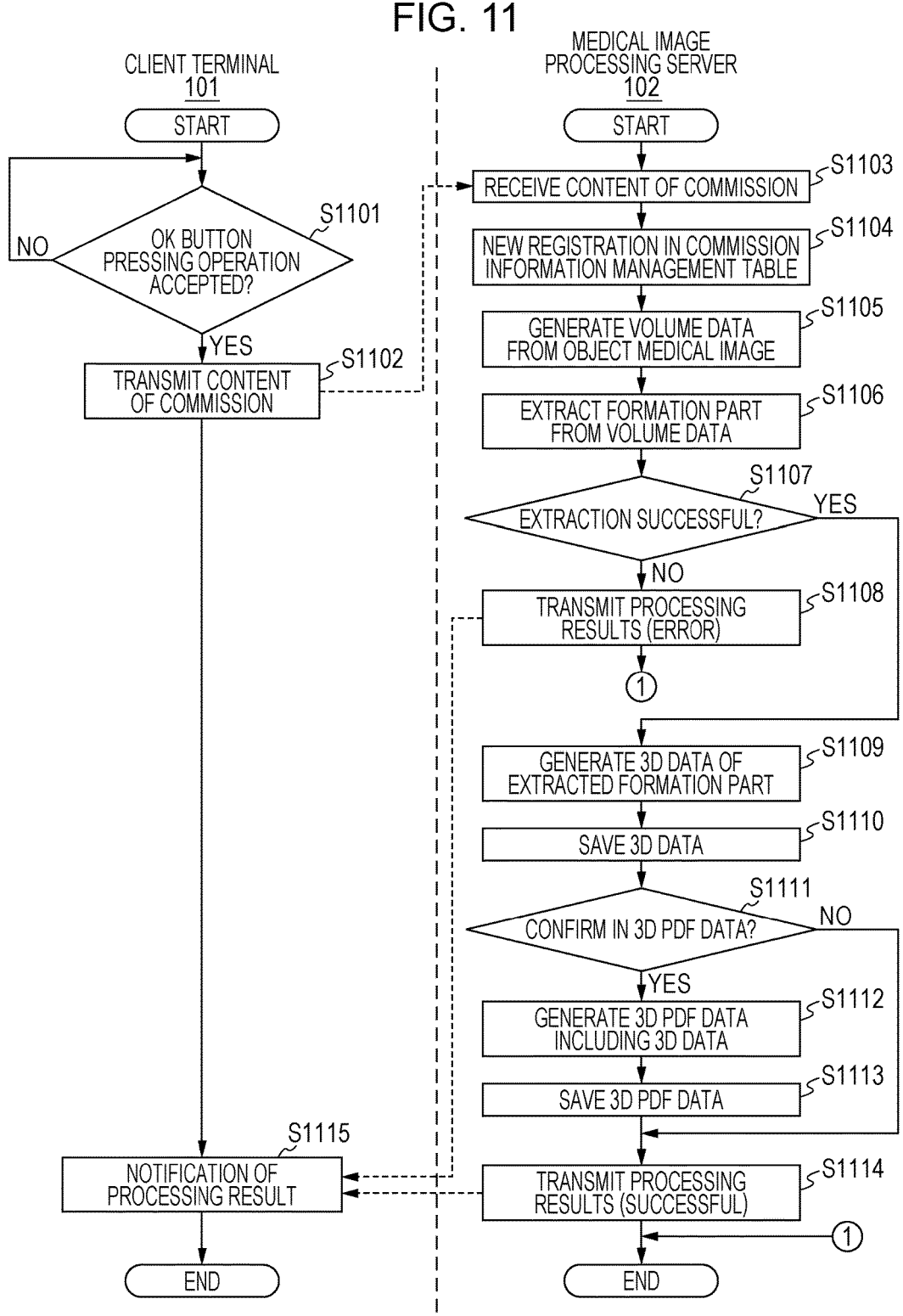
FIG. 11 is a flowchart diagram illustrating a series of processing for accepting commission content.

FIG. 11 is a flowchart diagram illustrating a series of processing for accepting commissioning. The steps of step S1101, step S1102, and step S1115 in FIG. 11 are processing executed by the CPU 301 of the client terminal 101. The steps of step S1103 through step S1114 in FIG. 11 are processing executed by CPU 301 of the medical image processing server 102. Note that the contents of processing and the order of processing illustrated in FIG. 11 are only exemplary, and are not restrictive.

In step S1101, determination is made by the operation accepting unit 405 of the client terminal 101 regarding whether or not a pressing operation of the OK button 1004 of the commission content input screen 1000 has been accepted. In a case where determination is made that a pressing operation of the OK button 1004 has been accepted, the flow advances to step S1002. In a case where determination is made that a pressing operation of the OK button 1004 has not been accepted, the flow stands by.

In step S1102, the Web browser unit 403 of the client terminal 101 acquires the image ID embedded in the OK button 1004 that has been pressed, and the commission contents input to the commission content input screen 1000 (formation part, formation method, confirmation format, etc.). The communication control unit 401 of the client terminal 101 then transmits the acquired image ID hand commission content to the medical image processing server 102, to commission formation of the medical image indicated by this image ID (referred to as "object medical image" in FIG. 11).

In step S1103, the communication control unit 411 of the medical image processing server 102 receives the commission content and image ID transmitted from the client terminal 101. In step S1104, the storage unit 412 of the medical image processing server 102 creates a new record (commission information) in a commission information management table 1200, and registers the received commission contents and image ID in this record.

The commission information management table 1200 is a data table for storing information relating to formation commissions. The commission information management table 1200 is stored in the external memory 311 of the medical image processing server 102. Note that the configuration of the commission information management table 1200 is only exemplary, and is not restrictive.

The commission information management table 1200 includes the items of commission ID 1201, image ID 1202, formation part 1203, formation method 1204, formation necessity 1205, confirmation format 1206, and commissioning party information 1207. The commission information management table 1200 further includes the items of status 1208, 3D data saving location 1209, and 3D PDF data saving location 1210.

The commission ID 1201 is an item storing identification information uniquely allocated to each commission information. The image ID 1202 is an item storing the image ID 601 of the medical image used to commission forming. The formation part 1203 is an item storing the formation part accepted by selection at the formation part selection space 1001. The formation method 1204 is the formation method of which selection has been accepted at the formation method section space 1002. The formation necessity 1205 is an item storing the formation necessity of which selection has been accepted at the formation method section space 1002. The confirmation format 1206 is an item storing the confirmation format of which selection has been accepted at the conformation format selection space 1003. The commissioning party information 1207 is an item storing information of the commissioning party, such as name and address. The status 1208 is an item storing the state of progress of the formation commission. In later-described processing, when a commission has been accepted this is commission accepted, once finalization of the commission is performed this is commission finalized, once the 3D forming apparatus is instructed to perform the 3D forming, the status is forming, when formation is completed this is billing, and when the billed payment has been received, the status is commission completed. Other statuses may be stored as well, as necessary. The 3D data saving location 1209 is an item storing the saving location of generated 3D data, which will be described later. The 3D PDF data saving location 1210 is an item storing the saving location of generated 3D PDF data, which will be described later.

In step S1105, the volume data generating unit 418 of the medical image processing server 102 acquires the object medical image from the medical image saving location 607, and generates volume data using the object medical image. There are multiple object medical images, and the volume data is generated by layering these. Conventional art is used to generate volume data, so detailed description will be omitted.

Figure 13:
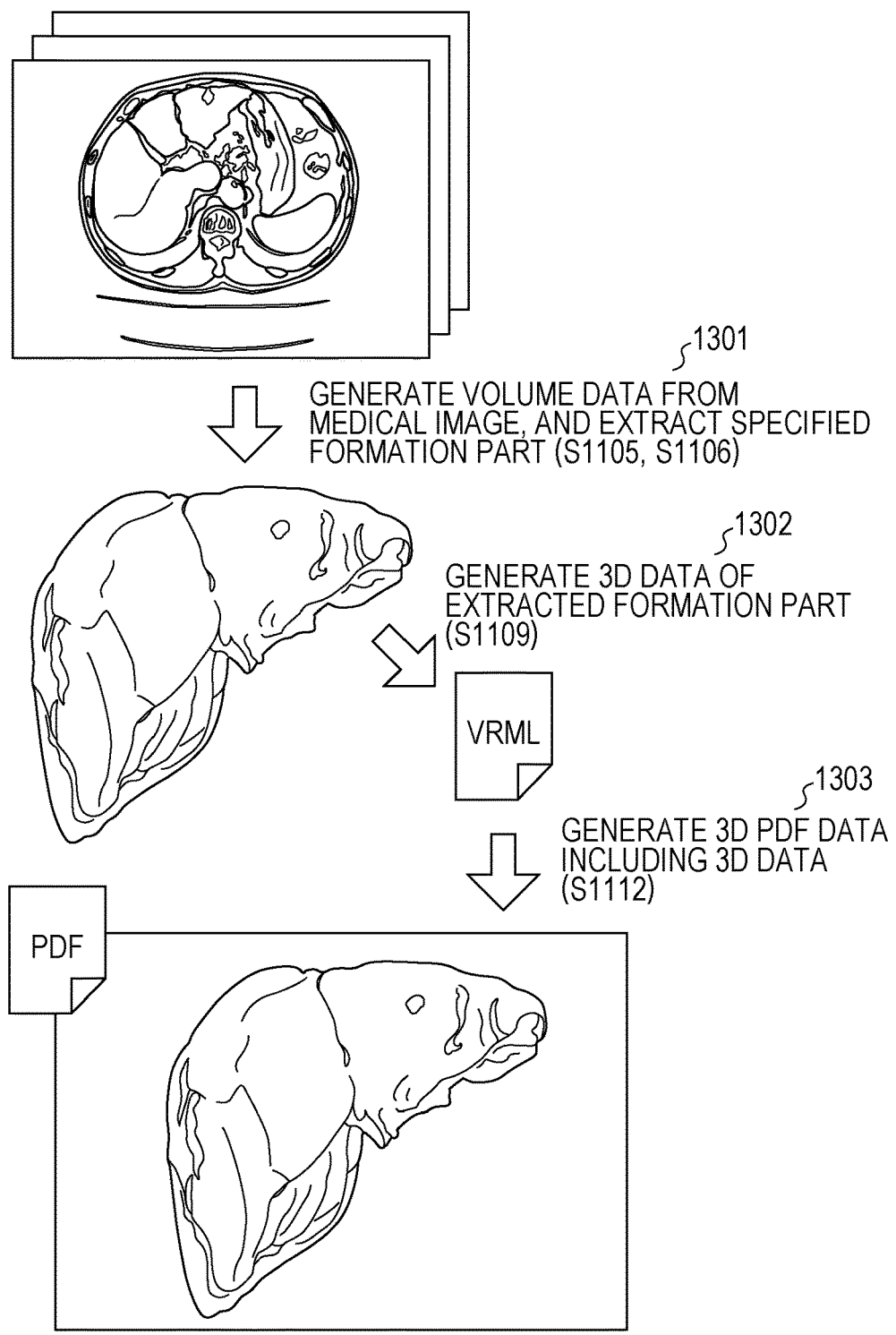
FIG. 13 is a diagram illustrating the overview of generating 3D PDF data from medical images.

In step S1106, the formation part extracting unit 419 of the medical image processing server 102 extracts the formation part 1203 regarding which the commission has been accepted, from the volume data generated in step S1105. The formation part extracting unit 419 identifies the formation part 904 corresponding to the formation part 1203, and automatically extracts the commissioned human body part by using an extraction algorithm 905 corresponding to the formation part 904. The method for extracting a particular part from volume data also is conventional art, so detailed description will be omitted. Reference numeral 1301 in FIG. 13 denotes an overview of generating volume data in steps S1105 and S1106, and extracting the specified part. Thus, a 3D image of a specified part is generated from multiple medical images. FIG. 13 illustrates an example of the liver.

In step S1107, the 3D control unit 417 of the medical image processing server 102 determines whether or not extraction of the commissioned human body part has succeeded. There is a possibility that the commissioned human body part cannot be extracted even by using the extraction algorithm 905, if the medical images are unclear or the number of medical images is insufficient. Accordingly, in a case where the extraction algorithm 905 is executed and an error is returned, determination is made that extraction has failed. In a case where determination is made that extraction of the commissioned human body part has been successful, the flow advances to step S1109. Otherwise, i.e., in a case where determination is made that extraction has failed, the flow advances to step S1108.

In step S1108, the communication control unit 411 of the medical image processing server 102 transmits processing results to the client terminal 101, to the effect that the commissioned extraction of the human body part has failed. In step S1115, the communication control unit 401 of the client terminal 101 accepts the processing results, and notifies the user, who is the commissioning party.

On the other hand, in a case where extraction has been successful, in step S1109 the 3D data generating unit 420 of the medical image processing server 102 generates 3D data of the part extracted in step S1116. 3D data that can be analyzed by the 3D forming driver unit 415, such as VRML or STL format data is generated using the volume data from which the commission part has been extracted. Generating 3D data also uses conventional art, so description will be omitted. This processing corresponds to the part indicated by 1302 in FIG. 13.

In step S1110, the storage unit 412 of the medical image processing server 102 saves the 3D data generated in step S1109 in the external memory 311 of the medical image processing server 102. The location of saving this 3D data is stored in the 3D data saving location 1209 of the corresponding record.

In step S1111, the storage unit 412 of the medical image processing server 102 determines whether or not the confirmation format 1206 of the record corresponding to the commission being processed is 3D PDF data. That is to say, determination is made regarding whether or not the user, who is the commissioning party, has selected from the conformation format selection space 1003 to confirm in 3D PDF data. In a case where determination is made that the confirmation format 1206 is 3D PDF data, the flow advances to S1112. In a case where determination is made that the confirmation format 1206 is not 3D PDF data, i.e., is 3D data, the flow advances to step S1114.

In step S1112, the 3D PDF data generating unit 421 of the medical image processing server 102 generates 3D PDF data including the 3D data generated in step S1109. The 3D data is acquired from the 3D data saving location 1209 of the record corresponding to the commission being processed, and PDF data including this 3D data is generated. The method of generating 3D PDF data also uses conventional art, so description will be omitted. This processing corresponds to the portion in FIG. 13 indicated by reference numeral 1303.

In step S1113, the storage unit 412 of the medical image processing server 102 saves the 3D PDF data generated in step S1112 in the external memory 311 of the medical image processing server 102. The saving location is then stored in the 3D PDF data saving location 1210 of the record corresponding to the commission being processed.

In step S1114, the communication control unit 411 of the medical image processing server 102 transmits processing results to the client terminal 101, to the effect that extraction of the commission part and generation of the 3D data or 3D PDF data has been successful. The communication control unit 401 of the client terminal 101 receives the processing results in step S1115, and notifies the user, who is the commissioning party.

Once the processing up to step S1115 is completed, the client terminal 101 updates the medical image list screen 700. That is to say, the series of processing illustrated in FIG. 5 is executed. Thus, the medical image list screen 700 is updated to the newest state.

Figure 14:
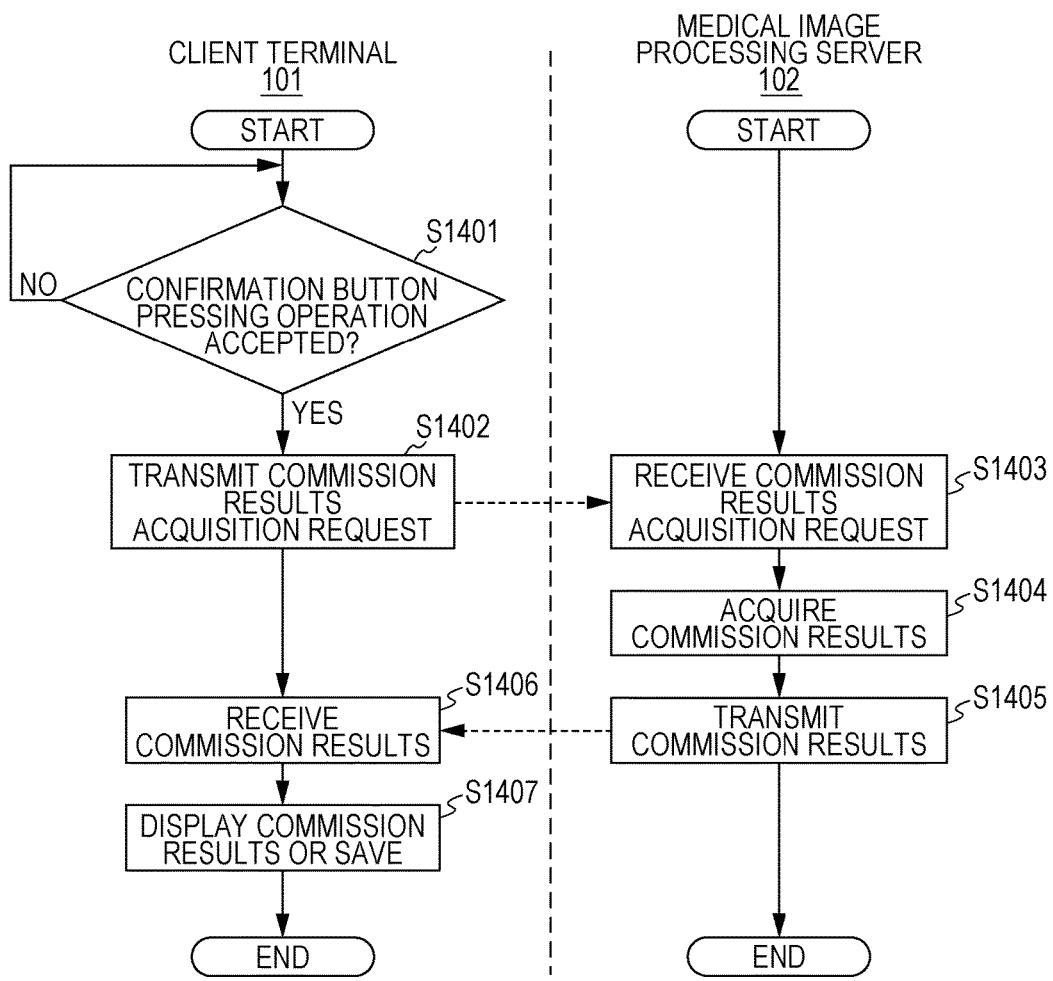
FIG. 14 is a flowchart diagram illustrating a series of processing for displaying commission results.

FIG. 14 is a flowchart diagram illustrating a series of processing for displaying commission results. The steps of step S1401, step S1402, step S1406, and step S1407 in FIG. 14 are processing executed by the CPU 301 of the client terminal 101. The steps of step S1403 through step S1405 in FIG. 14 are processing executed by CPU 301 of the medical image processing server 102. Note that the contents of processing and the order of processing illustrated in FIG. 14 are only exemplary, and are not restrictive.

In step S1401, the operation accepting unit 405 of the client terminal 101 determines whether or not an operation of pressing the confirm button 703 of the medical image list screen 700 has been accepted. In a case where determination is made that pressing of the confirm button 703 has been accepted, the flow advances to step S1402. In a case where determination is made that pressing of the confirm button 703 has not been accepted, the flow stands by.

In step S1402, the Web browser unit 403 of the client terminal 101 acquires the image ID embedded in the record of the confirm button 703 regarding which the pressing operation has been accepted. The communication control unit 401 of the client terminal 101 then transmits a commission results acquisition request for the medical image that this image ID indicates (referred to as "object medical image" in FIG. 14) to the medical image processing server 102 along with this image ID included.

In step S1403, the communication control unit 411 of the medical image processing server 102 receives the commission results acquisition request transmitted from the client terminal 101.

In step S1404, the storage unit 412 of the medical image processing server 102 acquires the processing results of the object medical image from the external memory 311. The image ID of the object medical image has been received from the client terminal 101, so the image ID 1202 corresponding to this image ID is identified from the records in the commission information management table 1200. In a case where the confirmation format 1206 of the identified record is 3D data, the 3D data, which is the commission results, is acquired from the 3D data saving location 1209. On the other hand, in a case where the confirmation format 1206 of the identified record is 3D PDF data, the 3D PDF data, which is the commission results, is acquired from the 3D PDF data saving location 1210.

In step S1405, the communication control unit 411 of the medical image processing server 102 transmits the processing results acquired in step S1404 (3D data or 3D PDF data) to the client terminal 101.

In step S1406, the communication control unit 411 of the client terminal 101 receives the processing results transmitted from the medical image processing server 102. In step S1407, in a case where 3D data has been received as the processing results, the client terminal 101 saves the 3D data in the external memory 311. The saved 3D data is then displayed in accordance with user instructions, by an application installed in the client terminal 101. On the other hand, in a case where 3D PDF data has been received as the processing results, the display unit 402 of the client terminal 101 start up a PDF viewer installed in the client terminal 101, and displays the received 3D PDF data on the display 310.

Figure 15:
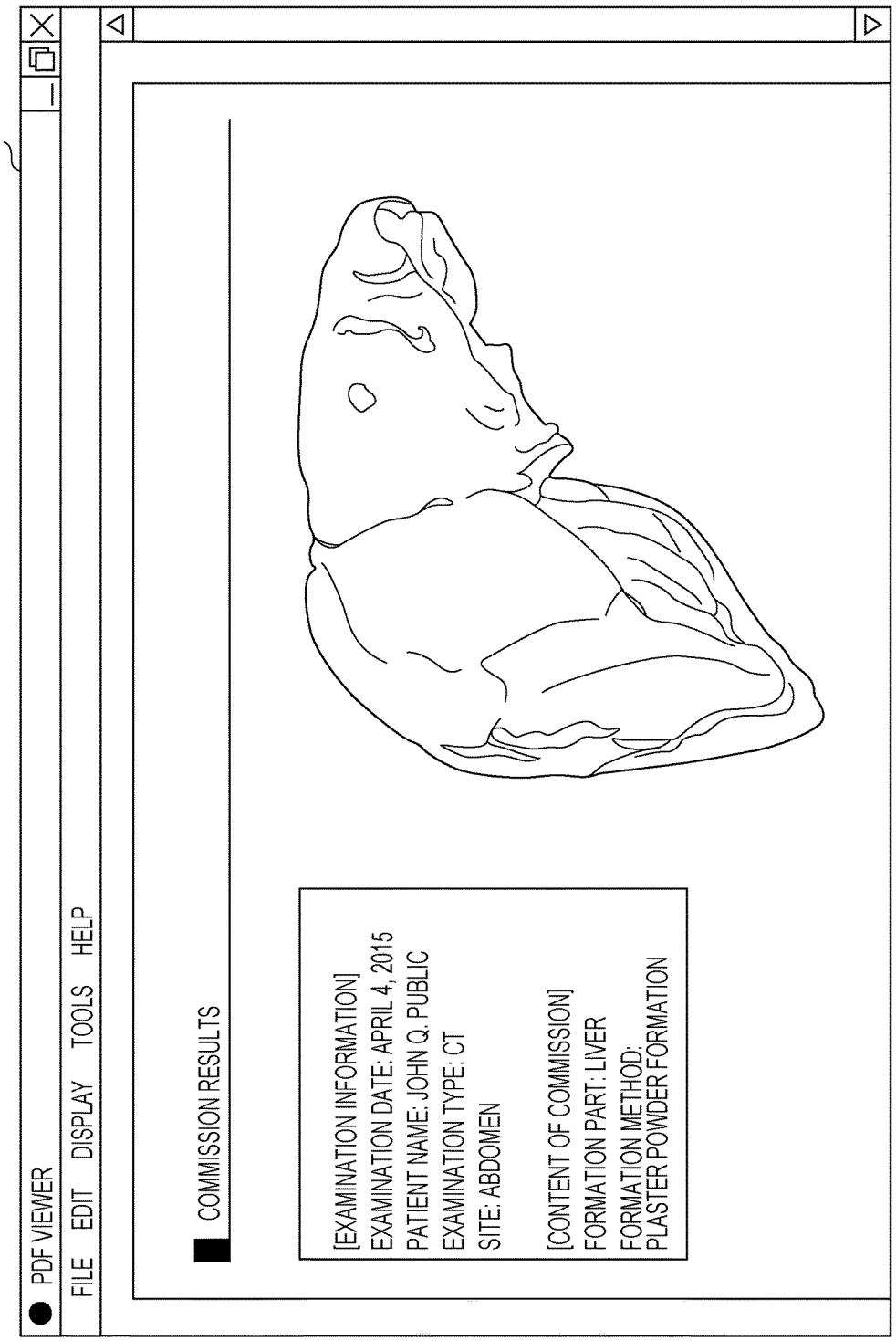
FIG. 15 is a diagram illustrating 3D PDF data displayed.

FIG. 15 illustrates an example of displaying 3D PDF data using a PDF viewer. The operating the 3D data in this view enables the viewpoint to be changed. Thus, the user can confirm the commissioning results before commissioning formation. Also, even in cases where the user, who is the commissioning party, performs the formation him/herself, 3D data that can be output to the 3D forming apparatus 103 can be downloaded.

Figure 16:
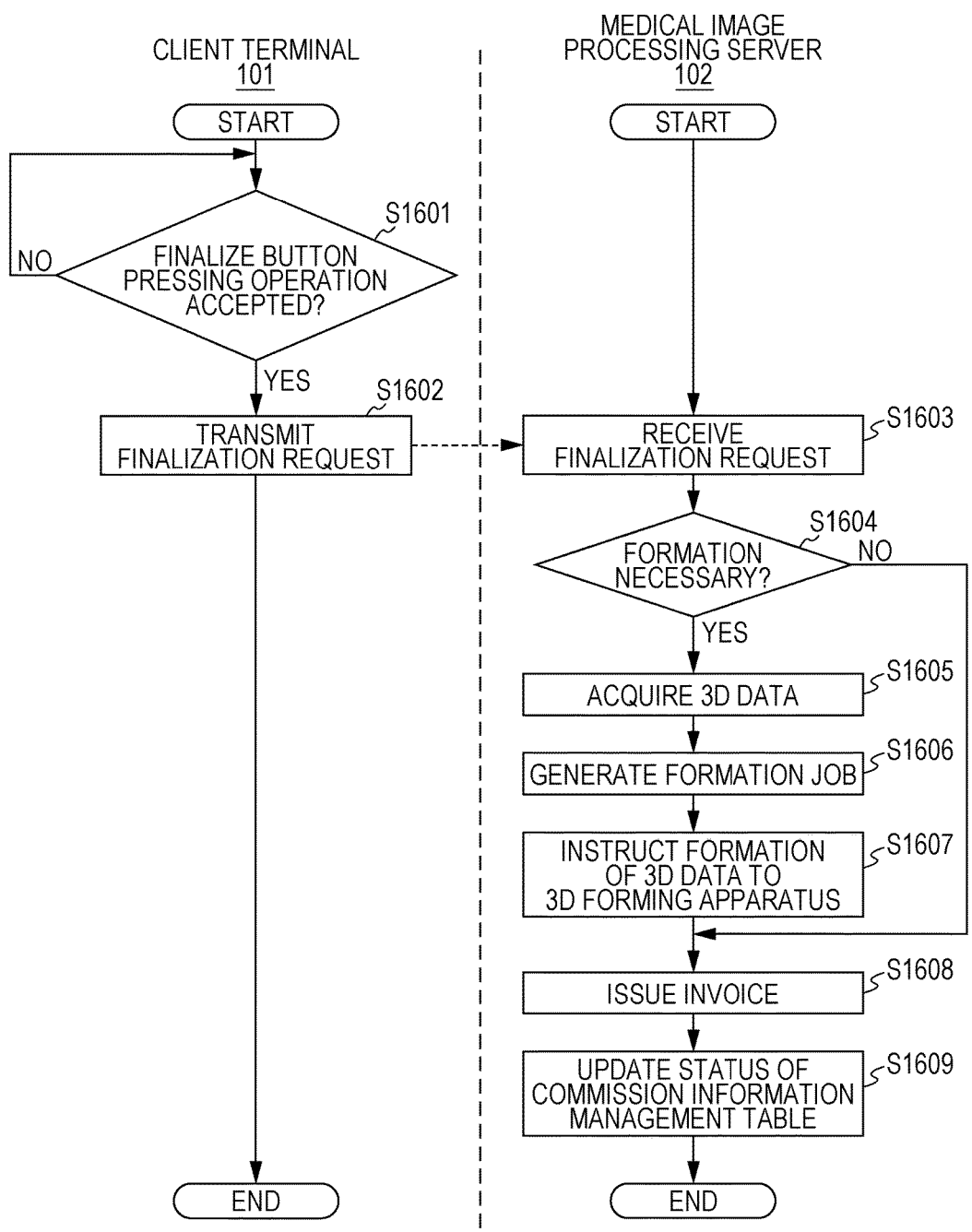
FIG. 16 is a flowchart diagram illustrating a series of processing for finalizing commission.

FIG. 16 is a flowchart diagram illustrating a series of processing for finalizing commission. The steps of step S1601 and step S1602 in FIG. 16 are processing executed by the CPU 301 of the client terminal 101. The steps of step S1603 through step S1609 in FIG. 16 are processing executed by CPU 301 of the medical image processing server 102. Note that the contents of processing and the order of processing illustrated in FIG. 16 are only exemplary, and are not restrictive.

In step S1601, the operation accepting unit 405 of the client terminal 101 determines whether or not an operation of pressing the finalize button 704 of the medical image list screen 700 has been accepted. In a case where determination is made that pressing of the finalize button 704 has been accepted, the flow advances to step S1602. In a case where determination is made that pressing of the finalize button 704 has not been accepted, the flow stands by.

In step S1602, the Web browser unit 403 of the client terminal 101 acquires the image ID embedded in the record of the finalize button 704 regarding which the pressing operation has been accepted. The communication control unit 401 of the client terminal 101 then transmits a final finalization request for the medical image that this image ID indicates (referred to as "object medical image" in FIG. 16) to the medical image processing server 102 along with this image ID included.

In step S1603, the communication control unit 411 of the medical image processing server 102 receives the finalization request transmitted from the client terminal 101. In step S1604, the storage unit 412 of the medical image processing server 102 determines whether or not formation of the object medical image regarding which the finalization request has been made is necessary. The image ID of the object medical image has been received from the client terminal 101, so the image ID 1202 corresponding to this image ID is identified from the records in the commission information management table 1200. In a case where the formation necessity 1205 of the identified record indicates necessary, the flow advances to step S1605. Otherwise, i.e., in a case where formation is not necessary, the flow advances to step S1608.

In step S1605, the 3D forming driver unit 415 of the medical image processing server 102 acquires the 3D data of the object medical image from the external memory 311 of the medical image processing server 102. This can be acquired from the 3D data saving location 1209 of the record identified in step S1604.

In step S1606, the formation job generating unit 416 of the medical image processing server 102 generates a formation job using the 3D data acquired in step S1605. At this time, the formation job is generated including the formation method 1204 and further any information regarding the material for forming. Generating formation jobs is performed using conventional art.

In step S1607, the 3D forming driver unit 415 of the medical image processing server 102 transmits the formation job generated in step S1606 to the 3D forming apparatus 103, thereby giving a formation instruction. At this time, the 3D forming driver unit 415 identifies a 3D forming apparatus 103 as the transmission destination that is capable of executing the formation method 1204 identified in step S1604, and transmits to the 3D forming apparatus 103. Upon receiving the formation job, the 3D forming apparatus 103 starts the 3D forming. When the forming is completed, the business delivers the formed object to the user, who is the commissioning party, based on the commissioning party information 1207.

In step S1608, the medical image processing server 102 issues an invoice to the user, who is the commissioning party, in accordance with the received commission contents. In step S1609, the storage unit 412 of the medical image processing server 102 updates the status 1208 of the record identified in step S1604 to billing. Thus the formation commission is finalized.

Once the processing up to step S1609 is completed, an update request for the medical image list screen 700 is transmitted from the medical image processing server 102 to the client terminal 101. Upon receiving this update request, the client terminal 101 executes the series of processing illustrated in FIG. 5. Thus, the medical image list screen 700 is updated to the newest state.

Figure 17:
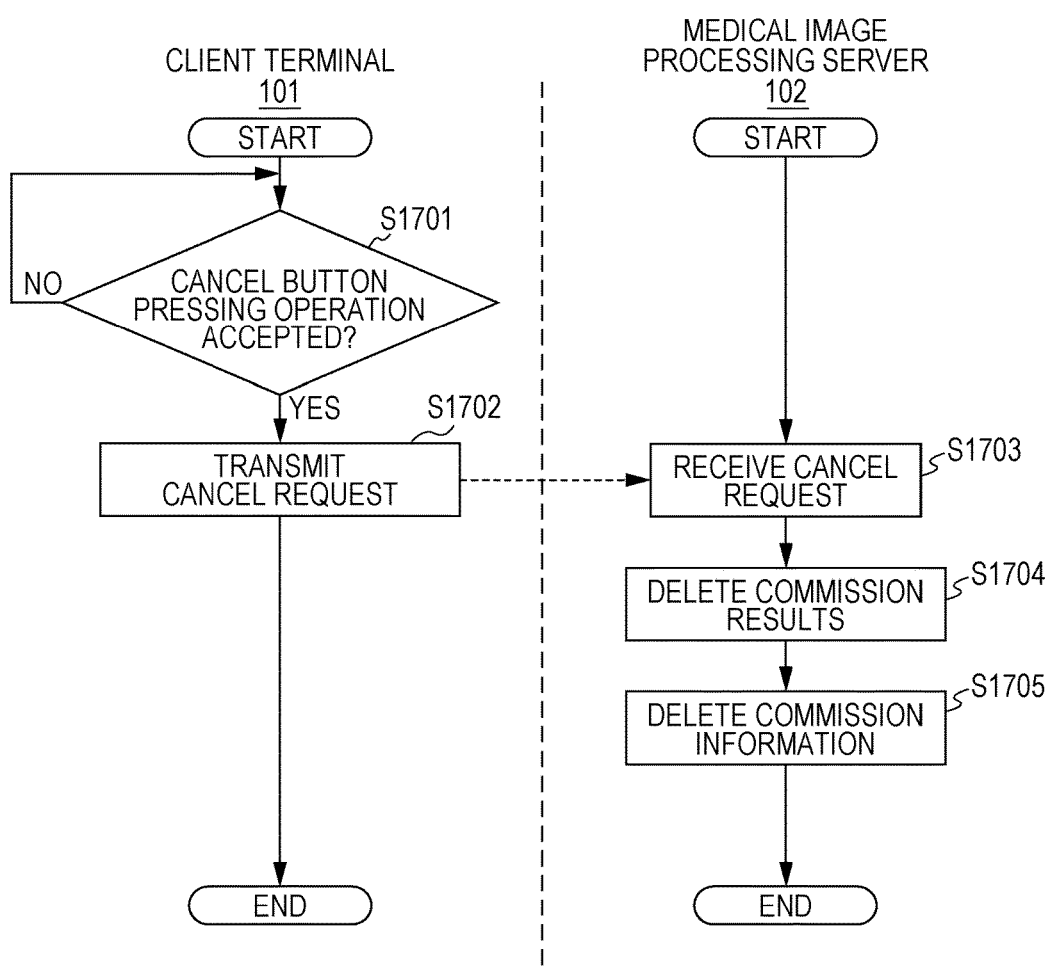
FIG. 17 is a flowchart diagram illustrating a series of processing for cancelling a commission.

FIG. 17 is a flowchart diagram illustrating a series of processing for cancelling a commission. The steps of step S1701 and step S1702 in FIG. 17 are processing executed by the CPU 301 of the client terminal 101. The steps of step S1703 through step S1705 in FIG. 17 are processing executed by CPU 301 of the medical image processing server 102. Note that the contents of processing and the order of processing illustrated in FIG. 17 are only exemplary, and are not restrictive.

In step S1701, the operation accepting unit 405 of the client terminal 101 determines whether or not an operation of pressing the cancel button 705 of the medical image list screen 700 has been accepted. In a case where determination is made that pressing of the cancel button 705 has been accepted, the flow advances to step S1702. In a case where determination is made that pressing of the cancel button 705 has not been accepted, the flow stands by.

In step S1702, the Web browser unit 403 of the client terminal 101 acquires the image ID embedded in the record of the cancel button 705 regarding which the pressing operation has been accepted. The communication control unit 401 of the client terminal 101 then transmits a cancel request for the medical image that this image ID indicates (referred to as "object medical image" in FIG. 17) to the medical image processing server 102 along with this image ID included.

In step S1703, the communication control unit 411 of the medical image processing server 102 receives the cancel request transmitted from the client terminal 101. In step S1704, the storage unit 412 of the medical image processing server 102 deletes the commission results of the commission regarding which the cancel request has been made from the external memory 311. The image ID has been received from the client terminal 101, so the image ID 1202 corresponding to this image ID is identified from the records in the commission information management table 1200. The 3D data and the 3D PDF data, that are the commission results, are then deleted from the 3D data saving location 1209 and 3D PDF data saving location 1210 of the identified record.

In step S1705, the storage unit 412 of the medical image processing server 102 deletes the commission information regarding which the cancel request has been made, i.e., the record identified in step S1704, from the commission information management table 1200. Thus, the formation commission is canceled.

Once the processing up to step S1705 is completed, an update request for the medical image list screen 700 is transmitted from the medical image processing server 102 to the client terminal 101. Upon receiving this update request, the client terminal 101 executes the series of processing illustrated in FIG. 5. Thus, the medical image list screen 700 is updated to the newest state.

As described above, redundant formation commissioning of medical images can be suppressed.

Figure 18:
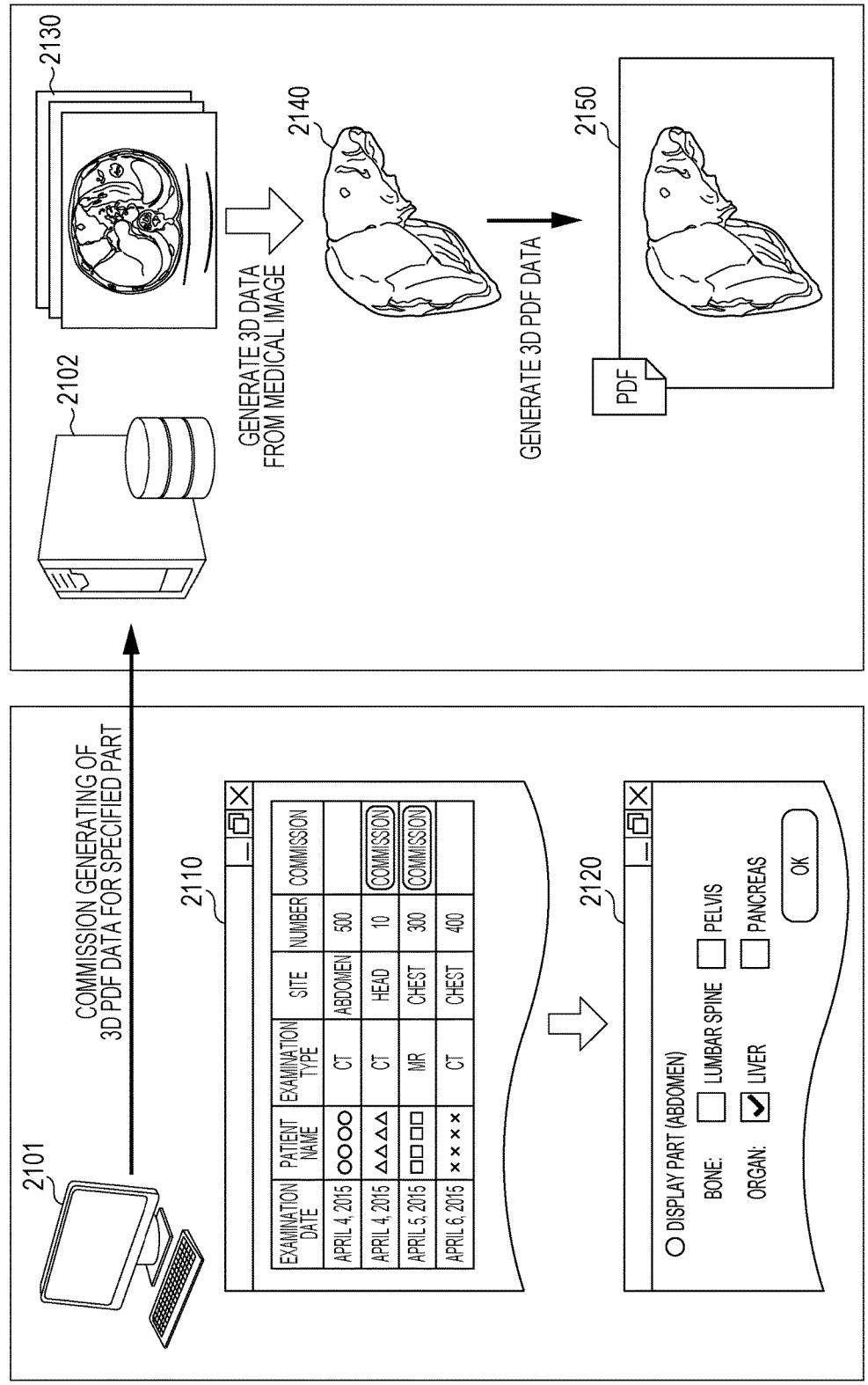
FIG. 18 is a diagram illustrating an overview of the present invention.

Another embodiment of the present invention will be described in detail with reference to the drawings. First, an overview of the present invention will be described with reference to FIG. 18. A medical image processing system 2100 according to the present invention is a system including a client terminal 2101 and a medical image processing server 2102. The client terminal 2101 and medical image processing server 2102 are communicably connected.

The client terminal 2101 transmits medical images generated by modalities such as X-ray CT or MRI to the medical image processing server 2102 beforehand. The medical image processing server 2102 stores these medical images. The term "medical image" in the present embodiment includes tomographic images generated by one modality or another. The term "medical image" also includes images according to the Digital Imaging and COmmunication in Medicine (DICOM) standard. Accessory information for DICOM includes information of examination date, patient name, type of examination, part or site name, and so forth. That is to say, a medical information includes this information. When storing medical images in the medical image processing server 2102, multiple images acquired in a single examination are made into a series (grouped) and stored. Note that in the present embodiment, this medical image group that has been made into a series will be referred to as "medical image".

When generating text document data into which 3D data representing a human body part is inserted, i.e., PDF data (hereinafter referred to as 3D PDF data), the client terminal 2101 accepts an instruction to that effect. A screen such as indicated by reference numeral 2110 is displayed on a display of the client terminal 2101, and the user, who is the commissioning party, presses a "commission" button provided to a record of an object medical image. Upon detecting this pressing, a screen such as indicated by reference numeral 2120 is displayed on a display 2120 of the client terminal 2101. Selection of the human body part to be displayed three-dimensional in 3D PDF data is accepted at this screen.

At the time of generating this screen at the medical image processing server 2102, parts regarding which 3D data can be generated are determined using the information of the parts included in the object medical image regarding which the commission button has been pressed. Checkboxes are provided so that parts that can be generated, can be selected. Thus, the user can be suppressed from selecting parts regarding which 3D data cannot be generated from the medical images regarding which selection has been accepted.

Once the user selects a part to three-dimensionally display, and the client terminal 2101 detects pressing of an OK button, a 3D PDF data generating commission is transmitted from the client terminal 2101 to the medical image processing server 2102. The medical image processing server 2102 accepts this commission, and generates volume data using the object medical image.

Volume data is data where medical images are layered three-dimensionally, and a CT number (a relative value where water is 0 and air is −1000) that each pixel in the medical image has is given as a parameter to a voxel corresponding to that pixel. The medical image processing server 2102 applies visual information (color, viewpoint, slight source, gloss, etc.) to the volume data, thereby generating 3D data. This 3D data is data representing a 3D model in the VRML format or STL format, for example.

The 3D data generated in this way is inserted into PDF data, thereby generating 3D PDF data. The user, who is the commissioning party, opens this 3D PDF data using a PDF viewer installed in the client terminal 2101, thus enabling three-dimensional display of the human body part. This overview will be described in further detail.

Figure 19:
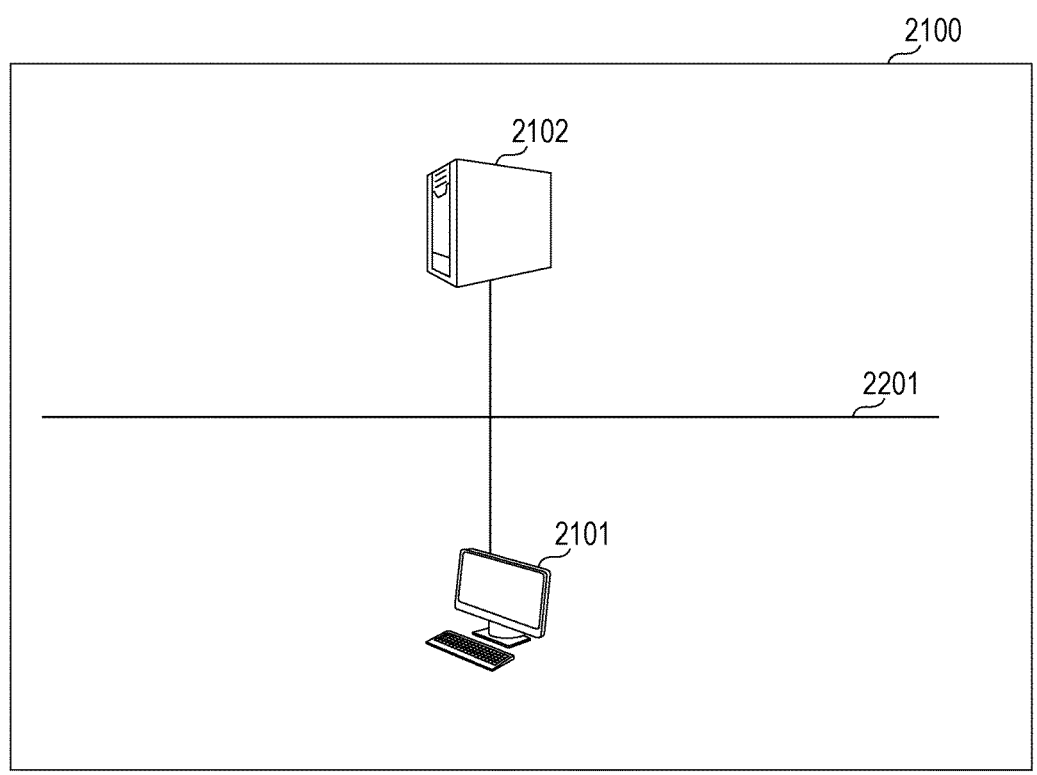
FIG. 19 is a diagram illustrating the configuration of a medical image processing system.

FIG. 19 is a diagram illustrating the system configuration of the medical image processing system 2100. Note that the system configuration illustrated in FIG. 19 is only exemplary. The medical image processing system 2100 is a system including the client terminal 2101 and medical image processing server 2102. The client terminal 2101 and medical image processing server 2102 are communicably connected via a LAN 2201 or the Internet or the like.

The client terminal 2101 is one or multiple devices at the side of the commissioning user that commissions 3D PDF data generation. The client terminal 2101 may be a personal computer or server, or may be a mobile terminal (cellular phone, smartphone, wearable device, etc.) or the like.

The medical image processing server 2102 (medical image processing apparatus) is one or multiple devices at the side of a business that accepts commissions for 3D PDF data generation. Although a server device is assumed as the medical image processing server 2102, any device capable of processing commissions from the client terminal 2101 may be used.

Figure 20:
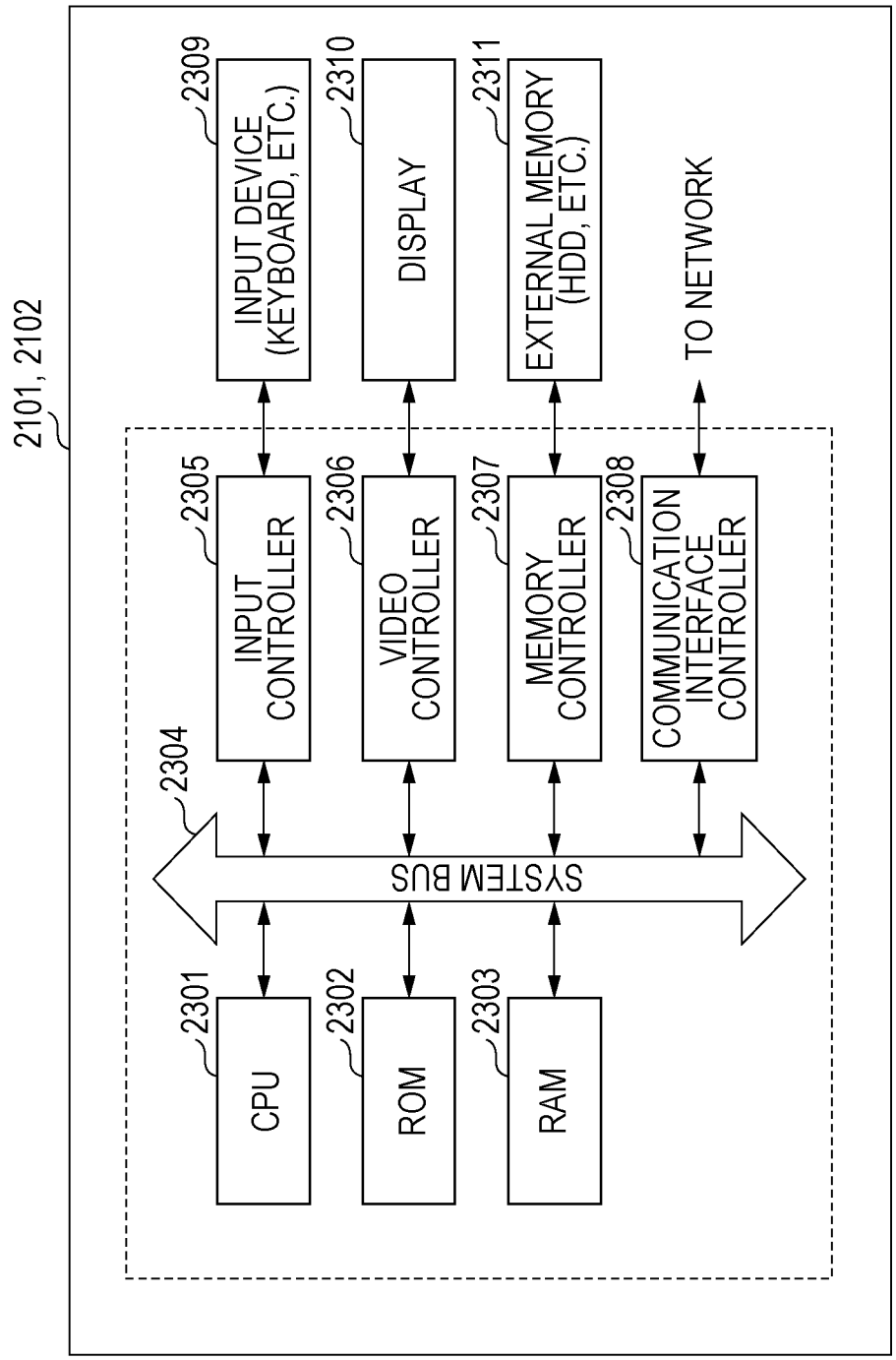
FIG. 20 is a diagram illustrating the hardware configuration of a client terminal and a medical image server.

FIG. 20 is a diagram that illustrates the hardware configuration of the client terminal 2101 and medical image processing server 2102. Note that the hardware configuration in FIG. 20 is only exemplary. A central processing unit (CPU) 2301 centrally controls various devices and controllers connected to a system bus 2304.

ROM 2302 or external memory 2311 store a BIOS and operating system software, which are control programs for the CPU 2301. The external memory 2311 also stores programs that are necessary for the devices to realize the functions that they execute. RAM 2303 functions as main memory, work area, and so forth, of the CPU 2301. The display device may be a CRT, liquid crystal display, or the like.

The CPU 2301 loads programs and the like necessary to execute processing to the RAM 2303, and executes the programs, thereby realizing the various types of operations. An input controller 2305 controls input from an input device 2309 such as a keyboard or a pointing device like a mouse or the like. A video controller 2306 controls display on a display device such as a display 2310 or the like.

A memory controller 2307 controls access to the external memory 2311. Examples of the external memory 2311 include a hard disk, flexible disk, card-type memory connected to a PCMCIA card slot via an adapter, and so forth. The external memory 2311 (storage unit) stores a boot program, browser software, various types of applications, font data, user files, editing files, various types of data, and so forth.

A communication interface controller 2308 is for connection to and communication with external devices via a network, and executes communication control processing on the network. For example, Internet communication using TCP/IP can be performed.

The CPU 2301 also enables display to be made on the display 2310 by rendering (rasterizing) outline fonts to a display information area in the RAM 2303. The CPU 2301 further also enables user instructions on the display 2310 by a mouse cursor or the like, omitted from illustration.

The various types of programs and the like used for the client terminal 2101 and medical image processing server 2102 to execute various types of processing that will be described later, are recorded in the external memory 2311. These various types of programs and so forth are loaded to the RAM 2303 as necessary, and thus are executed by the CPU 2301. Further, definition files various types of information tables used by programs according to the present invention are stored in the external memory 2311.

Figure 21:
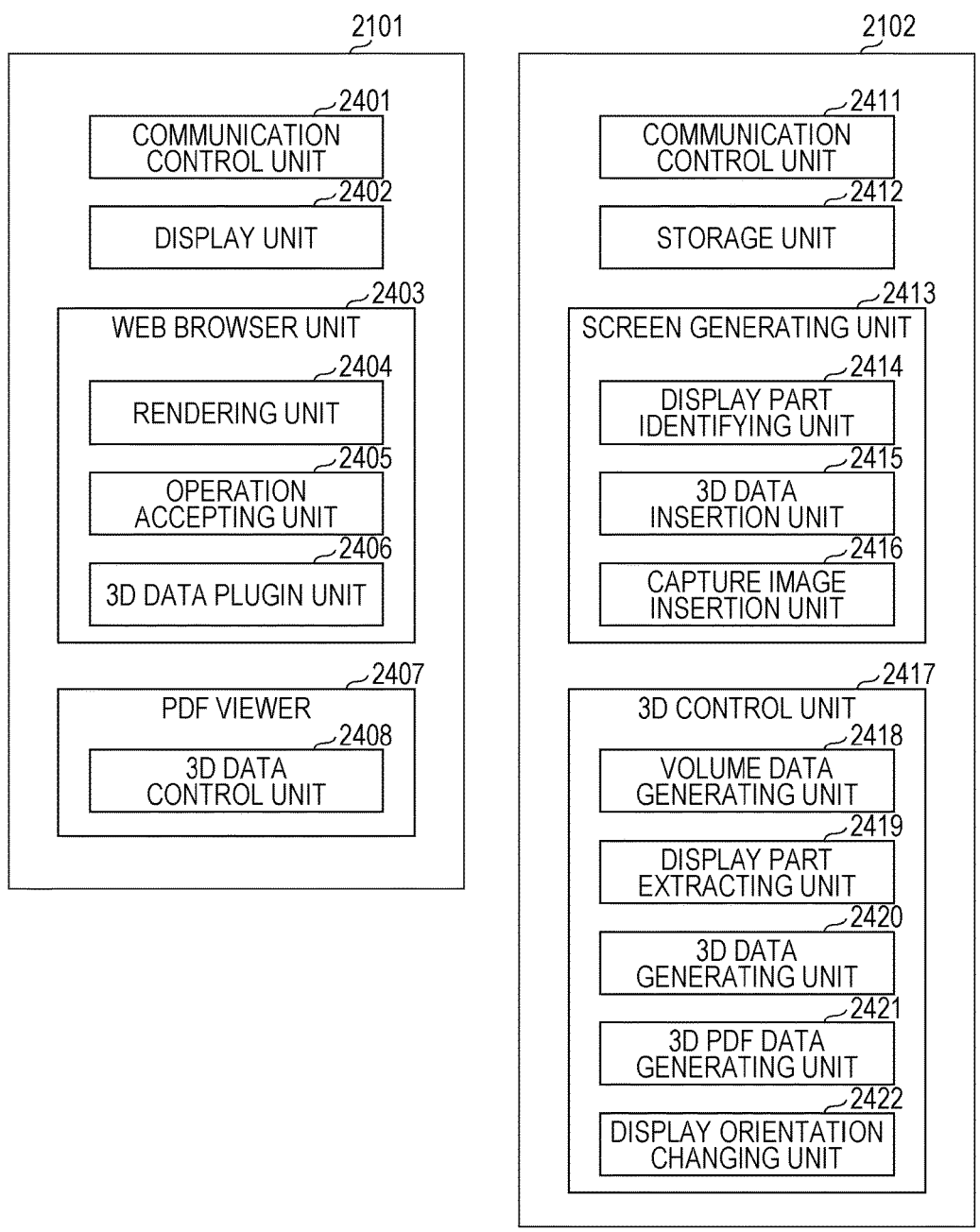
FIG. 21 is a diagram illustrating the functional configuration of the client terminal and the medical image server.

FIG. 21 is a diagram illustrating an example of the functional configuration of the client terminal 2101 and medical image processing server 2102. The functions illustrated in FIG. 21 are the components realized by the hardware arrangements, various types of programs, and so forth, illustrated in FIG. 19. Note that the functional configuration illustrated in FIG. 21 is only exemplary. The client terminal 2101 includes a communication control unit 2401, a display unit 2402, a Web browser unit 2403, and a PDF viewer unit 2407, as functional units.

The communication control unit 2401 is a functional unit for exchanging various types of information with the medical image processing server 2102. The communication control unit 2401 communicates with the medical image processing server 2102 via the communication interface controller 2308 of the client terminal 2101.

The display unit 2402 is a functional unit for displaying various types of information. The display unit 2402 transmits images including various types of information to the display 2310 via the video controller 2306 of the client terminal 2101, so as to display the various types of information on the display 2310.

The Web browser unit 2403 is a functional unit of a Web browser installed in the client terminal 2101 for displaying and operating Web pages (referred to as "screens" in the present embodiment), described in HTML. The Web browser unit 2403 further includes a rendering unit 2404, an operation accepting unit 2405, and a 3D data plugin unit 2406.

The rendering unit 2404 is a functional unit that analyzes the contents described in the Web page, and displays characters and images on the display. The operation accepting unit 2405 is a functional unit that accepts operations made regarding the Web page. The operation accepting unit 2405 also transmits acquisition requests for Web pages and files to the medical image processing server 2102 via the communication control unit 2401, in accordance with accepted operations. The 3D data plugin unit 2406 is a functional unit that displays 3D data inserted into a Web page. The 3D data plugin unit 2406 operates as a plugin of the Web browser, and analyzes content indicated by the 3D data to be rendered at the rendering unit 2404. The 3D data plugin unit 2406 further operates to change the display position, display orientation, etc., of the 3D data, in accordance with operations accepted at the operation accepting unit 2405.

The PDF viewer unit 2407 is a PDF viewer function unit installed in the client terminal 2101, and is a functional unit that displays PDF data including 3D PDF data. The PDF viewer unit 2407 further includes a 3D data control unit 2408. The 3D data control unit 2408 is a function unit that displays 3D data included in 3D PDF data. The 3D data control unit 2408 operates to analyze and render the content that the 3D data indicates, and to change the display position, display orientation, etc., of the 3D data, in accordance with operations accepted.

The medical image processing server 2102 includes, as functional units, a communication control unit 2411, a storage unit 2412, a screen generating unit 2413, and a 3D control unit 2417.

The communication control unit 2411 is a functional unit that exchanges various types of information with the client terminal 2101. The communication control unit 2411 communicates with the client terminal 2101 on the network via the communication interface controller 2308 of the medical image processing server 2102.

The storage unit 2412 is a functional unit that stores various types of information in the RAM 2303 or external memory 2311. Examples of the various types of information that the storage unit 2412 stores includes various types of tables that will be described later, templates for Web pages to be displayed at the client terminal 2101, and so forth.

The screen generating unit 2413 is a functional unit that generates screens (Web pages) to be displayed on the client terminal 2101. The screen generating unit 2413 generates screens using the various types of information stored in the storage unit 2412. The screen generating unit 2413 further includes a display part determining unit 2414, a 3D data inserting unit 2415, and a capture image insertion unit 2416.

The display part identifying unit 2414 is functional unit that acquires medical images instructed by the client terminal 2101 from the storage unit 2412, and identifies human body parts regarding which 3D data can be generated from the medical images. The display part identifying unit 2414 identifies human body parts regarding which 3D data can be generated, from information of the examined parts included in the DICOM information of the medical images.

The 3D data inserting unit 2415 is a functional unit that inserts 3D data into the generated Web pages. 3D data may be embedded into a Web page, or may be linked to from the Web page. The capture image insertion unit 2416 is a functional unit that changes the display orientation of the 3D data to a display orientation instructed by the user, captures this and generates image data (hereinafter referred to as a capture image), and embeds this in a Web page. The capture image also may be embedded into a Web page, or may be linked to from the Web page.

The 3D control unit 2417 is a functional unit for performing control such as generating and displaying three-dimensional data in three-dimensional space. The 3D control unit 2417 further includes a volume data generating unit 2418, a formation part extracting unit 2419, the 3D data generating unit 2420, a 3D PDF data generating unit 2421, and a display orientation changing unit 2422.

The volume data generating unit 2418 is a functional unit that generates volume data from medical images. The volume data generating unit 2418 generates volume data using multiple medical images. In a case where medical images to generate volume data are insufficient, the volume data generating unit 2418 interpolates for insufficient portions. The method of generating volume data is conventional art, and will be described later.

The display part extracting unit 2419 is a functional unit that extracts the human body part selected at the client terminal 2101 from the volume data. The storage unit 2412 stores a known algorithm for extracting each human body part, and the display part extracting unit 2419 selects the necessary algorithm from the storage unit 2412 to perform extracting. The method of extracting particular body parts from volume data, and the algorithms thereof, also are conventional art, and will be described later.

The 3D data generating unit 2420 is a functional unit that generates 3D data using the volume data from which the formation part extracting unit 2419 has extracted a particular body part. The 3D data generating unit 2420 generates 3D data in formats such as the VRML and STL formats, in the present embodiment. Although file formats capable of generating 3D PDF data such as VRML format 3D data are exemplified in the present embodiment, this is not restrictive.

The 3D PDF data generating unit 2421 is a functional unit that generates PDF data including 3D data (hereinafter referred to as 3D PDF data). The 3D PDF data is PDF data where the user can view 3D data from any viewpoint. The method of generating the 3D PDF data also is conventional art, and will be described later.

The display orientation changing unit 2422 is a functional unit that changes the display orientation of the 3D data generated at the 3D data generating unit 2420. The display orientation changing unit 2422 changes the display orientation of the 3D data to that optionally instructed by the user, in order to generate the capture image at the capture image insertion unit 2416. When changing the display orientation, the viewpoint in the three-dimensional space in which the 3D data is situated may be changed, or the 3D data may be rotated.

Figure 22:
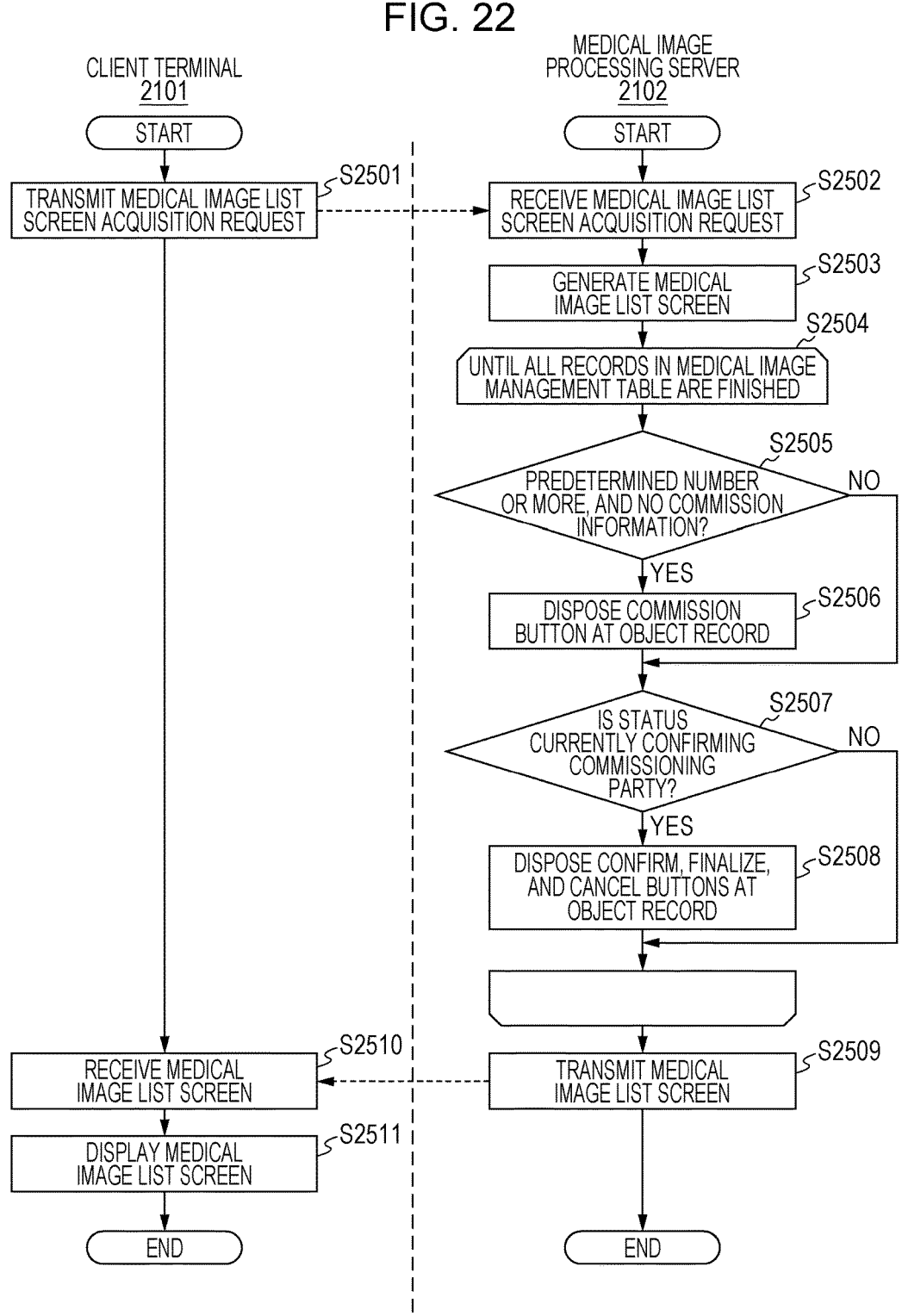
FIG. 22 is a flowchart diagram illustrating a series of processing for displaying a medical image list screen.

FIG. 22 is a flowchart diagram illustrating a series of processing for displaying the medical image list screen 2700. The steps of step S2501, S2510, and step S2511 in FIG. 22 are processing executed by the CPU 301 of the client terminal 2101. The steps of step S2502 through step S2509 in FIG. 22 are processing executed by CPU 2301 of the medical image processing server 2102. Note that the contents of processing and the order of processing illustrated in FIG. 22 are only exemplary, and are not restrictive.

In step S2501, the communication control unit 2411 of the client terminal 2101 transmits an acquisition request for a medical image list screen to the medical image processing server 2102.

Figure 23:
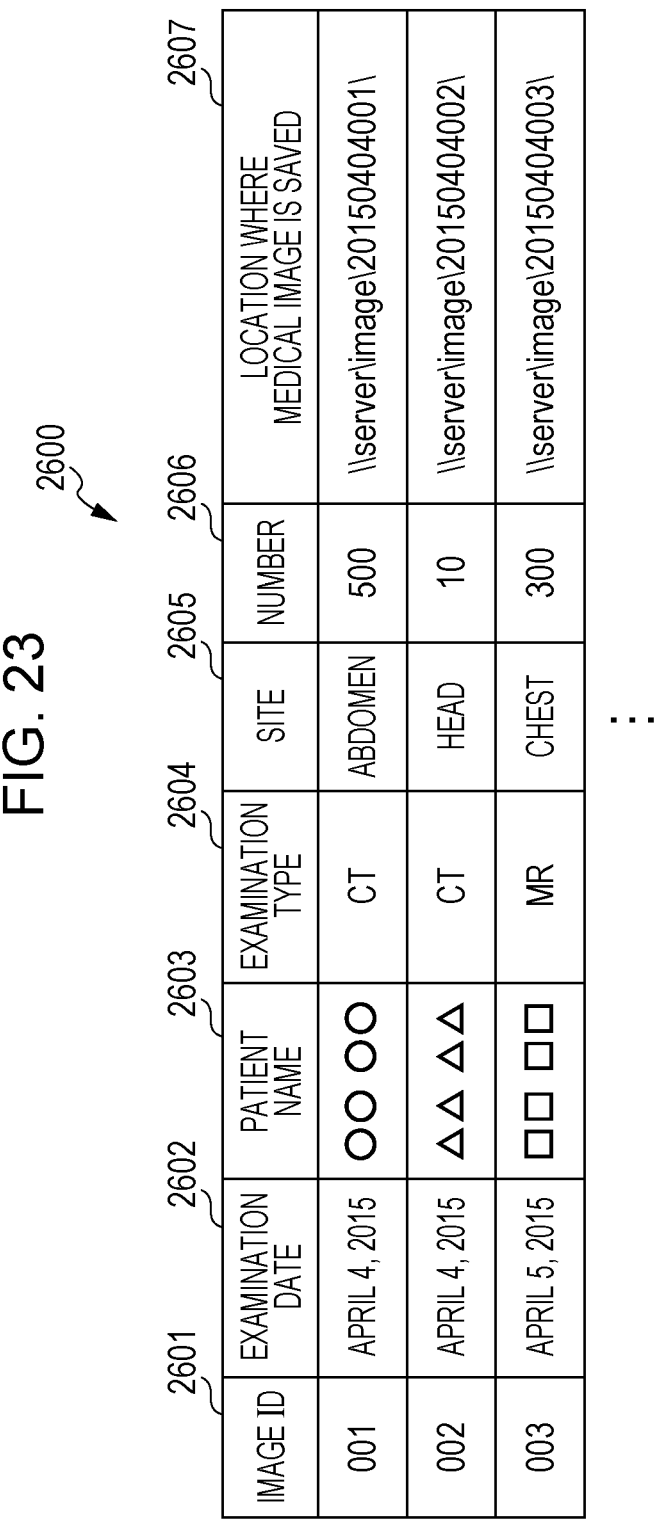
FIG. 23 is a diagram illustrating the table configuration of a medical image management table.
Figure 24:
FIG. 24 is a diagram illustrating a screen configuration of the medical image list screen.

In step S2502, the communication control unit 2411 of the medical image processing server 2102 receives the acquisition request for the medical image list screen transmitted from the client terminal 2101. In step S2503, the screen generating unit 2413 of the medical image processing server 2102 acquires a template for a medical image list screen from the storage unit 2412 and information stored in a medical image management table 2600 illustrated in FIG. 23, and generates a medical image list screen 2700 such as illustrated in FIG. 24. The medical image list screen 2700 includes a medical image list 2701, with a record being created in the medical image list 2701 for each record in the medical image management table 2600. A corresponding image ID 2601 is embedded in each record in the medical image list 2701.

When creating the screen in step S2503, none of a commission button 2702, confirm button 2703, finalize button 2704 and cancel button 2705, which will are laid out in later-described processing, are disposed yet. Further, the medical image list 2701 includes a display button 2706 for each medical image record. The display button 2706 is for displaying the medical image. Accordingly, the display button 2706 is disposed as a button to acquire the medical image corresponding to the record where the display button 2706 is disposed from a medical image saving location 2607, and displaying the medical image.

The medical image management table 2600 is a table for storing information relating to medical images stored in the external memory 2311 of the medical image processing server 2102. The medical image management table 2600 is stored in the external memory 2311 of the medical image processing server 2102. Upon receiving a medical image from the client terminal 2101 or an apparatus of one modality or another, a new record is created in the medical image management table 2600, various types of information are acquired from the medical image DICOM tag, and stored in the medical image management table 2600. Note that the table configuration of the medical image management table 2600 illustrated here is only exemplary, and is not restrictive.

Items of the medical image management table 2600 are image ID 2601, examination date 2602, patient name 2603, examination type 2604, site 2605, number 2606, and medical image saving location 2607. The image ID 2601 is an item storing identification information that is uniquely allocated to each medical image that has been received. The examination date 2602 is an item storing the date on which the medical image was imaged by an apparatus of one modality or another. The patient name 2603 is an item storing the full name of the patient. The site 2605 is an item storing the site of imaging the medical image. The number 2606 is an item storing the number of received medical images that are stored. The medical image saving location 2607 is an item sorting information indicating a folder where the medical images are stored.

In step S2504, the screen generating unit 2413 of the medical image processing server 2102 references one of the records in the medical image management table 2600. Upon having completed the steps of step S2505 through step S2508 regarding the referenced record, determination is made regarding whether or not the processing of step S2505 through step S2508 has been completed for all records in the medical image management table 2600. If determination is made that the processing has been completed, the flow advances to step S2509. That is to say, step S2505 through step S2508 are looped through for all records in the medical image management table 2600. The individual steps in step S2505 through step S2508 will be described next.

In step S2505, the screen generating unit 2413 of the medical image processing server 2102 determines whether the number of medical images of the record being referenced in the number 2606 is a predetermined number or more, and also that commission information of the medical images does not exist in a commission information management table 21500 illustrated in FIG. 32. If both are true, the flow advances to step S2506, and otherwise, the flow advances to step S2507. Determination may also be made regarding whether the number of medical images is larger than the predetermined number, and also that no commission information exists. The number of medical images is set beforehand, to a number from which volume data indicating body parts can be generated from medical images. Alternatively, the number may be based on a number that will keep coarseness in the generated volume data to an inconspicuous level, or a number where the output 3D data will have smooth curved surfaces.

The commission information management table 21500 illustrated in FIG. 32 is a data table storing information relating to generating commissions. One record of the commission information management table 21500 is referred to as "commission information" in the present embodiment. Details of the commission information management table 21500 will be described later.

In step S2506, the screen generating unit 2413 of the medical image processing server 2102 disposes the commission button 2702 to the record of the medical image list 2701 corresponding to the record being referenced. The commission button 2702 is a button that can accept a generating commission (generating instructions) of 3D PDF data including 3D data representing human body parts from a medical image, and generate 3D PDF data including the 3D data. A medical image that has a sufficient number is a medical image regarding which a generating commission can be made, so the commission button 2702 is disposed thereat. Further, in a case where a generating commission can be made but a commission has already been made, a redundant commission raises the processing load on the medical image processing server 2102.

Accordingly, in a case where a generating commission can be made but a commission has already been made, the commission button 2702 is not provided, while the commission button 2702 is provided if no generating commission has been made yet. By distinguishing this display from one medical image to another, the processing load on the medical image processing server 2102 can be reduced, and the user can recognize each medical image regarding which a commission has already been made. Moreover, as a result of the determination in step S2505, in a case where the number of medical images is less than the predetermined number (or may be equal to or less), step S2506 is not executed, so no commission button 2702 is provided for the record of this medical image. Accordingly, the user can be prevented from making commissions of medical images with an insufficient number.

Although an arrangement has been described where the commission button is not disposed, so that further instructions to generate 3D PDF data are not given for medical image records that have already been commissioned, an arrangement may be made where the commission button is displayed in a way that the button cannot be pressed, thereby facilitating user comprehension that the commissioning has already been performed. Alternatively, an arrangement may be made where the commission button is displayed in a different color or shape, or with a different text string, thereby facilitating user comprehension that the commissioning has already been performed. Further, an arrangement may be made where the commission button is disposed, and the disposed commission button can be pressed, but an error is returned when the commission button is pressed and no commission is placed.

In step S2507, the screen generating unit 2413 of the medical image processing server 2102 determines whether or not commission information corresponding to the medical image of the record being referenced exists in the commission information management table 21500, and whether or not a status 21507 of the commission information is "currently confirming commissioning party". That is to say, determination is made regarding whether or not generating of 3D PDF data using the medical image of the record being reference has already been commissioned, and commission results corresponding to the commission have already been output. If so, the flow advances to step S2508, and otherwise, the flow is returned to step S2504 and whether or not the loop has been completed is determined. In a case where determination is made that the loop has been completed, the flow advances to step S2509.

In step S2508, the screen generating unit 2413 of the medical image processing server 2102 disposes the confirm button 2703, finalize button 2704, and cancel button 2705 at the record of the commission button 2702 corresponding to the record being referenced in the medical image list 2701.

The confirm button 2703 is a button for confirming the commission results. When the confirm button 2703 is pressed, a screen where the generated 3D data can be viewed is displayed. The finalize button 2704 is a button for finalizing the commission. When the finalize button 2704 is pressed, the 3D PDF data is downloaded to the client terminal 2101, and billing processing according to the commission is performed. The cancel button 2705 is a button for canceling the commission. The confirm button 2703 is thus displayed in a case where commission results are output, so the user who is the commissioning part can recognize for each medical image whether or not commission results have been output.

When step S2508 is complete, the flow returns to step S2504 and determination is made regarding whether or not the loop has been completed. If determination is made regarding that the loop has been completed, the flow advances to step S2509.

In step S2509, The communication control unit 2411 of the medical image processing server 2102 transmits the medical image list screen 2700 generated in step S2503 through step S2508 to the client terminal 2101.

In step S2510, the communication control unit 2401 of the client terminal 2101 receives the medical image list screen 2700 transmitted from the medical image processing server 2102. In step S2511, the rendering unit 2404 of the client terminal 2101 renders the received medical image list screen 2700, and the display unit 2402 displays the rendering results on the display 2310 of the client terminal 2101.

After displaying the medical image list screen 2700, the client terminal 2101 executes the flowcharts illustrated in FIGS. 25, 29, 31, 35, 38, and 40, by parallel processing.

FIG. 25 is a flowchart diagram illustrating a series of processing for displaying a commissioning content input screen 21100. The steps of step S2801, step S2801, step S2807, and step S2808 in FIG. 25 are processing executed by the CPU 2301 of the client terminal 2101. The steps of step S2803 through step S2806 in FIG. 25 are processing executed by CPU 2301 of the medical image processing server 2102. Note that the contents of processing and the order of processing illustrated in FIG. 25 are only exemplary, and are not restrictive.

In step S2801, the operation accepting unit 2405 of the client terminal 2101 determines whether or not an operation of pressing the commission button 2702 in the medical image list screen 2700 has been accepted. In a case where determination is made that an operation of pressing the commission button 2702 has been accepted, the flow advances to step S2802. In a case where determination is made that an operation of pressing the commission button 2702 has not been accepted, the flow stands by.

In step S2802, the Web browser unit 2403 of the client terminal 2101 acquires the image ID embedded in the record of the commission button 2702 that has accepted a pressing operation. The communication control unit 2401 of the client terminal 2101 then transmits an acquisition request for a commission content input screen, for commissioning generation of 3D PDF data using of the medical image that this image ID indicates ("object medical image") in FIG. 25.

In step S2803, the communication control unit 2411 of the medical image processing server 2102 receives the acquisition request for the commission content input screen transmitted from the client terminal 2101.

In step S2804, the display part identifying unit 2414 of the medical image processing server 2102 identifies the display part from the part of the object medical image. That is to say, parts regarding which 3D data can be generated from the object medical image are identified. This will be described in detail. The site 2605 and examination type 2604 of the object medical image are referenced, and identifies records having a site 2901 and examination type 2902 matching these from a display part management table 2900 illustrated in FIG. 26. The display part management table 2900 is a data table stipulating display parts 2904 regarding which 3D data can be generated for each site 2901. Although description is made in the present embodiment that parts that can be displayed from medical images are identified using such a display part management table 2900, parts regarding which 3D data can be generated may be identified by analyzing medical images instead. That is to say, medical images may be analyzed by image processing, and analysis made regarding what parts are in the image. A method may also be used where the medical image is formed into volume data and three-dimensionally analyzed.

The display part management table 2900 is a data table for storing information relating to human body parts. The display part management table 2900 is stored in the external memory 2311 of the medical image processing server 2102. Note that the configuration of the display part management table 2900 is exemplary, and not restrictive.

The display part management table 2900 contains the items of site 2901, examination type 2902, type of organ 2903, display part 2904, extraction algorithm 2905, sample data 2906, and display position 2907. The site 2901 is an image storing information indicating the range of the human body in which the display part 2904 is included. The examination type 2902 is an item storing information indicating the modality of examination type, such as X-ray CT, MRI, or the like. The type of organ 2903 is an item storing information that indicating the type of organ to which the display part 2904 belongs. The display position of the display part 2904 in a later-described display part selection space 21101 is decided in accordance with the type of organ 2903. For example, each classification indicated by the type of organ 2903 is displayed on the formation part 2904. The display part 2904 is an item storing information indicating parts regarding which 3D data can be generated. The extraction algorithm 2905 is an item storing information indicating a known algorithm for extracting the display part 2904 from the medical image. The sample data 2906 is an item sorting information indicating the saving location of the file of 3D data for display on a later-described default display orientation selection space 1103. The 3D data is 3D data indicating a sample of the display part 2904 (hereinafter referred to as sample data). The display position 2907 is an item storing information indicating coordinates in three-dimensional space where the 3D data that the sample data 2906 represents is placed. This display part management table 2900 is stored in the external memory 2311 of the medical image processing server 2102 beforehand, by the user who manages the medical image processing server 2102.

In step S2805, the screen generating unit 2413 of the medical image processing server 2102 generates a commission content input screen that can accept selection regarding parts that can be generated, identified in step S2804.

FIG. 28 illustrates an example of the commission content input screen 21100. The commission content input screen 21100 has a display part selection space 21101, a display orientation selection space 21102, the default display orientation selection space 21103, and an OK button 21104. The display part selection space 21101 is a checkbox style selection space for the user, who is the commissioning party, to select the human body part to be three-dimensionally displayed. This selection space accepts selection of body parts identified in step S2804. That is to say, selection of parts not identified in step S2804 is not accepted. A selection space that only includes parts identified in step S2804 is preferable. This arrangement enables selection of parts regarding which 3D data can be generated, identified from the object medical image, to be accepted, so even if the user, who is the commissioning party, does not have extensive knowledge of medical images, commissioning generating of parts than cannot be generated can be suppressed.

Although description has been made that commissioning generating of parts regarding which 3D data cannot be generated is suppressed by not providing any selection space for parts not identified in S2804, an arrangement may be made where spaces for these parts are provided, but displayed as selection spaces that cannot be selected. Alternatively, these selection spaces may be displayed in different colors or shapes, or with the text string struck out. Further, an arrangement may be made where these items can be selected, but the OK button 21104 cannot be pressed. For example, the OK button 21104 may be hidden, or the color or shape changed. Further, control may be effected so that a generating commission is not performed by returning an error in a case where the OK button 21104 is pressed.

The display orientation selection space 21102 is a checkbox type selection space for selecting the display orientation, in order to accept changing instructions for the display orientation of the 3D data in the 3D PDF data. Upon accepting selection of a display orientation from the display orientation selection space 21102, an object can change the display orientation in the 3D PDF data (a later-described capture image) is disposed. That is, upon detection of this object being pressed, the 3D data is rotated and the display orientation corresponding to the object is displayed toward the user (at the near side). The display orientation selection space 21102 displays a display orientation name 1001 in a display orientation management table 21000 illustrated in FIG. 27, as a selection item.

The display orientation management table 21000 is a data table sorting information relating to the display orientations selectable from the display orientation selection space 21102. The display orientation management table 21000 is stored in the external memory 2311 of the medical image processing server 2102. Note that the table configuration of the display orientation management table 21000 is only exemplary, and is not restrictive.

The display orientation management table 21000 includes as items, the display orientation name 21001, rotation axis 21002, and rotation angle 21003. The display orientation name 21001 is an item storing information representing the name of the display orientation. Six display orientations are defined in FIG. 27 in the present embodiment, but this is not restrictive. The rotation axis 21002 is an item storing information representing the rotation axis used to rotate to the display orientation that the display orientation name 21001 indicates. The rotation angle 21003 is an item storing information representing the rotation angle used to rotate to the display orientation that the display orientation name 21001 indicates. The rotation axis 21002 and rotation angle 21003 illustrated in FIG. 27 are stored as examples of parameters assuming that the viewpoint in the three-dimensional space in which the 3D data is situated is not changed, and the 3D data is rotated in the present embodiment. In an arrangement where the 3D data itself is not rotated, and the viewpoint is changed in the three-dimensional space in which the 3D data is situated, corresponding parameters are stored in the rotation axis 21002 and rotation angle 21003.

Returning to FIG. 28, the default display orientation selection space 21103 is a space for selection of a default display orientation of the 3D data in the 3D PDF data (initial state when the 3D PDF data is opened). The default display orientation can be changed by the sample data of the part selected by the display part selection space 21101 being displayed in the default display orientation selection space 21103, and the user changing the display orientation of the sample data by a dragging operation by a mouse or the like. The OK button 21104 is a button for transmitting the commission contents accepted at the commission content input screen 21100 to the medical image processing server 2102. The image ID 601 of the object medical image is embedded in the OK button 21104. Although omitted from illustration in the commission content input screen 21100 in FIG. 27, an input form for inputting commissioning party information of the user, such as name, contact information (telephone number, address), and so forth, is also provided.

In step S2806, the communication control unit 2411 of the medical image processing server 2102 transmits the commission content input screen 21000 generated in step S2805 to the client terminal 2101.

In step S2807, the communication control unit 2401 of the client terminal 2101 receives the commission content input screen 21000 transmitted from the medical image processing server 2102. In step S2808, the rendering unit 2404 of the client terminal 2101 renders the received commission content input screen 21100, and the display unit 2402 displays the rendering results on the display 2310 of the client terminal 2101. The user, who is the commissioning party, then makes input of the commission contents to the commission content input screen 21100 that has been displayed in this way.

Figure 29:
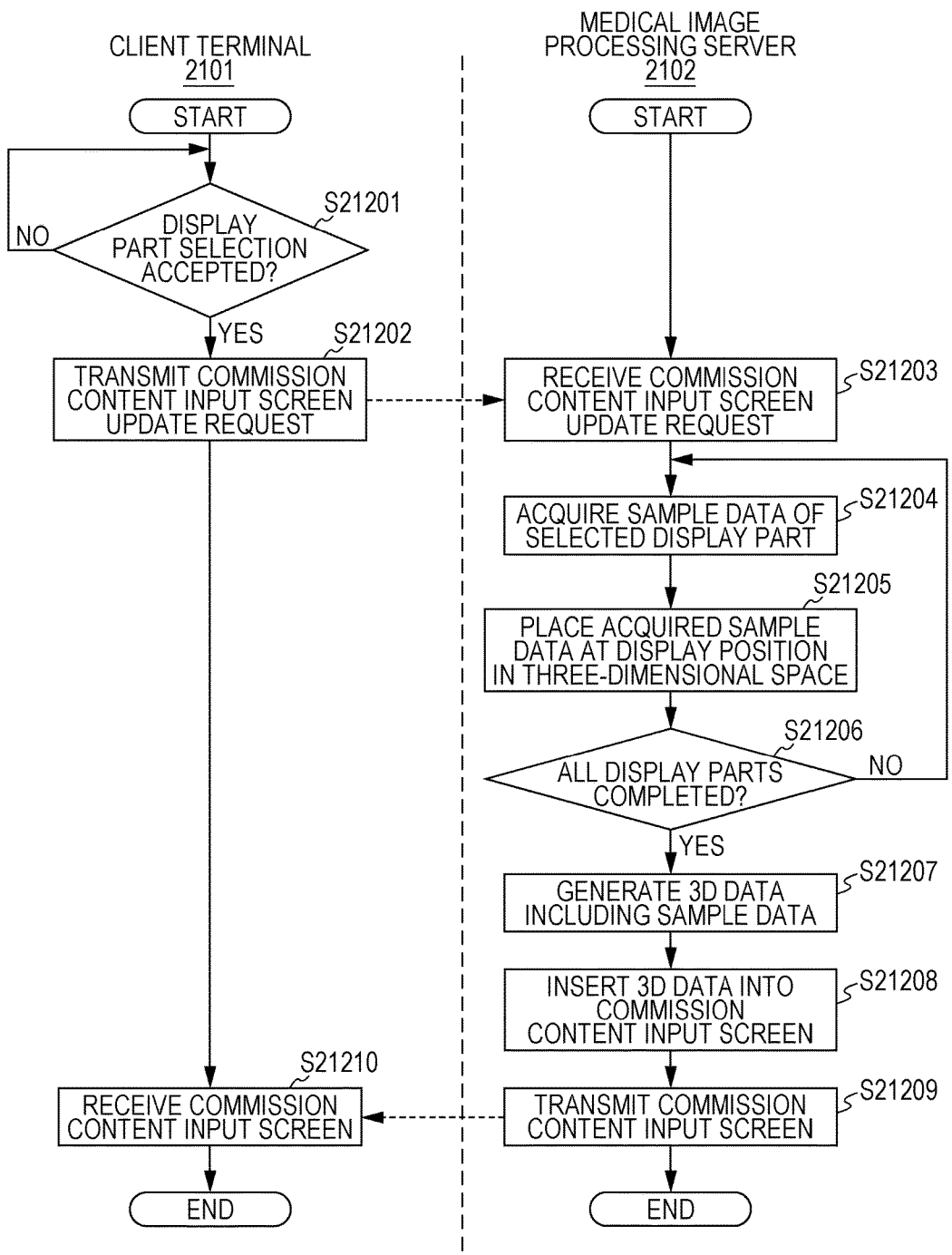
FIG. 29 is a flowchart diagram illustrating a series of processing executed in a case where selection of a display part has been accepted at the commission content input screen.

FIG. 29 is a flowchart diagram illustrating a series of processing executed in a case where selection of a display part has been accepted. The steps of step S21201, step S21202, and step S21210 in FIG. 29 are processing executed by the CPU 2301 of the client terminal 2101. The steps of step S21203 through step S21209 in FIG. 29 are processing executed by CPU 2301 of the medical image processing server 2102. Note that the contents of processing and the order of processing illustrated in FIG. 29 are only exemplary, and are not restrictive.

In step S21201, the operation accepting unit 2405 of the client terminal 2101 determines whether or not a selection has been accepted regarding the display part displayed at the display part selection space 21101 on the commission content input screen 21100. That is to say, determination is made regarding whether or not any of the checkboxes in the display part selection space 21101 have been checked. In a case where determination is made that a selection has been accepted regarding the display part, the flow advances to step S21202. In a case where determination is made that a selection has not been accepted regarding the display part, the flow stands by.

In step S21202, the communication control unit 2401 of the client terminal 2101 transmits an update request of the commission content input screen 21100, including information relating to the selected display part, to the medical image processing server 2102. In a case where selection has already been made regarding the display orientation at the default display orientation selection space 21103, information relating to the display orientation (rotation axis, rotation angle) also is acquired, and included in the update request.

In step S21203, the communication control unit 2401 of the medical image processing server 2102 receives the update request for the commission content input screen 21100 transmitted from the client terminal 2101.

In step S21204, the 3D data generating unit 2420 of the medical image processing server 2102 acquires sample data of the selected display part from information relating to the selected display part included in the update request received in step S21203. The selected display part is identified from the display part 2904 in the display part management table 2900, and sample data is acquired from the saving location that the sample data 2906 of the identified record indicates.

In step S21205, the 3D data generating unit 2420 of the medical image processing server 2102 places the sample data acquired in step S21204 at the position in the three-dimensional space indicated by the display position 2907. The display position 2907 of the record identified in step S21204 is reference and the position of placement is decided. The layout relationship of each sample data here is preferably in the same layout relationship as in the human body structure. That is to say, the sample data for each part is laid out in the same way as the structure of the human body. For example, if "lumbar spine" and "sacrum" are to be laid out, the "sacrum" is paced beneath the "lumbar spine", as in a human body. Thus, if multiple display parts are selected, the layout relationship between these parts is the same layout relationship as in a human body, so natural 3D data of the structure of the human body can be output. In order to realize this, the layout relationship of the three-dimensional space indicated by the display position 2907 preferably stores positions taking this sort of layout relationship into consideration.

In step S21206, the 3D data generating unit 2420 of the medical image processing server 2102 determines whether or not all sample data corresponding to the selected display parts has been placed in the three-dimensional space. In a case where determination is made that all data has been placed, the flow advances to step S21207. Otherwise, the flow returns to step S21204. Thus, all selected display parts are placed in the three-dimensional space.

In step S21207, the 3D data generating unit 2420 of the medical image processing server 2102 generates 3D data including all sample data placed in the three-dimensional space. That is to say, in a case where "lumbar spine" and "pelvis" have been selected from the display part selection space 21101, sample data of these two is placed in the three-dimensional space. 3D data made up of the sample data of these two is then generated.

In step S21208, the 3D data inserting unit 2415 of the medical image processing server 2102 inserts the 3D data generated in step S21207 to the default display orientation selection space 21103 of the commission content input screen 21100 generated in step S2805. The term insert may mean embedding 3D data into the screen, and may mean the 3D data being linked to from the screen. The 3D data displayed in the default display orientation selection space 21103 thus changes in accordance with the display parts selected in the display part selection space 21101. Accordingly, the user can change the default display orientation while operating 3D data in a state near to that of the commission results.

In step S21209, the communication control unit 2411 of the medical image processing server 2102 transmits the commission content input screen 21100 into which the 3D data has been inserted in step S21208 to the client terminal 2101.

In step S21210, the communication control unit 2401 of the client terminal 2101 receives the commission content input screen 21100 transmitted from the medical image processing server 2102. The rendering unit 2404 then renders the received commission content input screen 21100, and the display unit 2402 displays the rendered results on the display 2310 of the client terminal 2101. Although the present embodiment has been described with the entire screen (Web page) being updated, an arrangement may be made where only partial updating is made of the default display orientation selection space 21103.

Figure 30:
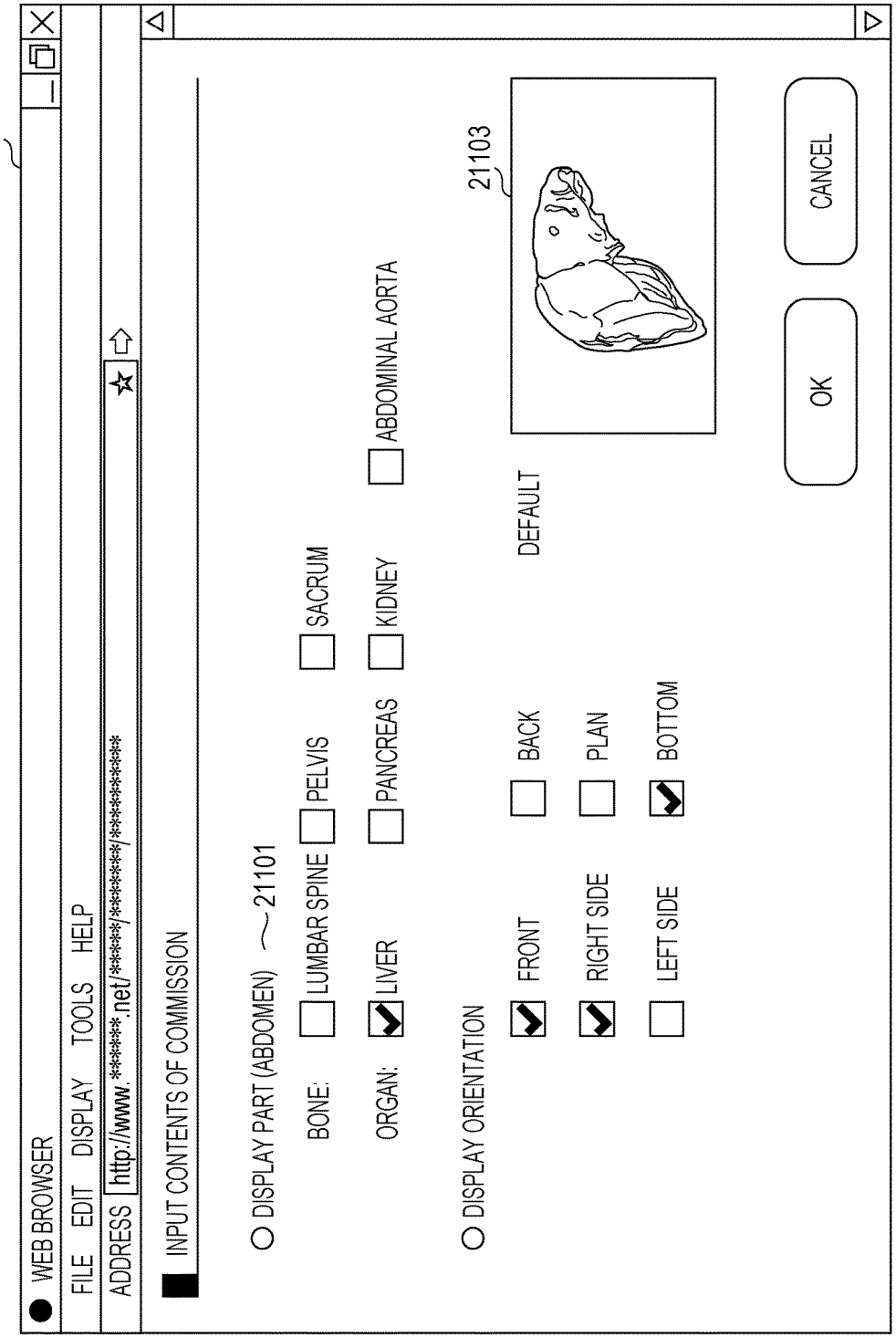
FIG. 30 is a diagram illustrating an example having accepted selection of a display part and display orientation in the commission content input screen.

FIG. 30 illustrates an example of the results of having updated the commission content input screen 21100 in this way. FIG. 30 is the commission content input screen 21100 in a case of "liver" having been selected at the display part selection space 21101. AS a result of "liver" having been selected, a record where the display part 2904 in the display part management table 2900 is "liver" is identified, and sample data for "liver" is acquired from the sample data 2906 of the identified record. This sample data is then placed at the position in the three-dimensional space indicated by the display position 2907 of the identified record, and 3D data is generated. Inserting the generated 3D data into the default display orientation selection space 21103 of the commission content input screen 21100 yields what is illustrated in FIG. 30. The 3D data displayed on the default display orientation selection space 21103 can be rotated on a center point of the 3D data by a dragging operation by an input device such as a mouse or the like. This rotation enables the display orientation to be freely set.

FIG. 31 is a flowchart diagram illustrating a series of processing of accepting commission content. The steps of step S21401, step S21402, and step S21419 in FIG. 31 are processing executed by the CPU 2301 of the client terminal 2101. The steps of step S21403 through step S21418 in FIG. 31 are processing executed by CPU 2301 of the medical image processing server 2102. Note that the contents of processing and the order of processing illustrated in FIG. 31 are only exemplary, and are not restrictive.

In step S21401, the operation accepting unit 2405 of the client terminal 2101 determines whether or not a pressing of the OK button 21104 of the commission content input screen 21100 has been accepted. In a case where determination is made that a pressing of the OK button 21104 has been accepted, the flow advances to step S21402. In a case where determination is made that a pressing of the OK button 21104 has not been accepted, the flow stands by.

In step S21402, the Web browser unit 2403 of the client terminal 2101 acquires the image ID embedded in the OK button 21104 that has accepted the pressing operation, and the commission contents (display part, display orientation, default display orientation, etc.) input to the commission content input screen 21100. The communication control unit 2401 of the client terminal 2101 generates 3D data of the selected display part from the medical image indicated by this image ID (referred to as "object medical image" in FIG. 31), and commissions the medical image processing server 2102 to generate 3D PDF data. That is to say, the acquired image ID and commission contents are transmitted to the medical image processing server 2102.

In step S21403, the communication control unit 2411 of the medical image processing server 2102 receives the commission contents and image ID transmitted from the client terminal 2101 (accepting unit). That is to say, the contents selected at the commission content input screen 21100 are accepted. In step S21404, the storage unit 2412 of the medical image processing server 2102 creates a new record (commission information) in a commission information management table 21500 illustrated in FIG. 32, and registers the received commission contents and image ID in this record.

The commission information management table 21500 is a data table that stores information relating to generating commissions of 3D PDF data. The commission information management table 21500 is stored in the external memory 2311 of the medical image processing server 2102. Note that the table configuration of the commission information management table 21500 is only exemplary, and is not restrictive.

Items that the commission information management table 21500 has are a commission ID 21501, image ID 21502, display part 21503, display orientation 21504, default 21505, and commissioning party information 21506. Further included are status 21507, 3D data saving location 21508, and 3D PDF data saving location 21509.

The commission ID 21501 is an item storing identifying information uniquely allocated to each commission information. The image ID 21502 is an item storing the image ID 2601 of the medical image used for generating 3D data that has been commissioned. The display part 21503 is an item storing the display part that has been selected at the display part selection space 21101. The display orientation 21504 is an item storing the display orientation that has been selected in the display orientation selection space 21102. The default 21505 is an item storing the default display orientation that has been selected in the default display orientation selection space 21103. The commissioning party information 21506 is an item storing information of the commissioning part such as name and address. The status 21507 is an item storing the state of progress of the commission for generating 3D PDF data. When a commission has been accepted, this is commission accepted, when the commission results are output in later-described processing, this is confirming at commissioning party, once finalization of the commission is performed this is commission finalized, when the commission contents are completed this is billing, and when the billed payment has been received, the status is commission completed. Other statuses may be stored as well, as necessary. The 3D data saving location 21508 is an item storing the saving location of generated 3D data, which will be described later. The 3D PDF data saving location 21509 is an item storing the saving location of generated 3D PDF data, which will be described later.

In step S21405, the volume data generating unit 2418 of the medical image processing server 2102 acquires the object medical image from the medical image saving location 2607, and generates volume data using the object medical image. There are multiple object medical images, and the volume data is generated by layering these. Conventional art is used to generate volume data, so detailed description will be omitted.

In step S21406, the display part extracting unit 2419 of the medical image processing server 2102 extracts the display part 21503 regarding which the commission has been accepted, from the volume data generated in step S21405. The display part extracting unit 2419 identifies the display part 2904 corresponding to the display part 21503, and automatically extracts the commissioned human body part by using an extraction algorithm 2905 corresponding to the display part 2904. The method for extracting a particular part from volume data also is conventional art, so detailed description will be omitted. Reference numeral 21601 in FIG. 33 denotes an overview of generating volume data in steps S21405 and S21406, and extracting the specified part. Thus, a 3D image of a specified part is generated from multiple medical images.

Figure 33:
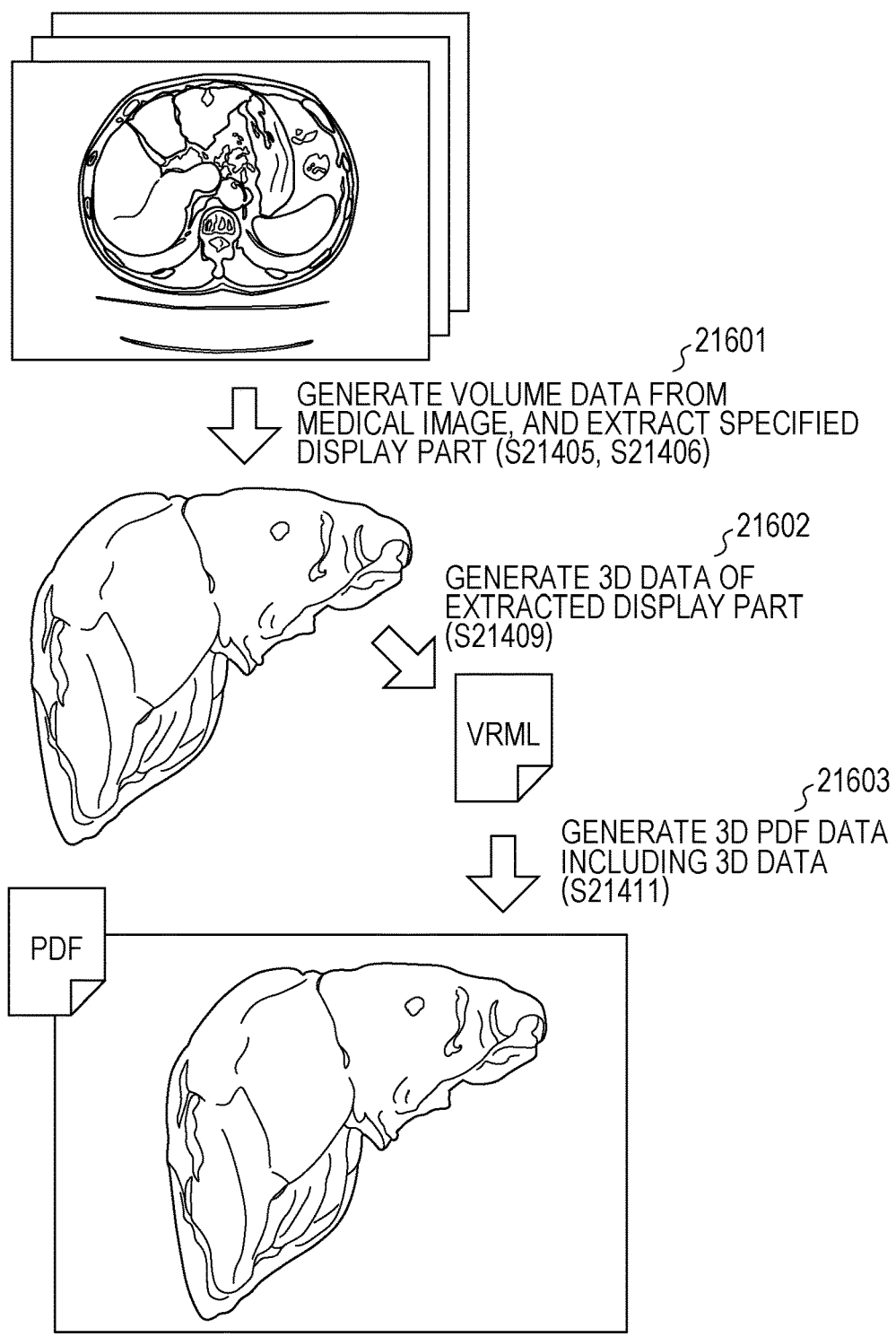
FIG. 33 is a diagram illustrating the overview of generating 3D PDF data from medical images.

FIG. 33 illustrates an example of the liver. In step S21407, the 3D control unit 2417 of the medical image processing server 2102 determines whether or not extraction of the commissioned human body part has succeeded. There is a possibility that the commissioned human body part cannot be extracted even by using the extraction algorithm 2905, if the medical images are unclear or the number of medical images is insufficient. Accordingly, in a case where the extraction algorithm 2905 is executed and an error is returned, determination is made that extraction has failed. In a case where determination is made that extraction of the commissioned human body part has been successful, the flow advances to step S21409. Otherwise, i.e., in a case where determination is made that extraction has failed, the flow advances to step S21408.

In step S21408, the communication control unit 2411 of the medical image processing server 2102 transmits processing results to the client terminal 2101, to the effect that the commissioned extraction of the human body part has failed. In step S21419, the communication control unit 2401 of the client terminal 2101 accepts the processing results, and notifies the user, who is the commissioning party.

On the other hand, in a case where extraction has been successful, in step S21409 the 3D data generating unit 2420 of the medical image processing server 2102 generates 3D data of the part extracted in step S21406 (three-dimensional data generating unit). VRML or STL format data is generated using the volume data from which the commission part has been extracted. Generating 3D data also uses conventional art, so description will be omitted. This processing corresponds to the part indicated by 21602 in FIG. 33.

In step S21410, the storage unit 2412 of the medical image processing server 2102 saves the 3D data generated in step S21409 in the external memory 2311 of the medical image processing server 2102. The location of saving this 3D data of the commission information being processed, that has been newly created in step S21404, is stored in the 3D data saving location 21508 of the corresponding record.

Figure 34A:
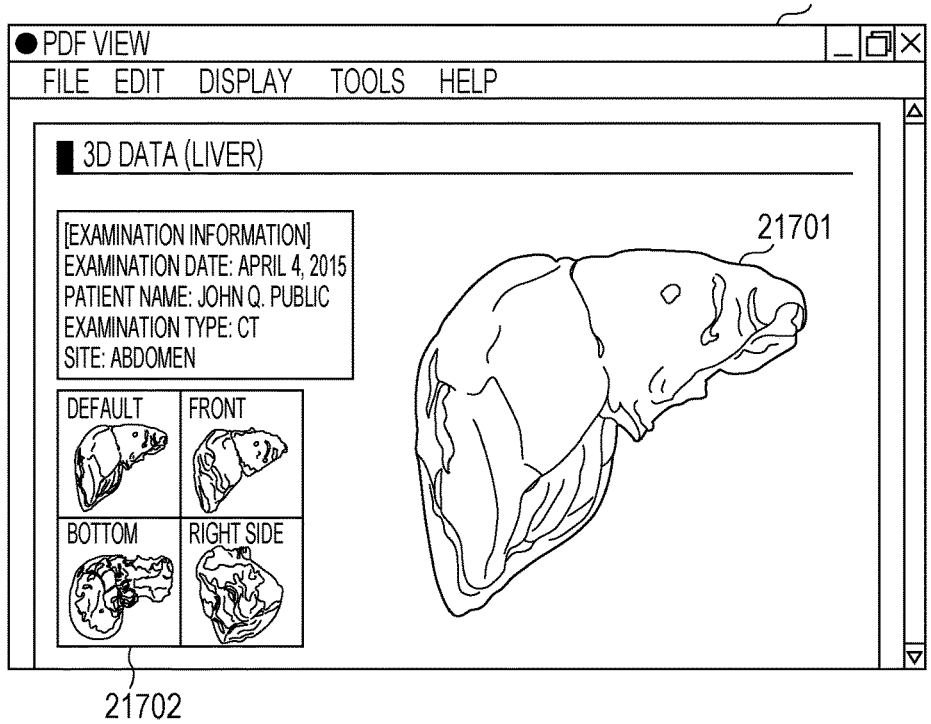
FIGS. 34A and 34B are diagrams illustrating 3D PDF data displayed.
Figure 34B:
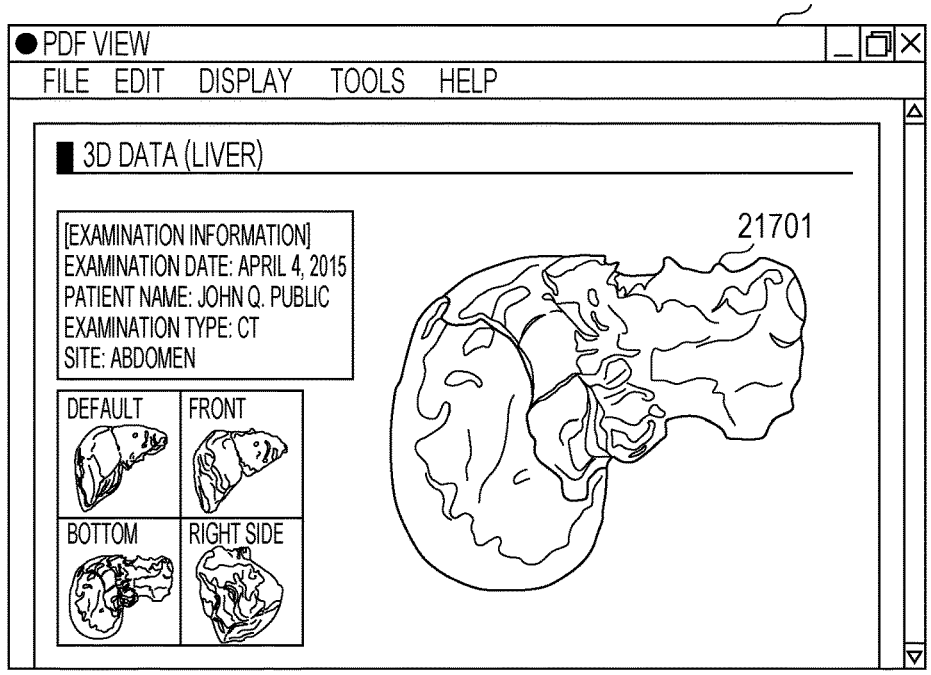

In step S21411, the 3D PDF data generating unit 2421 of the medical image processing server 2102 generates 3D PDF data including the 3D data generated in display object 1409 (document data generating unit) in step S21409. The 3D data is acquired from the 3D data saving location 21508 of the commission information being processed, and PDF data (document data) including this 3D data is generated. The method of generating 3D PDF data also uses conventional art, so description will be omitted. In FIG. 33, this corresponds to the part denoted by 21603. FIGS. 34A and 34B are display examples of opening the 3D PDF data using the PDF viewer. FIG. 34A is a display example of 3D PDF data 21700. As denoted by reference numeral 21701 in FIG. 34A, inserting the 3D data into the PDF data in step S21411 enables the 3D data to be viewed in the PDF viewer.

In step S21412, the 3D control unit 2417 of the medical image processing server 2102 opens the 3D data file saved in step S21410 and places the 3D data in three-dimensional space.

In step S21413, the display orientation changing unit 2422 of the medical image processing server 2102 changes the display orientation of the 3D data opened in step S21412 to one of the display orientations stored in the display orientation 21504 in the commission information being processed.

In step S21414, the 3D control unit 2417 of the medical image processing server 2102 captures (takes a screenshot) of the 3D data of which the display orientation has been changed in step S21413, and generates a capture image. Thus, a capture image is generated of the display part of which the display orientation has been changed.

In step S21415, the 3D control unit 2417 of the medical image processing server 2102 determines whether capturing has been performed for all display orientations to be stored in the display orientation 21504 of the commission information being processed. The display orientation as used here includes the default display orientation as well. In a case where determination is made that this has been executed for all, the flow advances to step S21416. In a case where determination is made that this has not been executed for all, i.e., there remain display orientations to be executed, the flow advances to step S21412.

In step S21416, the 3D PDF data generating unit 2421 of the medical image processing server 2102 inserts the capture image generated in step S21414 into the 3D PDF data. At this time, the capture image is inserted in a manner correlated with the rotation axis 21002 and rotation angle 21003 of the display orientation that the capture image assumes. The capture image (aforementioned object) is set to a state capable of accepting a pressing operation. Thus, in a case where a selection of the capture image has been accepted, the 3D data can be rotated to the display orientation that the selected capture image indicates. Reference numeral 21702 in FIG. 34A indicates the results of having inserted capture images. Thus, 3D data of the display orientations that have been selected is in the capture images, so the user can comprehend the results of having changed the display orientation more intuitively than of a text string indicating the display orientation is displayed. The default display orientation also has a capture image generated, which is advantageous in that the 3D PDF data does not need to be opened again to return the display orientation to the default display orientation.

In step S21417, the storage unit 2412 of the medical image processing server 2102 saves the 3D PDF data generated in step S21416 in the external memory 2311 of the medical image processing server 2102. The saving location is then stored in the 3D PDF data saving location 21509 of the commission information being processed.

In step S21418, the communication control unit 2411 of the medical image processing server 2102 transmits processing results to the client terminal 2101 to the effect that extracting the commission part and generating 3D PDF data has been successful. In step S21419, the communication control unit 2401 of the client terminal 2101 notifies the user, who is the commissioning party.

Once processing up to step S21419 is completed, the client terminal 2101 updates the medical image list screen 2700. That is to say, the series of processing illustrated in FIG. 22 is executed. Thus, the medical image list screen 2700 is updated to the newest state.

FIG. 35 is a flowchart diagram illustrating a series of processing of confirming commission results. The steps of step S21801, step S21802, step S21812, and step S21813 in FIG. 35 are processing executed by the CPU 2301 of the client terminal 2101. The steps of step S21803 through step S21811 in FIG. 35 are processing executed by CPU 2301 of the medical image processing server 2102. Note that the contents of processing and the order of processing illustrated in FIG. 35 are only exemplary, and are not restrictive.

In step S21801, the operation accepting unit 2405 of the client terminal 2101 determines whether or not a pressing operation of the confirm button 2703 of the medical image list screen 2700 has been accepted. In a case where determination is made that a pressing operation of the confirm button 2703 has been accepted, the flow advances to step S21802. In a case where determination is made that a pressing operation of the confirm button 2703 has not been accepted, the flow stands by.

In step S21802, the Web browser unit 2403 of the client terminal 2101 acquires the image ID embedded in the recorded of the confirm button 2703 that has accepted the pressing operation. The communication control unit 2401 of the client terminal 2101 then transmits an acquisition request for confirmation results of the medical image that this image ID indicates (hereinafter referred to as "object medical image" in FIG. 35), including this image ID, to the medical image processing server 2102.

In step S21803, the communication control unit 2411 of the medical image processing server 2102 receives the commission results acquisition request transmitted from the client terminal 2101.

In step S21804, the storage unit 2412 of the medical image processing server 2102 acquires the processing results of the object medical image from the external memory 2311. The image ID of the object medical image has been received from the client terminal 2101, so the image ID 21502 corresponding to this image ID is identified from the records in the commission information management table 21500. The 3D data is then acquired from the 3D data saving location 21508 of the identified record (hereinafter referred to as "commission information being processed" in the description of FIG. 35).

In step S21805, the screen generating unit 2413 of the medical image processing server 2102 acquires a template for a commission results confirmation screen from the storage unit 2412, and the record on the medical image management table 2600 corresponding to the image ID 21502 received in step S21804. These are then used to generate a commission results confirmation screen. The 3D data acquired in step S21804 is inserted into the generated commission results confirmation screen. The template of the commission results confirmation screen preferably is of the same layout as the 3D PDF data that has been generated. The term insert may mean embedding 3D data into the screen, and may mean the 3D data being linked to from the screen.

Figure 36A:
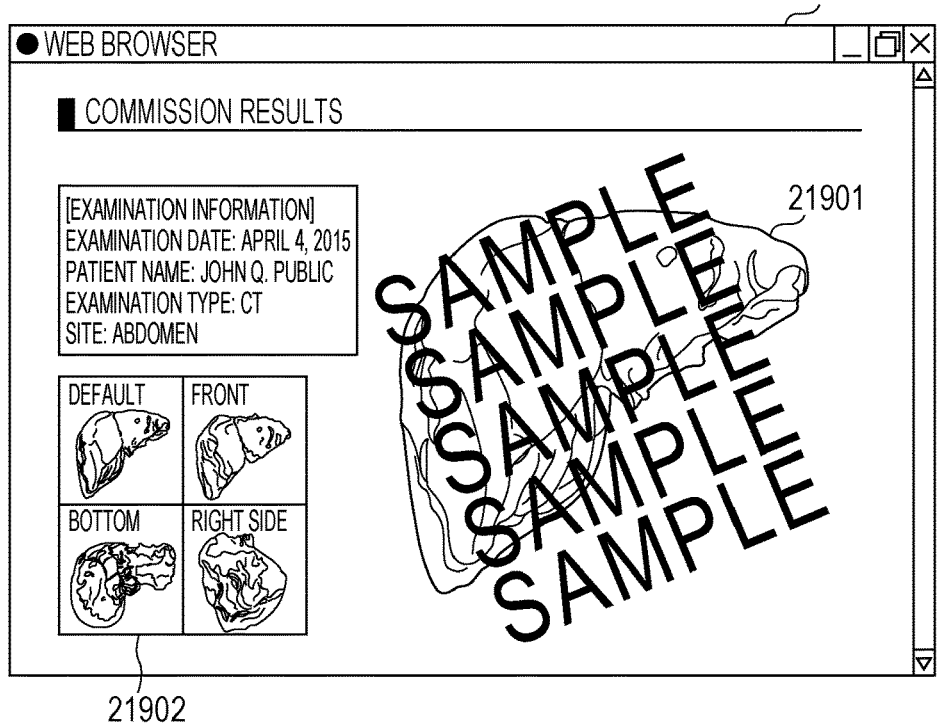
FIGS. 36A and 36B are diagrams illustrating screen configurations of a commission results confirmation screen.
Figure 36B:
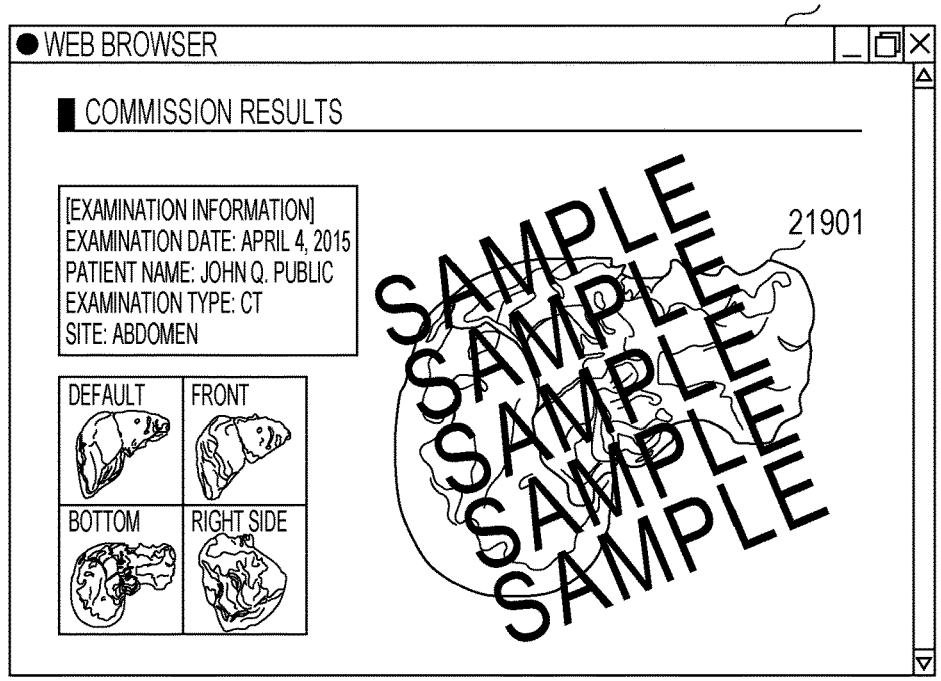

FIGS. 36A and 36B illustrate display examples of a case of inserting the 3D data into the commission results confirmation screen. FIG. 36A is a display example of a commission results confirmation screen 21900. Inserting the 3D data into the commission results confirmation screen in step S21805 enables the 3D data to be displayed in the Web browser. A further arrangement may be made, as denoted by reference numeral 21901 in FIG. 36A, where a character string such as "SAMPLE" is superimposed on the 3D data, to prevent the user, who is the commissioning party, from capturing the 3D data at the client terminal 2101. The character string or an image is placed in a layer above the layer where the 3D data of the commission results confirmation screen 21900 is displayed, and the opacity is adjusted, to serve as a watermark. Alternatively, the character string may be included in the 3D data.

In step S21806, the 3D control unit 2417 of the medical image processing server 2102 opens the file of the 3D data acquired in step S21804, and places the 3D data in three-dimensional space.

In step S21807, the display orientation changing unit 2422 of the medical image processing server 2102 changes the display orientation of the 3D data opened in step S21806 to one of the display orientations stored in the display orientation 21504 of the commission information being processed identified in step S21804.

In step S21808, the 3D control unit 2417 of the medical image processing server 2102 captures (takes a screenshot) of the 3D data of which the display orientation has been changed in step S21807, and generates a capture image. Thus, a capture image is generated of the display part of which the display orientation has been changed.

In step S21809, the 3D control unit 2417 of the medical image processing server 2102 determines whether capturing has been performed for all display orientations to be stored in the display orientation 21504 of the commission information being processed. The display orientation as used here includes the default display orientation as well. In a case where determination is made that this has been executed for all, the flow advances to step S21810. In a case where determination is made that this has not been executed for all, i.e., there remain display orientations to be executed, the flow advances to step S21806.

In step S21810, the capture image insertion unit 2416 of the medical image processing server 2102 inserts the capture image generated in step S21808 into the commission results confirmation screen 21900, so that the layout is the same as that of the generated 3D PDF data. At this time, the capture image is inserted in a manner correlated with the rotation axis 21002 and rotation angle 21003 of the display orientation that the capture image assumes. The capture image (aforementioned object) is set to a state capable of accepting a pressing operation. Thus, in a case where a selection of the capture image has been accepted, the 3D data can be rotated to the display orientation that the capture image indicates. Reference numeral 21902 in FIG. 36A indicates the results of having inserted capture images. Thus, 3D data of the display orientations that have been selected is in the capture images, so the user can comprehend the results of having changed the display orientation more intuitively than of a text string indicating the display orientation is displayed. The layout is the same as that of the 3D PDF data in FIG. 34A, so the processing results are easier to comprehend. The default display orientation also has a capture image generated, which is advantageous in that the 3D PDF data does not need to be opened again to return the display orientation to the default display orientation.

In step S21811, the communication control unit 2411 of the medical image processing server 2102 transmits the commission results confirmation screen 21900 generated in step S21810 to the client terminal 2101.

In step S21812, the communication control unit 2411 of the client terminal 2101 receives the commission results confirmation screen 21900 transmitted from the medical image processing server 2102. The communication control unit 2401 receives the commission results confirmation screen 21900 transmitted from the medical image processing server 2102. The rendering unit 2404 renders the received commission results confirmation screen 21900, and the display unit 2402 displays the rendering results on the display 2310 of the client terminal 2101.

Thus, when having the commission results to be confirmed, the commission results confirmation screen is presented as a Web page having the same layout as the 3D PDF data, and not as the 3D PDF data. This can prevent the user, who is the commissioning party, from just acquiring the 3D PDF data without performing the processing of finalizing the confirmation, described later in FIG. 38.

Next, operations in the commission results confirmation screen 21900 will be described. FIG. 37 is a flowchart diagram illustrating a series of processing executed in response to an operation accepted at the commission results configuration screen 21900. The steps of step S22001 through step S22005 in FIG. 37 are processing executed by CPU 2301 of the client terminal 2101. Note that the contents of processing and the order of processing illustrated in FIG. 37 are only exemplary, and are not restrictive. The series of processing illustrated in FIG. 37 is repeatedly executed while the commission results confirmation screen 21900 is being displayed.

In step S22001, the operation accepting unit 2405 of the client terminal 2101 determines whether or not there has been a drag operation as to the 3D data in the commission results confirmation screen 21900. The commission results confirmation screen 21900 has 3D data displayed by the Web browser unit 2403 for the part selected as the display part, as indicated by reference numeral 21901, so determination is made regarding whether or not a drag operation has been accepted thereon. In a case where determination is made that a drag operation has been accepted, the flow advances to step S22002. In a case where determination is made that a drag operation has not been accepted, or a different operation has been accepted, the flow advances to step S22003.

In step S22002, the 3D data plugin unit 2406 of the client terminal 2101 changes the display orientation of the 3D data in accordance with the drag operation the moving amount and direction of movement of the drag operation are acquired in real time, and the display orientation is changed by rotating the 3D data accordingly. Thus, the user can confirm the commission results.

In step S22003, the operation accepting unit 2405 of the client terminal 2101 determines whether or not a selection (pressing) on a capture image in the commission results confirmation screen 21900 has been accepted.

Capture images such as indicated by reference numeral 21902 are inserted into the commission results confirmation screen 21900, so determination is made regarding whether or not selection thereof has been accepted. In a case where determination is made that selection has been made regarding the capture image, the flow advances to step S22004. In a case where determination is made that selection has not been made regarding the capture image, the series of processing ends.

In step S22004, the 3D data plugin unit 2406 of the client terminal 2101 acquires the rotation axis and rotation angle corresponding to the capture image regarding which the selection has been accepted. The caption image, and the display orientation that the capture image is assuming with regard to the rotation axis 1002 and rotation angle 1003 are inserted in a correlated manner in the above-described step S21810, so this can be used.

In step S22005, the 3D data plugin unit 2406 of the client terminal 2101 uses the rotation axis and rotation angle acquired in step S22004 to change the display orientation of the 3D data displayed in the commission results confirmation screen 21900. For example, when the capture image indicating "bottom" in the commission results confirmation screen 21900 in FIG. 36A is selected, the rotation axis and rotation angle (X axis, −90 degrees) corresponding to the capture image for "bottom" are acquired. The 3D data is rotated by the acquired rotation angle on the acquired rotation axis, thereby reaching the state illustrated in FIG. 36B. Accordingly, the display orientation can be changed to the same display orientation as the capture image, simply by selecting the capture image.

FIG. 38 is a flowchart diagram illustrating a series of processing of finalizing commissioning. The steps of step S22101, step S22102, step S22108, and step S22109 in FIG. 38 are processing executed by the CPU 2301 of the client terminal 2101. The steps of step S22103 through step S22107 in FIG. 38 are processing executed by CPU 2301 of the medical image processing server 2102. Note that the contents of processing and the order of processing illustrated in FIG. 38 are only exemplary, and are not restrictive.

In step S22101, the operation accepting unit 2405 of the client terminal 2101 determines whether or not a pressing operation to the finalize button 2704 in the medical image list screen 2700 has been accepted. In a case where determination is made that a pressing operation to the finalize button 2704 has been accepted, the flow advances to step S22102. In a case where determination is made that a pressing operation has not been accepted, the flow stands by.

In step S22102, the Web browser unit 2403 of the client terminal 2101 acquires the image ID embedded in the recorded of the finalize button 2704 that has accepted the pressing operation. The communication control unit 2401 of the client terminal 2101 then transmits a final finalization request for the medical image that this image ID indicates (hereinafter referred to as "object medical image" in FIG. 38), to the medical image processing server 2102.

In step S22103, the communication control unit 2411 of the medical image processing server 2102 receives the finalization request transmitted from the client terminal 2101.

In step S22104, the storage unit 2412 of the medical image processing server 2102 identifies the commission information including the image ID included in the finalization request received in step S22103, from the commission information management table 21500. The generated 3D PDF data is acquired from the 3D PDF data saving location 21509 of the commission information that has been identified.

In step S22105, the communication control unit 2411 of the medical image processing server 2102 transmits the 3D PDF data acquired in step S22104 to the client terminal 2101.

In step S22106, the medical image processing server 2102 issues an invoice to the user, who is the commissioning party, in accordance with the commission contents that have been accepted. In step S22107, the storage unit 2412 of the medical image processing server 2102 updates the status 21507 of the commission information identified in step S22104 to billing. Once the fee is paid thereafter, the status is changed to commission completed, and the series of the commission ends.

On the other hand, in step S22108, the communication control unit 2401 of the client terminal 2101 receives the 3D PDF data transmitted from the medical image processing server 2102. In step S22109, the PDF viewer unit 2407 of the client terminal 2101 saves the received 3D PDF data and then opens it to be displayed on the display 2310 of the client terminal 2101.

Next, operations of the 3D PDF data displayed by the PDF viewer unit 2407 will be described. FIG. 39 is a flowchart diagram illustrating a series of processing executed in response to an operation accepted at the 3D PDF data. The steps of step S22201 through step S22205 in FIG. 39 are processing executed by the CPU 2301 of the client terminal 2101. Note that the contents of processing and the order of processing illustrated in FIG. 39 are only exemplary, and are not restrictive. The series of processing illustrated in FIG. 39 is repeatedly executed while the 3D PDF data is being displayed.

In step S22201, the PDF viewer unit 2407 of the client terminal 2101 determines whether or not there has been a drag operation as to the 3D data in the 3D PDF data. The 3D PDF data has 3D data displayed by the PDF viewer unit 2407 for the part selected as the display part, as indicated by reference numeral 21701, so determination is made regarding whether or not a drag operation has been accepted thereon. In a case where determination is made that a drag operation has been accepted, the flow advances to step S22202. In a case where determination is made that a drag operation has not been accepted, or a different operation has been accepted, the flow advances to step S22203.

In step S22202, the 3D data control unit 2408 of the client terminal 2101 changes the display orientation of the 3D data in accordance with the drag operation. The moving amount and direction of movement of the drag operation are acquired in real time, and the display orientation is changed by rotating the 3D data accordingly. Thus, the user can confirm the commission results.

In step S22203, the PDF viewer unit 2407 of the client terminal 2101 determines whether or not a selection (pressing) on a capture image in the 3D PDF data has been accepted.

Capture images such as indicated by reference numeral 21702 are inserted into the 3D PDF data, so determination is made regarding whether or not selection thereof has been accepted. In a case where determination is made that selection has been made regarding the capture image, the flow advances to step S22204. In a case where determination is made that selection has not been made regarding the capture image, the series of processing ends.

In step S22204, the 3D data control unit 2408 of the client terminal 2101 acquires the rotation axis and rotation angle corresponding to the capture image regarding which the selection has been accepted. The caption image, and the display orientation that the capture image is assuming with regard to the rotation axis 21002 and rotation angle 21003 are inserted in a correlated manner in the above-described step S21416, so this can be used.

In step S22205, the 3D data control unit 2408 of the client terminal 2101 uses the rotation axis and rotation angle acquired in step S22204 to change the display orientation of the 3D data displayed in the 3D PDF data. For example, when the capture image indicating "bottom" in the 3D PDF data in FIG. 34A is selected, the rotation axis and rotation angle (X axis, −90 degrees) corresponding to the capture image for "bottom" are acquired. The 3D data is rotated by the acquired rotation angle on the acquired rotation axis, thereby reaching the state illustrated in FIG. 34B. Accordingly, the display orientation can be changed to the same display orientation as the capture image, simply by selecting the capture image. Also, the 3D data can be operated with the same operational feeling as the commission results confirmation screen 21900 described above.

Figure 40:
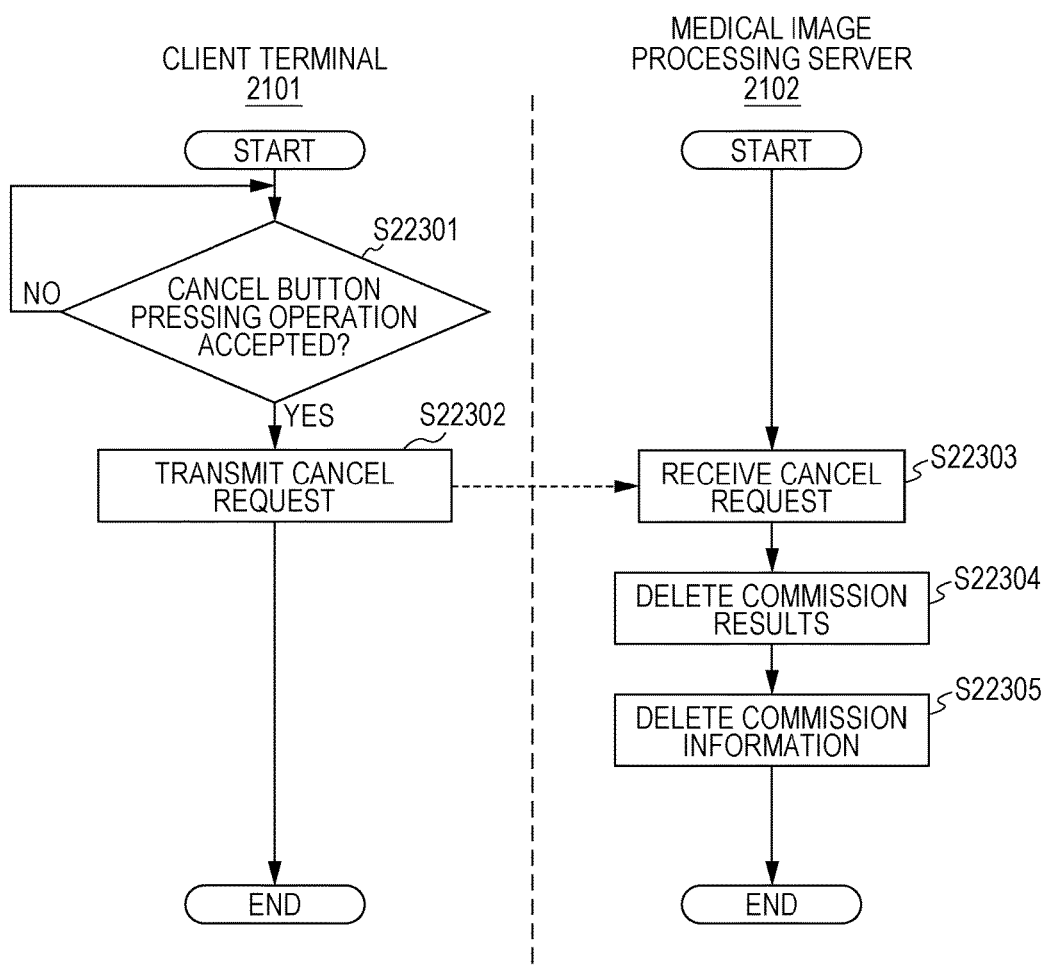
FIG. 40 is a flowchart diagram illustrating a series of processing of cancelling commissioning.

FIG. 40 is a flowchart diagram illustrating a series of processing of cancelling commissioning. The steps of step S22301 and step S22302 in FIG. 40 are processing executed by the CPU 2301 of the client terminal 2101. The steps of step S22303 through step S22305 in FIG. 40 are processing executed by CPU 2301 of the medical image processing server 2102. Note that the contents of processing and the order of processing illustrated in FIG. 40 are only exemplary, and are not restrictive.

In step S22301, the operation accepting unit 2405 of the client terminal 2101 determines whether or not a pressing operation to the cancel button 2705 in the medical image list screen 2700 has been accepted. In a case where determination is made that a pressing operation to the cancel button 2705 has been accepted, the flow advances to step S22302. In a case where determination is made that a pressing operation to the cancel button 2705 has not been accepted, the flow stands by.

In step S22302, the Web browser unit 2403 of the client terminal 2101 acquires the image ID embedded in the recorded of the cancel button 2705 that has accepted the pressing operation. The communication control unit 2401 of the client terminal 2101 then transmits a generation commission cancel request for the medical image that this image ID indicates (hereinafter referred to as "object medical image" in FIG. 40), including this image ID, to the medical image processing server 2102.

In step S22303, the communication control unit 2411 of the medical image processing server 2102 receives the cancel request transmitted from the client terminal 2101. In step S22304, the storage unit 2412 of the medical image processing server 2102 deletes the commission results of the commission regarding which the cancel request has been made from the external memory 2311. The image ID has been received from the client terminal 2101, so the image ID 21502 including corresponding to this image ID is identified from the record in the commission information management table 21500. The 3D data and 3D PDF data, which are the commission results, are deleted from the identified 3D data saving location 21508 and 3D PDF data saving location 21509.

In step S22305, the storage unit 2412 of the medical image processing server 2102 deletes the commission information regarding which the cancel request has been made, i.e., the record identified in step S22304, from the commission information management table 21500. Thus the generation commission of 3D PDF data is canceled.

When the processing up to step S22305 is completed, the medical image processing server 2102 transmits an update request of the medical image list screen 2700 to the client terminal 2101. Upon receiving this update request, the client terminal 2101 executes the series of processing illustrated in FIG. 22. Accordingly, the medical image list screen 2700 is updated to the newest state.

As described above, document data including three-dimensional data indicating human body parts, generated from multiple medical images, can be generated.

The present invention can be carried out as an embodiment in the form of a system, apparatus, method, program or storage medium, or the like, for example. Specifically, the present invention may be applied to a system made up of multiple devices, or to an apparatus made up of a single device.

Also, the present invention includes a computer-executable program of a software program to realize the functions of the above-described embodiment, being directly or remotely supplied to a system or apparatus. The present invention can also be realized by the computer of the system or apparatus reading out and executing the supplied program code.

Accordingly, in order to realize the function processing of the present invention on a computer, program code itself to be installed in the computer also can realize the present invention. That is to say, the present invention also includes the computer program itself for realizing function processing of the present invention.

In this case, the mode of the program is irrelevant as long as there is a program function, and may be object code, a program executed by an interpreter, script data supplied to an operating system (OS), or the like.

Examples of a computer-readable storage medium for supplying the program include flexible disks, hard disks, optical disks (including such as CD-ROM, CD-R, CD-RW, DVD, DVD-ROM, and DVD-R), magneto-optical disks (MO), magnetic tape, non-volatile memory cards, ROM, and so forth.

Also, as a program supply method, the program can be supplied by accessing a Web page on the Internet using a browser on the client computer, and downloading the program to a storage medium such as a hard disk. In this case, the computer program itself of the present invention may be downloaded, or a compressed file including an automatic installation function may be downloaded.

Also, dividing the program code making up the program of the present invention into multiple files, and downloading each file from different home pages can also realize the present invention. That is to say, a WWW server for downloading a program file to realize the function processing of the present invention by a computer as to multiple users is also included in the scope of the present invention.

Also, an arrangement may be made wherein the program of the present invention is encrypted, stored in a storage medium such as a CD-ROM, and distributed to users who have cleared predetermined conditions, who can download key information to decrypt the encryption from a Web page via the Internet. The encrypted program can be decrypted and installed using the downloaded key information, so as to be installed to the computer.

Also, the computer executes the program that has been read out, whereby the functions of the above-described embodiments can be realized. For example, an OS or the like running on the computer can perform part or all of the actual processing based on the program instructions, whereby the above-described embodiment functions can be realized.

Further, an arrangement may be made wherein the program read from the storage medium is loaded to memory provided to a function expansion board inserted in the computer or a function expansion unit connected to the computer. In this case, subsequently, a CPU or the like provided to the function expansion board or function expansion unit may perform part or all of the actual processing based on the program instructions, whereby the above-described embodiment functions can be realized.

The above-described embodiments are only examples of specific ways to carry out the present invention, and should not be interpreted as restricting the technical scope of the present invention. That is to say, the present invention can be carried out in various forms without departing from the technical spirit and primary features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-084593 and 2015-084594 filed Apr. 16, 2015 and Japanese Patent Application No. 2015-125953 filed Jun. 23, 2015, which are hereby incorporated by reference herein in their entirety.

What is claimed is:

1. A medical image processing system that manages commissions to create a three-dimensional (3D) shape using a plurality of medical images, the medical image processing system comprising:
at least one processor; and
at least one memory storing instructions that, when executed by the at least one processor, cause the medical image processing system to perform operations including:
selecting, by an operation from a user, a plurality of medical images used for creating a 3D shape,
identifying, using the selected plurality of medical images, one or more virtual anatomical parts included in the selected plurality of medical images that can be used by medical image processing system to create the three-dimensional (3D) shape,
generating a screen capable of accepting selection for the one or more identified anatomical parts,
causing a display unit to display the generated screen, and
accepting a commission to create, via a 3D forming apparatus, a tangible 3D shape as a formed object of one or more virtual anatomical parts selected on the displayed screen, from among the one or more identified anatomical parts,
wherein generating includes generating the screen such that the screen includes a first display item arranged on the screen and capable of accepting selection for data representing the one or more identified anatomical parts, and the screen does not include a second display item, wherein the second display item is capable of accepting selection for data representing one or more virtual anatomical parts different from the one or more identified anatomical parts.

2. The medical image processing system according to claim 1, wherein the operations further include:
generating three-dimensional data of the one or more selected anatomical parts using the selected plurality of medical images,
generating a formation job to form, using a 3D printer, a formed object of the three-dimensional data, and
transmitting the formation job to the 3D printer.

3. The medical image processing system according to claim 2,
wherein the screen is capable of accepting selection of a formation method of the formed object, and
wherein transmitting includes identifying a 3D printer as a transmission destination of the formation job in accordance with the selected formation method, and includes transmitting the formation job to the 3D printer identified as the transmission destination.

4. The medical image processing system according to claim 1, wherein generating the screen capable of accepting selection includes generating the screen on which at least one display item capable of accepting designation about a method to create a 3D shape is arranged.

5. The medical image processing system according to claim 1, wherein the operations further include:

generating a medical image list screen used for selecting the plurality of medical images,
wherein generating the screen capable of accepting selection includes generating the medical image list screen on which at least one display item capable of accepting selection for the plurality of medical images is arranged, in a case where the number of the plurality of medical images is a predetermined number or more.

6. The medical image processing system according to claim 5,
wherein generating the screen capable of accepting selection includes generating the medical image list screen capable of confirming a result of creating the 3D shape, and
wherein causing includes causing the display unit to display the result, in response to an operation from the user via the medical image list screen.

7. The medical image processing system according to claim 6, wherein causing includes causing the display unit to display three-dimensional Portable Document Format (3D PDF) data including the 3D shape as the result.

8. The medical image processing system according to claim 1, wherein generating the screen includes generating the screen to hide a previously displayed commission button for medical images that have already been commissioned such that further formation commissions cannot be accepted by the medical image processing system regarding a medical image for which a formation commission has already been accepted via the displayed screen.

9. A control method for a medical image processing system that manages commissions to create a three-dimensional (3D) shape using a plurality of medical images, the control method comprising:
selecting, by an operation from a user, a plurality of medical images used for creating a 3D shape;
identifying, using the selected plurality of medical images, one or more virtual anatomical parts included in the selected plurality of medical images that can be used by medical image processing system to create the three-dimensional (3D) shape;
generating a screen capable of accepting selection for the one or more identified anatomical parts;
causing a display unit to display the generated screen; and
accepting a commission to create a tangible 3D shape as a formed object of one or more virtual anatomical parts selected on the displayed screen, from among the one or more identified anatomical parts,
wherein generating includes generating the screen such that the screen includes a first display item arranged on the screen and capable of accepting selection for data representing the one or more identified anatomical parts, and the screen does not include a second display item, wherein the second display item is capable of accepting selection for data representing one or more virtual anatomical parts different from the one or more identified anatomical parts.

* * * * *